US012300836B2

(12) United States Patent
Radovich et al.

(10) Patent No.: US 12,300,836 B2
(45) Date of Patent: May 13, 2025

(54) BATTERY PACK

(71) Applicant: MILWAUKEE ELECTRIC TOOL CORPORATION, Brookfield, WI (US)

(72) Inventors: Kyle J. Radovich, West Bend, WI (US); Mark E. Brouwer, Hartford, WI (US); Michael A. Barrowclift, East Troy, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/825,086

(22) Filed: May 26, 2022

(65) Prior Publication Data

US 2022/0384889 A1    Dec. 1, 2022

Related U.S. Application Data

(60) Provisional application No. 63/194,614, filed on May 28, 2021.

(51) Int. Cl.
*H01M 50/213* (2021.01)
*H01M 10/42* (2006.01)
(Continued)

(52) U.S. Cl.
CPC ....... *H01M 50/213* (2021.01); *H01M 10/425* (2013.01); *H01M 10/613* (2015.04);
(Continued)

(58) Field of Classification Search
CPC ............ H01M 10/613; H01M 10/615; H01M 10/6235; H01M 10/643; H01M 10/653;
(Continued)

(56) References Cited

U.S. PATENT DOCUMENTS

2010/0134940 A1*  6/2010  Nguyen ............. H05K 7/20863
                                                              361/689
2012/0196157 A1*  8/2012  Krestel ............... H01M 10/613
                                                              429/7
(Continued)

FOREIGN PATENT DOCUMENTS

CN    106784496 B    3/2020
CN    210516810 U    5/2020
(Continued)

OTHER PUBLICATIONS

International Search Report and Written Opinion for Application No. PCT/US2021/061758 dated Jun. 9, 2022 (14 pages).
(Continued)

*Primary Examiner* — Eugenia Wang
(74) *Attorney, Agent, or Firm* — Michael Best & Friedrich LLP

(57) ABSTRACT

A battery pack assembly includes a housing, a battery cell assembly, and a fan. The housing having a plurality of sides and defining an internal cavity. The battery cell assembly positioned in the internal cavity. The battery cell assembly includes a plurality of battery cells and a frame supporting the battery cells. The frame includes a first support member, a second support member, and a plurality of leg members connecting the first support member and the second support member. The first support member and the second support member each has a body extending between a first edge and a second edge opposite the first edge. The body defines a plurality of openings configured to align with one of the battery cells. The fan is configured to circulate air within the housing and through the battery cell assembly.

21 Claims, 57 Drawing Sheets

(51) Int. Cl.
*H01M 10/613* (2014.01)
*H01M 10/615* (2014.01)
*H01M 10/6235* (2014.01)
*H01M 10/643* (2014.01)
*H01M 10/653* (2014.01)
*H01M 10/6551* (2014.01)
*H01M 10/6555* (2014.01)
*H01M 10/6563* (2014.01)
*H01M 10/6565* (2014.01)
*H01M 10/6566* (2014.01)
*H01M 50/247* (2021.01)
*H01M 50/264* (2021.01)
*H01M 50/284* (2021.01)
*H01M 50/502* (2021.01)
*H01M 50/507* (2021.01)

(52) U.S. Cl.
CPC ..... *H01M 10/615* (2015.04); *H01M 10/6235* (2015.04); *H01M 10/643* (2015.04); *H01M 10/653* (2015.04); *H01M 10/6551* (2015.04); *H01M 10/6555* (2015.04); *H01M 10/6563* (2015.04); *H01M 10/6565* (2015.04); *H01M 10/6566* (2015.04); *H01M 50/247* (2021.01); *H01M 50/264* (2021.01); *H01M 50/284* (2021.01); *H01M 50/502* (2021.01); *H01M 50/507* (2021.01); *H01M 2220/30* (2013.01)

(58) Field of Classification Search
CPC ......... H01M 10/6551; H01M 10/6554; H01M 10/6571; H01M 50/213; H01M 50/247; H01M 50/264; H01M 50/284; H01M 50/502; H01M 50/24; H01M 50/296; H01M 50/509; H01M 50/516; H01M 10/6563–6566; H01M 10/6556–6557; H01M 50/507; H01M 2220/30
See application file for complete search history.

(56) References Cited

U.S. PATENT DOCUMENTS

| | | |
|---|---|---|
| 2014/0349142 A1 | 11/2014 | Kim et al. |
| 2015/0044519 A1* | 2/2015 | Rief ................. H01M 10/6563 |
| | | 429/50 |
| 2015/0086830 A1* | 3/2015 | Sun .................... H01M 50/222 |
| | | 429/120 |
| 2015/0303717 A1 | 10/2015 | Schneider et al. |
| 2017/0187083 A1 | 6/2017 | Mueller et al. |
| 2018/0131053 A1* | 5/2018 | Knappenberger ...... B60L 58/26 |
| 2018/0166736 A1 | 6/2018 | Lee et al. |
| 2019/0044110 A1* | 2/2019 | Sheeks .................... H02K 5/20 |
| 2019/0296311 A1* | 9/2019 | Campbell .......... H01M 50/213 |
| 2021/0020881 A1 | 1/2021 | Hilligoss et al. |
| 2021/0269643 A1 | 9/2021 | Zheng et al. |
| 2022/0181734 A1 | 6/2022 | Fassbender et al. |

FOREIGN PATENT DOCUMENTS

| | | |
|---|---|---|
| CN | 211629166 U | 10/2020 |
| EP | 0940864 A2 * | 1/1999 |
| EP | 3671895 A1 | 6/2020 |
| JP | 2007165134 A | 6/2007 |
| JP | 2016516273 A | 6/2016 |
| JP | 2018026231 A | 2/2018 |
| JP | 2020161216 A | 10/2020 |
| WO | 2016178315 A1 | 11/2016 |
| WO | 2020094365 A1 | 5/2020 |

OTHER PUBLICATIONS

Japanese Patent Office Action for Application No. 2023-532593 dated Jul. 23, 2024 (12 pages including English translation).
Australian Patent Office Action for Application No. 2021392728 dated Aug. 6, 2024 (4 pages).
Japanese Patent Office Action for Application No. 2023-532593 dated Feb. 4, 2025 (10 pages including English translation).

* cited by examiner

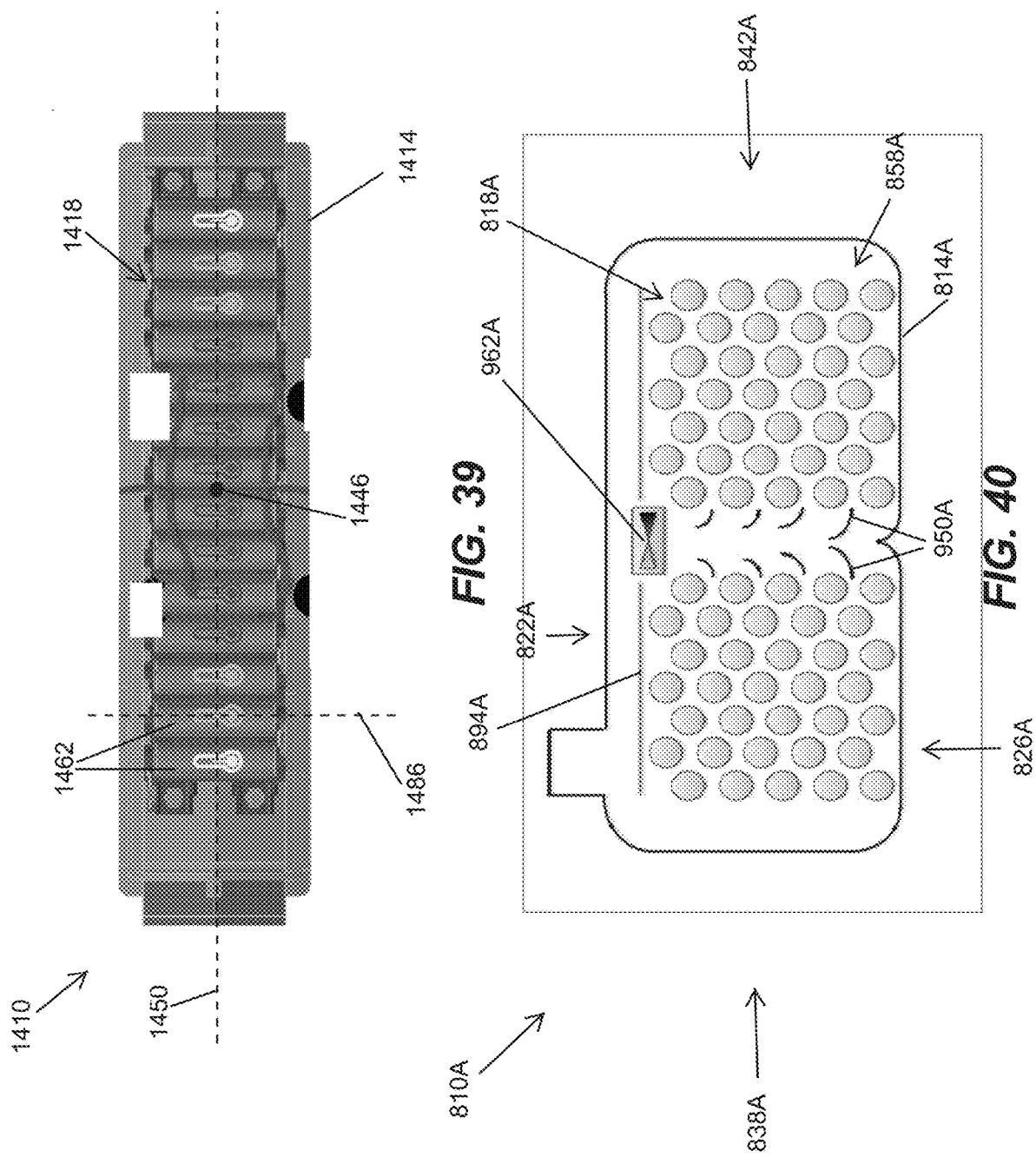

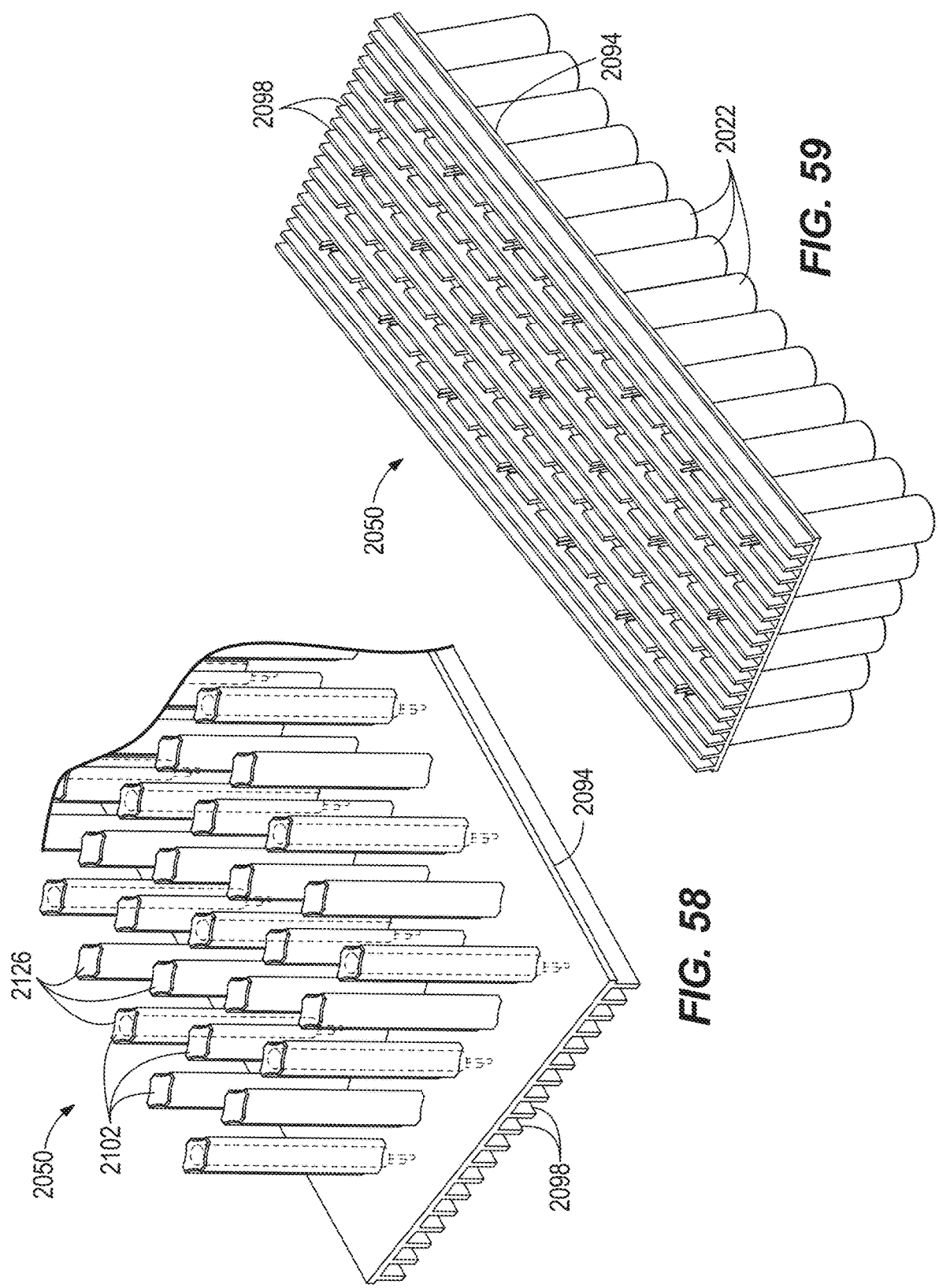

BATTERY PACK

CROSS-REFERENCE TO RELATED APPLICATIONS

This application claims priority to co-pending U.S. Provisional Patent Application No. 63/194,614 filed on May 28, 2021, the entire contents of which is incorporated herein by reference.

FIELD

The present invention relates to sealed battery packs and, more particularly, to an internal structure of a battery pack configured to facilitate thermal cooling within a sealed housing.

BACKGROUND

Typically, electrical equipment, such as a power tool, can be powered by a rechargeable battery pack. The battery pack may be charged in a compatible battery charger.

SUMMARY

In one aspect, disclosed herein, there is provided a battery pack assembly that includes a housing, a battery cell assembly, and a fan. The housing having a plurality of sides and defining an internal cavity. The battery cell assembly positioned in the internal cavity. The battery cell assembly includes a plurality of battery cells and a frame supporting the battery cells. The frame includes a first support member, a second support member, and a plurality of leg members connecting the first support member and the second support member. The first support member and the second support member each has a body extending between a first edge and a second edge opposite the first edge. The body defines a plurality of openings configured to align with one of the battery cells. The fan is configured to circulate air within the housing and through the battery cell assembly.

In some embodiments, the battery pack assembly further includes a heat sink integrated with the housing.

In some embodiments, the battery pack assembly further includes a plurality of baffles positioned within the internal cavity.

In some embodiments, each of the baffles is positioned to direct the airflow toward the battery cell assembly.

In some embodiments, the battery pack assembly is configured as a high power battery pack and connectable to and operable to power various motorized power tools.

In some embodiments, the battery cell assembly is arranged within the internal cavity such that each of the battery cells is oriented relative to a longitudinal axis of the housing.

In some embodiments, each of the battery cells is connected by a wire to a connector positioned adjacent to the respective battery cell.

In some embodiments, the connector is an electrically conductive plate and directly coupled to at least two of the battery cells.

In some embodiments, the connector is positioned on a lateral surface of the second support member.

In some embodiments, the battery pack assembly further includes a battery terminal contact.

In some embodiments, the battery cell assembly is electrically connected within the battery pack assembly and electrically connected to the battery terminal contact.

In some embodiments, the first support member and the second support member are configured to maintain a position of the battery cells within the internal cavity.

In some embodiments, the first support member is positioned adjacent an inner surface of the housing.

In some embodiments, the first support member is coupled to the inner surface of the housing.

In some embodiments, the battery pack assembly further includes battery electronics.

In some embodiments, space within the internal cavity not taken up by the battery cell assembly or the battery electronics is divided up into one or more airflow channels positioned to surround the battery cell assembly.

In some embodiments, the battery pack assembly further includes an airflow tunnel disposed on a top side of the housing.

In some embodiments, the airflow tunnel is in fluid communication with the internal cavity of the housing.

In some embodiments, the airflow tunnel has a curvilinear shape for receiving airflow and guiding the airflow back toward the battery cells.

In some embodiments, the airflow tunnel includes a deflector configured to direct some of the air circulated by the fan around a perimeter of the battery cell assembly and gaps between adjacent battery cells positioned within the battery cell assembly.

In some embodiments, the deflector has the end portion and two guide members.

In some embodiments, the battery cells are thermally coupled to the airflow tunnel, the deflector, or the end portion by a thermally conductive gap filler, adhesive, potting, or encapsulant sealing the housing or a portion of the housing.

In some embodiments, the fan is positioned adjacent the battery cell assembly.

In some embodiments, the battery cells are positioned in a metal sleeve or a plastic sleeve.

In some embodiments, the housing or a portion of the housing surrounding the battery cells is not sealed such that the fan can exchange air from outside the battery pack assembly.

In some embodiments, each of the battery cells are equidistantly spaced.

In some embodiments, adjacent rows of battery cells are aligned in a longitudinal direction, a vertical direction, and a lateral direction.

In some embodiments, adjacent rows of battery cells are staggered and offset relative to each other.

In another aspect, disclosed herein, there is provided a battery pack assembly that includes a housing, a battery cell assembly, a fan, and an airflow tunnel. The housing defines an internal cavity. The battery cell assembly is positioned in the internal cavity. The battery cell assembly includes a plurality of battery cells and a frame supporting the battery cells. The fan is configured to circulate air within the housing and through the battery cell assembly. The airflow tunnel is disposed on a top side of the housing and is in fluid communication with the internal cavity of the housing. The airflow tunnel includes a deflector configured to direct some of the air circulated by the fan around a perimeter of the battery cell assembly and gaps between adjacent battery cells positioned within the battery cell assembly.

In some embodiments, the housing is sealed such that air is prevented from exiting the internal cavity.

In some embodiments, the battery pack assembly further includes a heat sink integrated with the housing.

In some embodiments, the battery pack assembly further includes a plurality of baffles positioned within the internal cavity.

In some embodiments, each of the baffles is positioned to direct the airflow toward the battery cell assembly.

In some embodiments, the battery pack assembly is configured as a high power battery pack and connectable to and operable to power various motorized power tools.

In some embodiments, the battery cell assembly is arranged within the internal cavity such that each of the battery cells is oriented relative to a longitudinal axis of the housing.

In some embodiments, the frame comprises a first support member, a second support member, and a plurality of leg members connecting the first support member and the second support member.

In some embodiments, the first support member and the second support member each has a body extending between a first edge and a second edge opposite the first edge.

In some embodiments, the body defines a plurality of openings configured to align with one of the battery cells.

In some embodiments, the first support member and the second support member are configured to maintain a position of the battery cells within the internal cavity.

In some embodiments, the first support member is positioned adjacent an inner surface of the housing.

In some embodiments, the first support member is coupled to the inner surface of the housing.

In some embodiments, each of the battery cells is connected by a wire to a connector positioned adjacent to the respective battery cell.

In some embodiments, the connector is an electrically conductive plate and directly coupled to at least two of the battery cells.

In some embodiments, the connector is positioned on a lateral surface of the second support member.

In some embodiments, the battery pack assembly further includes a battery terminal contact.

In some embodiments, the battery cell assembly is electrically connected within the battery pack assembly and electrically connected to the battery terminal contact.

In some embodiments, the battery pack assembly further includes battery electronics.

In some embodiments, space within the internal cavity not taken up by the battery cell assembly or the battery electronics is divided up into one or more airflow channels positioned to surround the battery cell assembly.

In some embodiments, the airflow tunnel has a curvilinear shape for receiving airflow and guiding the airflow back toward the battery cells.

In some embodiments, the deflector has the end portion and two guide members.

In some embodiments, the battery cells are thermally coupled to the airflow tunnel, the deflector, or the end portion by a thermally conductive gap filler, adhesive, potting, or encapsulant sealing the housing or a portion of the housing.

In some embodiments, the fan is positioned adjacent the battery cell assembly.

In some embodiments, the battery cells are positioned in a metal sleeve or a plastic sleeve.

In some embodiments, the housing or a portion of the housing surrounding the battery cells is not sealed such that the fan can exchange air from outside the battery pack assembly.

In some embodiments, each of the battery cells are equidistantly spaced.

In some embodiments, adjacent rows of battery cells are aligned in a longitudinal direction, a vertical direction, and a lateral direction.

In some embodiments, adjacent rows of battery cells are staggered and offset relative to each other.

In yet another aspect, disclosed herein, there is provided a battery pack assembly that includes a housing and one or more plurality of battery cell assemblies received in the housing. Each of the one or more plurality of battery cell assemblies includes a frame at least partially defining an internal cavity therewithin, a plurality of battery cells positioned in the internal cavity, and a heat sink. The heat sink includes a body having a first side and a second side opposite the first side. The heat sink further includes a plurality of fins extending from the first side, and a plurality of projections extending from the second side. The fins are external to the internal cavity, and the plurality of projections are positioned within the internal cavity. The projections are positioned between the battery cells such that the battery cells and the projections are sequentially arranged within the internal cavity in at least one direction.

In some embodiments, one or more of the projections includes a channel extending partially therethrough and each of the one or more plurality of battery cell assemblies further includes a heating rod received in each of the channels.

In some embodiments, the body of the heat sink includes a plurality of openings, each opening is connected to one of the channels, and the heating rod is inserted through the respective opening into the channel.

In some embodiments, each of the openings are positioned between some of the plurality of fins on the first side of the body of the heat sink.

In some embodiments, an end of each heating rod is positioned external to the respective aligned channel and opening.

In some embodiments, each of the one or more plurality of battery cell assemblies includes adhesive material positioned in the internal cavity. The adhesive material contacts the projections and the battery cells. The adhesive material is thermally conductive to facilitate heat transfer between the battery cells and the projections.

In some embodiments, each of the plurality of projections extends from the second side of the body to an end, each of the plurality of projections extends parallel to each of the battery cells, and the end of each of the projections is positioned adjacent an end of one of the battery cells.

In some embodiments, the frame includes a plurality of support members. Each support member may be positioned between a battery cell and an adjacent one of the plurality of projections. Each of the support members may be configured to locate one of the battery cells and one of the projections in the internal cavity.

In some embodiments, the battery pack assembly includes a fan assembly positioned within the housing and proximate the one or more battery cell assemblies. The fan assembly is operable to direct airflow past the fins of the one or more plurality of battery cell assemblies.

In some embodiments, the battery pack assembly further comprises a cover coupled to the frame. The frame, the cover, and the second side of the body of the heat sink may cooperatively define the internal cavity.

In some embodiments, the battery pack assembly further comprises a plurality of connectors supported by the frame, each of the connectors connected to two or more of the battery cells.

In yet another aspect, disclosed herein, there is provided a battery pack assembly includes a housing and one or more plurality of battery cell assemblies received in the housing. Each of the one or more plurality of battery cell assemblies includes a frame at least partially defining an internal cavity therewithin, a plurality of battery cells positioned in the internal cavity, and a heat sink. The heat sink includes a body having a first side and a second side opposite the first side. The heat sink further includes a plurality of projections extending from the second side. The first side is external to the internal cavity, and the plurality of projections are positioned within the internal cavity. One or more of the projections includes a channel extending partially therethrough. The one or more of the battery cell assemblies further includes a plurality of heating rods. Each heating rod is received in one of the channels. The projections are positioned between the battery cells such that the battery cells and the projections are sequentially arranged within the internal cavity.

In some embodiments, one or more of the projections includes a channel extending partially therethrough, and each of the one or more plurality of battery cell assemblies further includes a heating rod received in each of the channels.

In some embodiments, the body of the heat sink includes a plurality of openings, each opening is connected to one of the channels, and the heating rod is inserted through the respective opening into the channel.

In some embodiments, each of the one or more plurality of battery cell assemblies includes adhesive material positioned in the internal cavity, the adhesive material contacts the projections and the battery cells, and the adhesive material is thermally conductive to facilitate heat transfer between the battery cells and the projections.

In some embodiments, each of the plurality of projections extends from the second side of the body to an end, each of the plurality of projections extends parallel to each of the battery cells, and the end of each of the projections is positioned adjacent an end of one of the battery cells.

In some embodiments, the battery pack assembly further comprises a cover coupled to the frame. The frame, the cover, and the second side of the body of the heat sink may cooperatively define the internal cavity.

In another aspect, disclosed herein, there is provided a battery cell assembly for a battery pack includes a frame at least partially defining an internal cavity therewithin, a plurality of battery cells positioned in the internal cavity, and a heat sink. The heat sink includes a body having a first side and a second side opposite the first side. The heat sink further includes a plurality of fins extending from the first side, and a plurality of projections extending from the second side. The fins are external to the internal cavity, and the plurality of projections are positioned within the internal cavity. One or more of the projections including a channel extending partially therethrough. The projections are positioned between the battery cells such that the battery cells and the projections are sequentially arranged within the internal cavity.

In some embodiments, the battery cell assembly further comprises one or more heating rods, each of the one or more heating rods received in one of the channels.

In some embodiments, the battery cell assembly further comprises adhesive material positioned in the internal cavity, the adhesive material contacts the projections and the battery cells, and the adhesive material is thermally conductive to facilitate heat transfer between the battery cells and the projections.

In yet another aspect, disclosed herein, there is provided a battery pack assembly. The battery pack assembly includes a housing having a plurality of sides and defining an internal cavity, a plurality of battery cells received in the internal cavity, and battery electronics received in the internal cavity. A battery pack interface is supported by the housing and connectable to a device. An injection port is supported by the housing. The injection port includes one or more channels positioned on one or more of the sides of the housing. Each channel connects the internal cavity to an exterior of the battery pack. The injection port is configured to direct a fluid comprising adhesive material from the exterior of the battery pack into the internal cavity. The fluid is configured to cover at least one of a portion of the battery cells and a portion of the battery electronics.

In some embodiments, the housing includes a top housing portion and a bottom housing portion, and the top housing portion includes the injection port.

In some embodiments, the bottom housing portion includes a battery cell holder configured to retain the plurality of battery cells within the internal cavity, the battery cell holder includes a surface in facing relationship with the top housing portion, the surface configured to support the battery electronics, and the fluid is configured to cover a portion of the surface.

In some embodiments, the battery electronics includes a printed circuit board and battery contacts extending therefrom, the battery pack interface includes a terminal block enclosing the battery contacts, and the fluid is configured to cover a surface of the printed circuit board.

In some embodiments, the housing includes a longitudinal axis extending therethrough, each of the one or more channels of the injection port extends along an injection axis, and the injection axis extends at an angle relative to the longitudinal axis.

In some embodiments, the battery electronics includes a printed circuit board, and an end of the one or more channels of the injection port is positioned proximate a surface of the printed circuit board.

In some embodiments, the fluid includes thermally conductive silicone encapsulant.

In yet another aspect, disclosed herein, there is provided a method of manufacturing a battery pack assembly. The method includes assembling at least a portion of a housing of a battery pack assembly, positioning a plurality of battery cells and battery electronics within an internal cavity of the housing, and injecting a fluid comprising adhesive material into the internal cavity by an injection port of the housing such that the fluid covers at least one of a portion of the battery cells and a portion of the battery electronics.

In some embodiments, assembling at least the portion of the housing includes providing a battery cell holder, and positioning the plurality of battery cells and the battery electronics within the internal cavity includes receiving, by the battery cell holder, the plurality of battery cells, and securing a printed circuit board of the battery electronics to the battery cell holder.

In some embodiments, injecting the fluid includes covering a surface of the printed circuit board.

In some embodiments, assembling at least the portion of the housing includes coupling a bottom housing portion to a top housing portion to form the internal cavity, and injecting the fluid includes injecting the fluid through the top housing portion using the injection port.

In some embodiments, assembling at least the portion of the housing includes assembling a bottom housing portion, and the method further comprising injecting the fluid into the bottom housing portion before coupling a top housing portion to the bottom housing portion.

In some embodiments, the fluid includes thermally conductive silicone encapsulant.

In yet another aspect, disclosed herein, there is provided a battery pack assembly. The battery pack assembly includes a housing having a plurality of sides and defining an internal cavity, a plurality of battery cells received in the internal cavity, and battery electronics received in the internal cavity. A battery pack interface is supported by the housing and connectable to a device. A layer comprising adhesive material is positioned within the internal cavity between a portion of the battery cells and a portion of the battery electronics, and a plurality of inner surfaces of the housing. The layer has a continuous surface covering the portion of the battery cells and the portion of the battery electronics. The layer is injectable as a fluid into the internal cavity that is configured to harden to form the layer.

In some embodiments, the battery pack assembly further comprises an injection port configured to direct the fluid from exterior of the battery pack into the internal cavity.

In some embodiments, the housing includes a top housing portion and a bottom housing portion, and the top housing portion includes the injection port.

In some embodiments, the bottom housing portion includes a battery cell holder configured to retain the plurality of battery cells within the internal cavity, the battery cell holder includes a surface in facing relationship with the top housing portion, the surface configured to support the battery electronics, and the layer is configured to cover a portion of the surface.

In some embodiments, the battery electronics includes a printed circuit board and battery contacts extending therefrom, the battery pack interface includes a terminal block enclosing the battery contacts, and the layer is configured to cover a surface of the printed circuit board.

In some embodiments, the battery electronics includes a printed circuit board, the fluid is received in the internal cavity by an injection port, and an end of the injection port is positioned proximate a surface of the printed circuit board.

In some embodiments, the layer includes thermally conductive silicone encapsulant.

Other independent aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

FIG. 39 is a cross-sectional view of the battery pack assembly of FIG. 37.

FIG. 40 is a cross-sectional view of yet still another example of the battery pack assembly of FIG. 26.

FIG. 58 is another front perspective view of a portion the heat sink of FIG. 56.

FIG. 59 is a rear perspective view of the heat sink of FIG. 56 and a plurality of battery cells.

DETAILED DESCRIPTION

Figure 1:
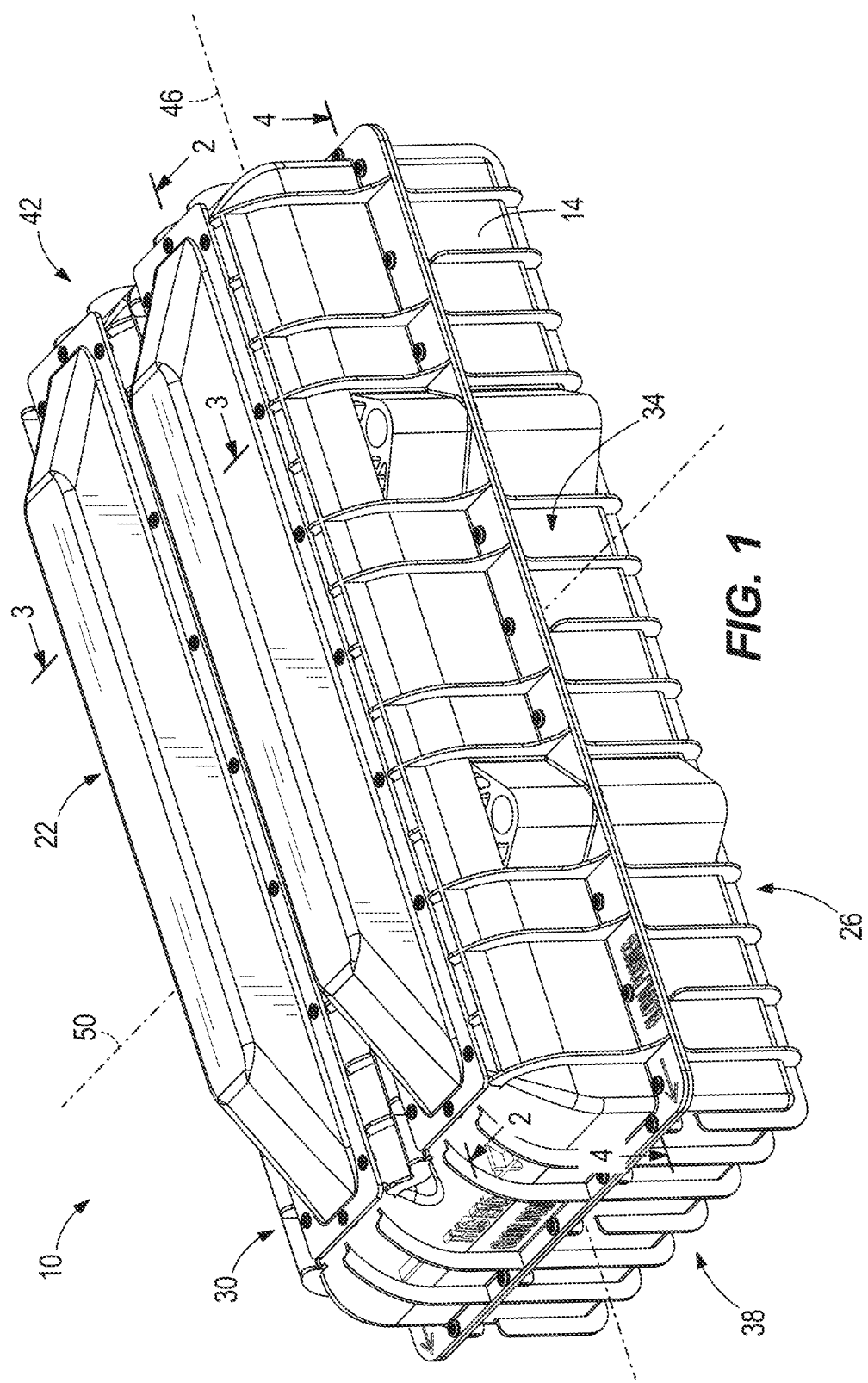
FIG. 1 is a perspective view of a battery pack assembly.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a Read Only Memory (ROM), a Random Access Memory (RAM), register memory, a processor cache, or any combination thereof.

Many of the modules and logical structures described are capable of being implemented in software executed by a microprocessor or a similar device or of being implemented in hardware using a variety of components including, for example, application specific integrated circuits (ASICs). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

FIGS. 1-4A illustrates a battery pack assembly 10 including a housing 14 and a plurality of battery cell assemblies 18 received within the housing 14. In the illustrated embodiment, the battery pack assembly 10 includes two battery cell assemblies 18. In other embodiments, the battery pack assembly 10 may include one or more battery cell assemblies 18 (e.g., three, four, etc.). The battery pack assembly 10 is configured to be a high power battery pack (e.g., having a nominal voltage of at least about 80 volts (V)) connectable to and operable to power various motorized power tools (e.g., a cut-off saw, a miter saw, a table saw, a core drill, an auger, a breaker, a demolition hammer, a compactor, a vibrator, a compressor, a drain cleaner, a welder, a cable tugger, a pump, etc.), outdoor tools (e.g., a chain saw, a string trimmer, a hedge trimmer, a blower, a lawn mower, etc.), other motorized devices (e.g., vehicles, utility carts, a material handling cart, etc.), etc. and non-motorized electrical devices (e.g., a power source, a light, an AC/DC adapter, a generator, personal electronic device, etc.), any one of which is now referred to herein as "device."

The housing 14 includes a top side 22, a bottom side 26, a first lateral side 30, a second lateral side 34 opposite the first lateral side 30, a first end 38, and a second end 42 opposite the first end 38. In addition, the housing 14 includes a longitudinal axis 46 extending through the first end 38 and the second end 42. A lateral axis 50 of the housing 14 extends through the first lateral side 30 and the second lateral side 34. The lateral axis 50 is perpendicular to the longitudinal axis 46.

Figure 2:
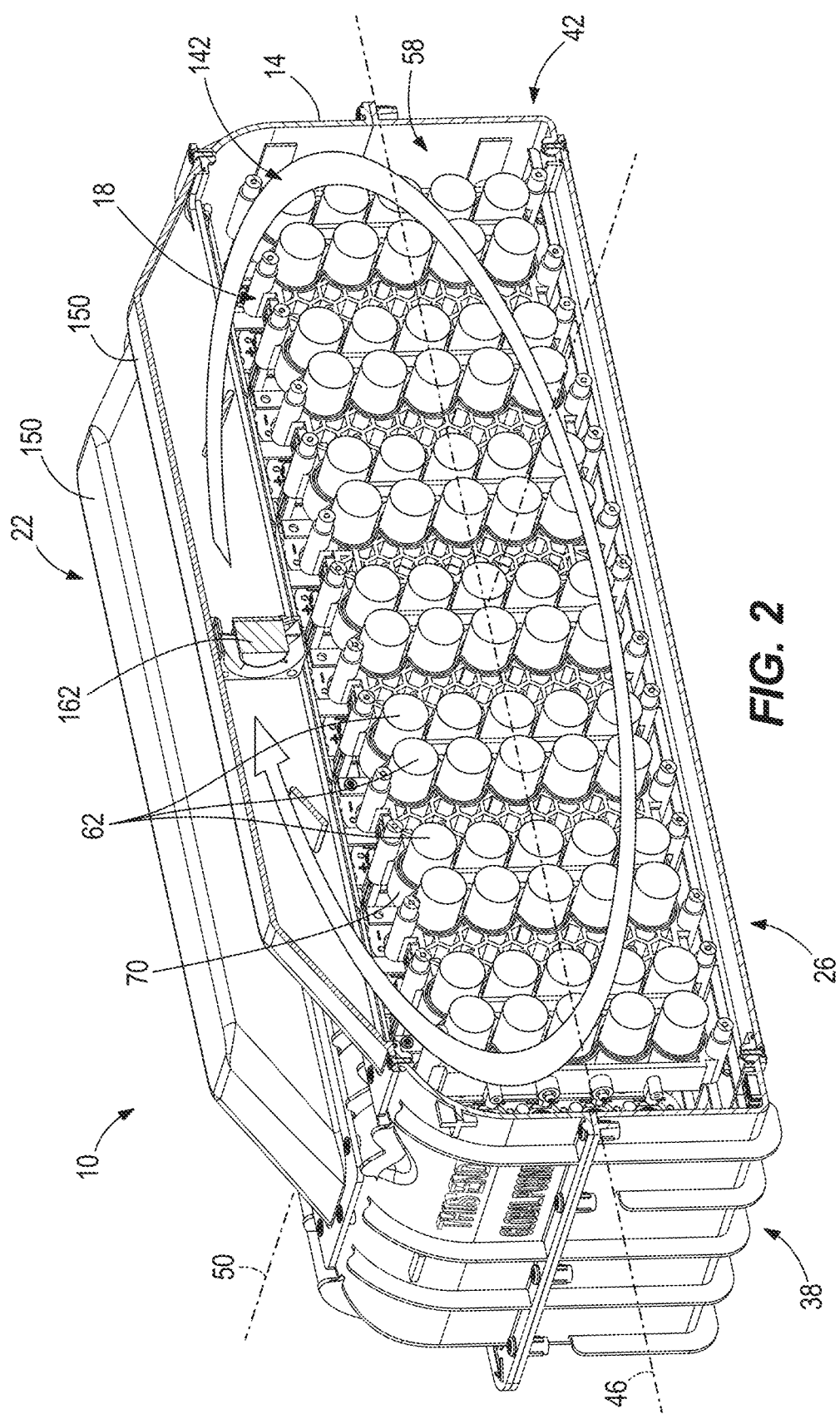
FIG. 2 is a cross-sectional view of the battery pack assembly of FIG. 1.
Figure 3:
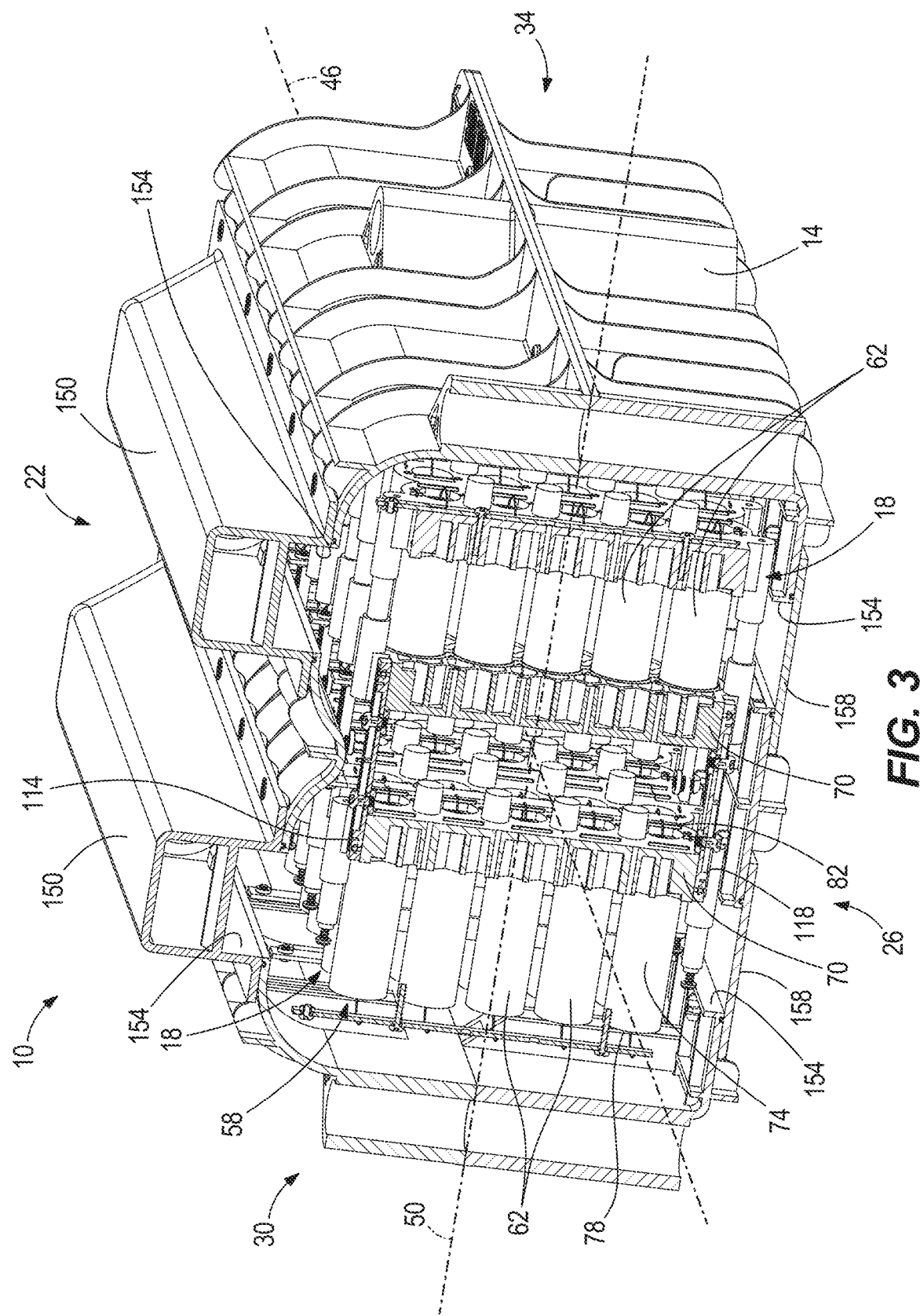
FIG. 3 is another cross-sectional view of the battery pack assembly of FIG. 1, illustrating a plurality of battery cell assemblies in a housing of the battery pack assembly.
Figure 4:
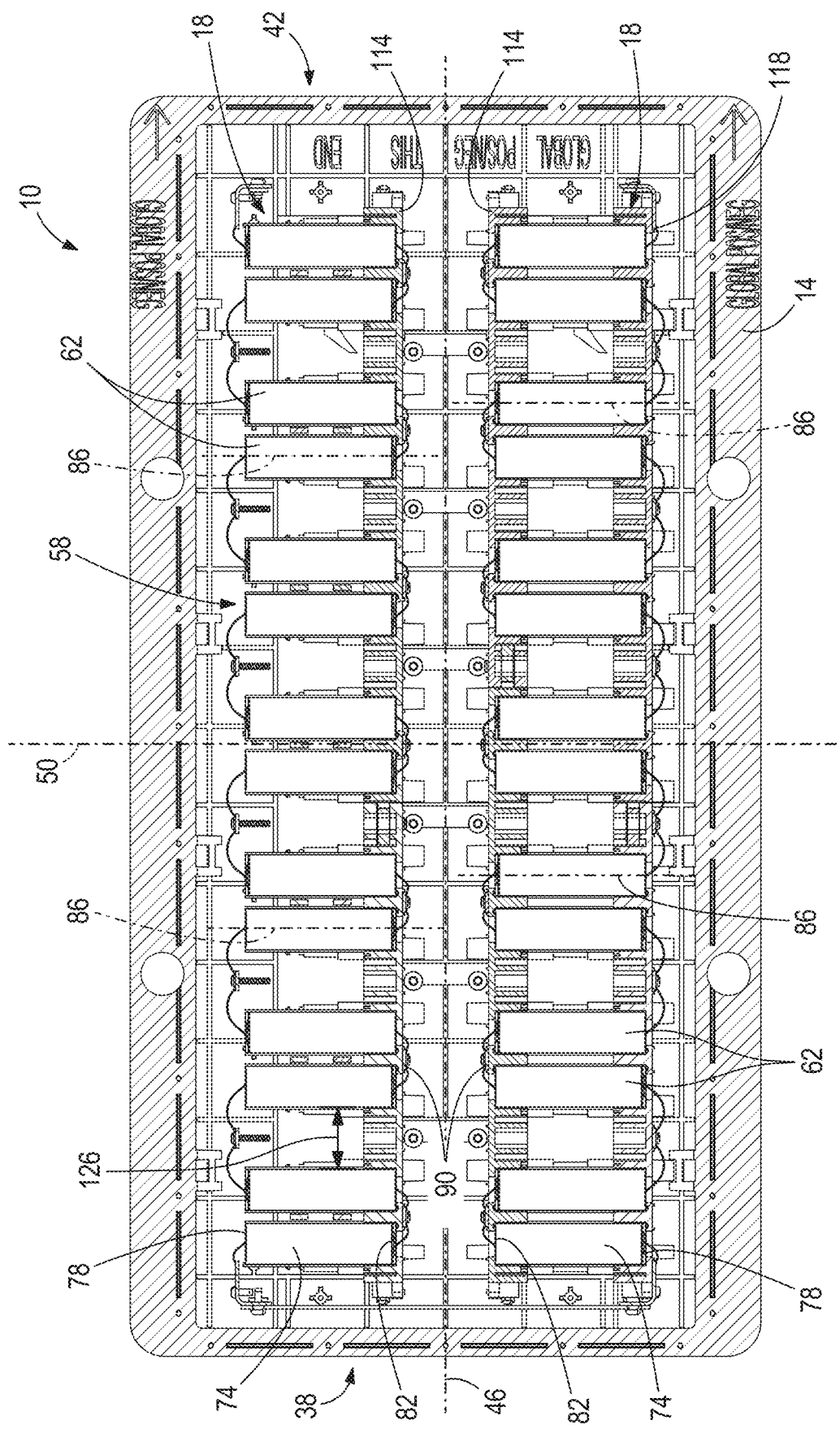
FIG. 4 is a side cross-sectional view of the battery pack assembly of FIG. 1, illustrating the plurality of battery cell assemblies of FIG. 3 in the housing.

With reference to FIGS. 2-4, the housing 14 further includes an internal cavity 58 defined therewithin. Each battery cell assembly 18 is positioned within the internal cavity 58. In addition, the housing 14 is sealed such that the internal cavity 58 is not in fluid communication with an exterior of the battery pack assembly 10.

Figure 4A:
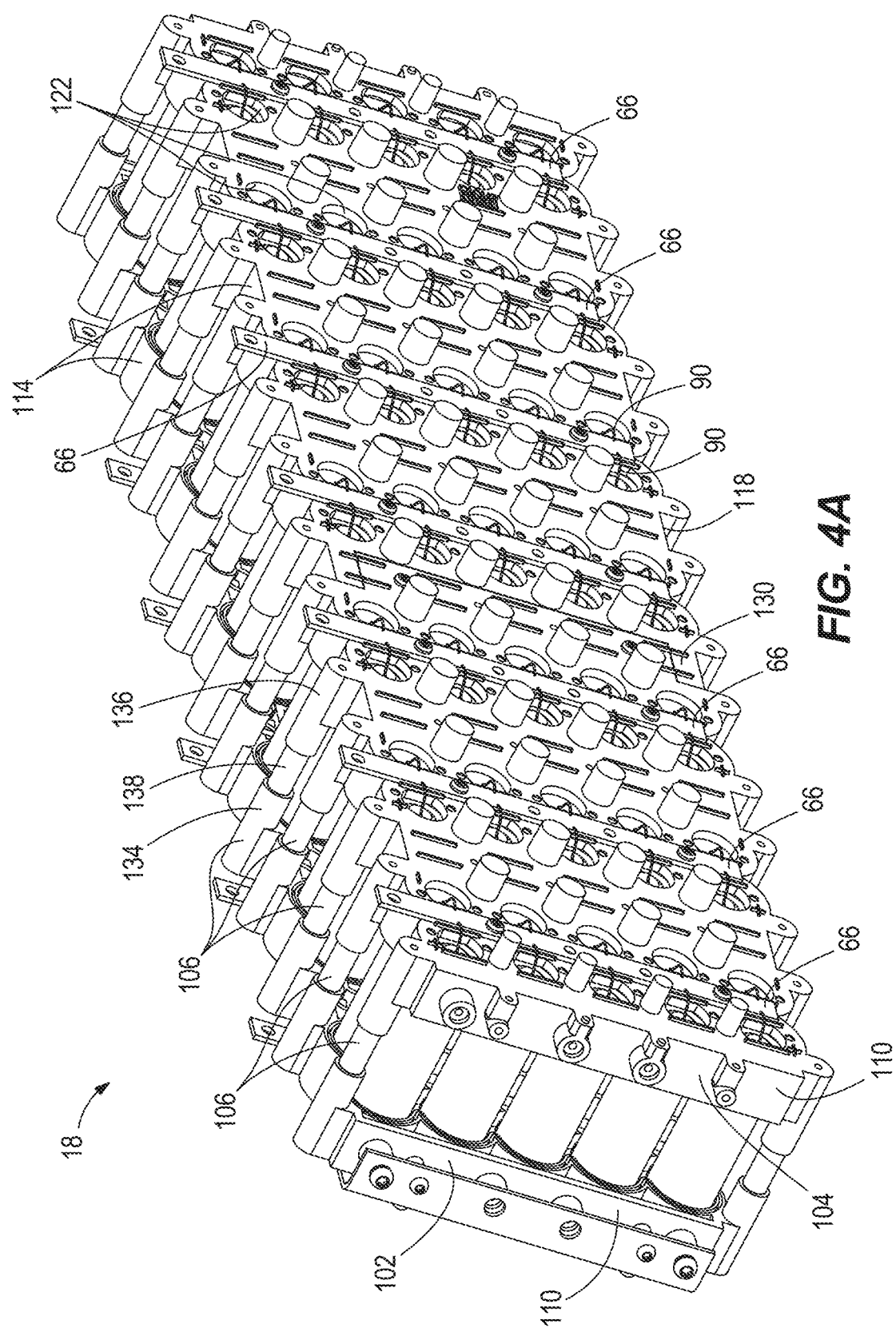
FIG. 4A is a perspective view of one of the battery cell assemblies of FIG. 3.

With reference to FIGS. 3-4A, each battery cell assembly 18 includes a plurality of battery cells 62, a plurality of connectors 66, and a housing or frame 70 supporting the plurality of battery cells 62 within the internal cavity 58. Each battery cell 62 has a body 74 extending between a first end 78 and a second end 82. In addition, each body 74 extends along a battery cell axis 86 (FIG. 4) that extends through the respective first and second lateral sides 30, 34, respectively of the body 74.

Each battery cell assembly 18 is arranged within the internal cavity 58 such that each of the battery cells 62 are oriented relative to the longitudinal axis 46 of the housing 14. In the illustrated embodiment, the battery cell axis 86 of each respective battery cell 62 extends perpendicular to the longitudinal axis 46 (or parallel to the lateral axis 50) within the internal cavity 58. In other embodiments, the battery cell axis 86 may be oriented parallel to the longitudinal axis 46 and/or some of the battery cell axes 86 may be oriented in the same or different directions. In addition, each illustrated battery cell assembly 18 includes seventy battery cells 62. In other embodiments, the battery cell assembly 18 may include two or more battery cells 62. The housing 14 is shaped and sized to receive a predetermined number of battery cell assemblies 18 in which each battery cell assembly 18 has a portion of the predetermined number of battery cells 62.

Each battery cell 62 may have a nominal voltage between about 3 V and about 5 V and may have a nominal capacity between about 2 Ah and about 6 Ah (in some cases, between about 3 Ah and about 5 Ah). The battery cells 62 may be any rechargeable battery cell chemistry type, such as, for example, lithium (Li), lithium-ion (Li-ion), other lithium-based chemistry, nickel-cadmium (NiCd), nickel-metal hydride (NiMH), etc.

With reference to FIG. 4A, the battery cells 62 may be connected in series, parallel, or combination series-parallel to provide the desired electrical characteristics (e.g., nominal voltage, current output, current capacity, power capacity, etc.) of the battery pack assembly 10. The battery cells 62 are connected together by the connectors 66 (e.g., bus bars). Each battery cell 62 is connected by one or more wires 90 to one of the connectors 66. In the illustrated embodiment, each battery cell 62 is connected by one wire 90 to the connector 66 adjacent the respective battery cell 62. The wire 90 is coupled to the second end 82 of the battery cell 62 (e.g., by a wire bonding process such as welding). Each connector 66 is directly coupled to at least two or more battery cells 62. In the illustrated embodiment, each connector 66 is directed coupled to ten battery cells 62.

Figure 5A:
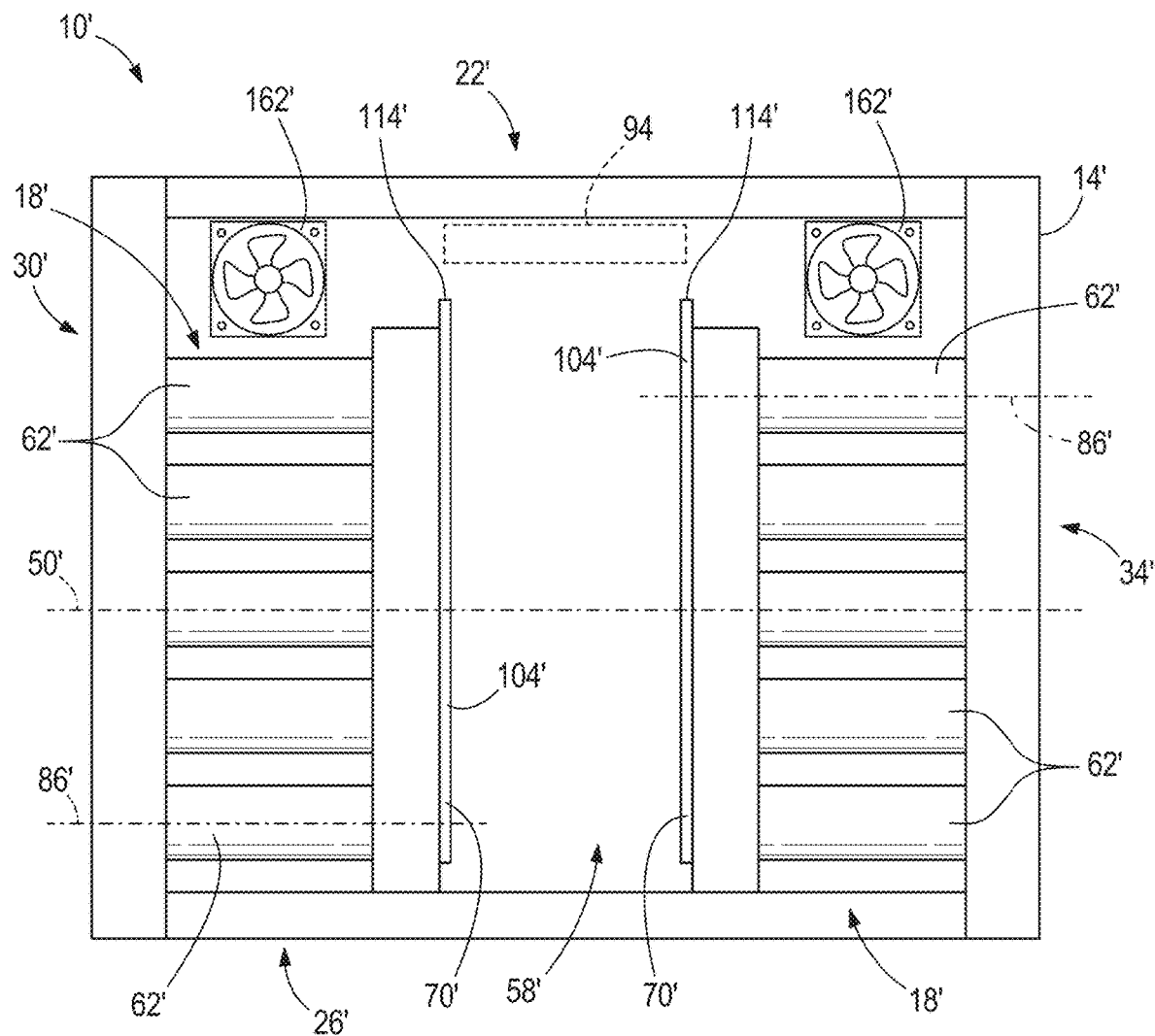
FIG. 5A is a schematic cross-sectional view of another battery pack assembly.

Each illustrated connector 66 is configured is an electrically conductive plate. Furthermore, the connectors 66 are configured to electrically connect to other battery cell assemblies 18 within the battery pack assembly 10 and/or battery terminal contacts of the battery pack assembly 10 (not shown). As shown in FIG. 5, the two battery cell assemblies 18 are electrically coupled by crimp bonding an end of each battery cell assembly 18 adjacent the bottom side 26 of the housing 14. The battery terminal contacts of the battery pack assembly 10 are configured to electrically and mechanically engage device contacts of the device to facilitate the transfer of electrical power between the device and the battery pack assembly 10. As such, each of the battery cell assemblies 18 may be electrically connected within the battery pack assembly 10 and electrically connected to the battery terminal contacts. The battery pack assembly 10 is configured to be modular such that each battery pack assembly 10 may include one or more battery cell assemblies 18, and in which each battery cell assembly 18 may include two or more battery cells 62. The battery pack assembly 10 may further include battery pack electronics positioned within the housing 14. The battery pack electronics may include, among other things, a printed circuit board (PCB 94; FIG. 5A), one or more electrical component(s) (e.g., CPU, a transformer, FETs, etc.)), and the battery terminal contacts.

Figure 5B:
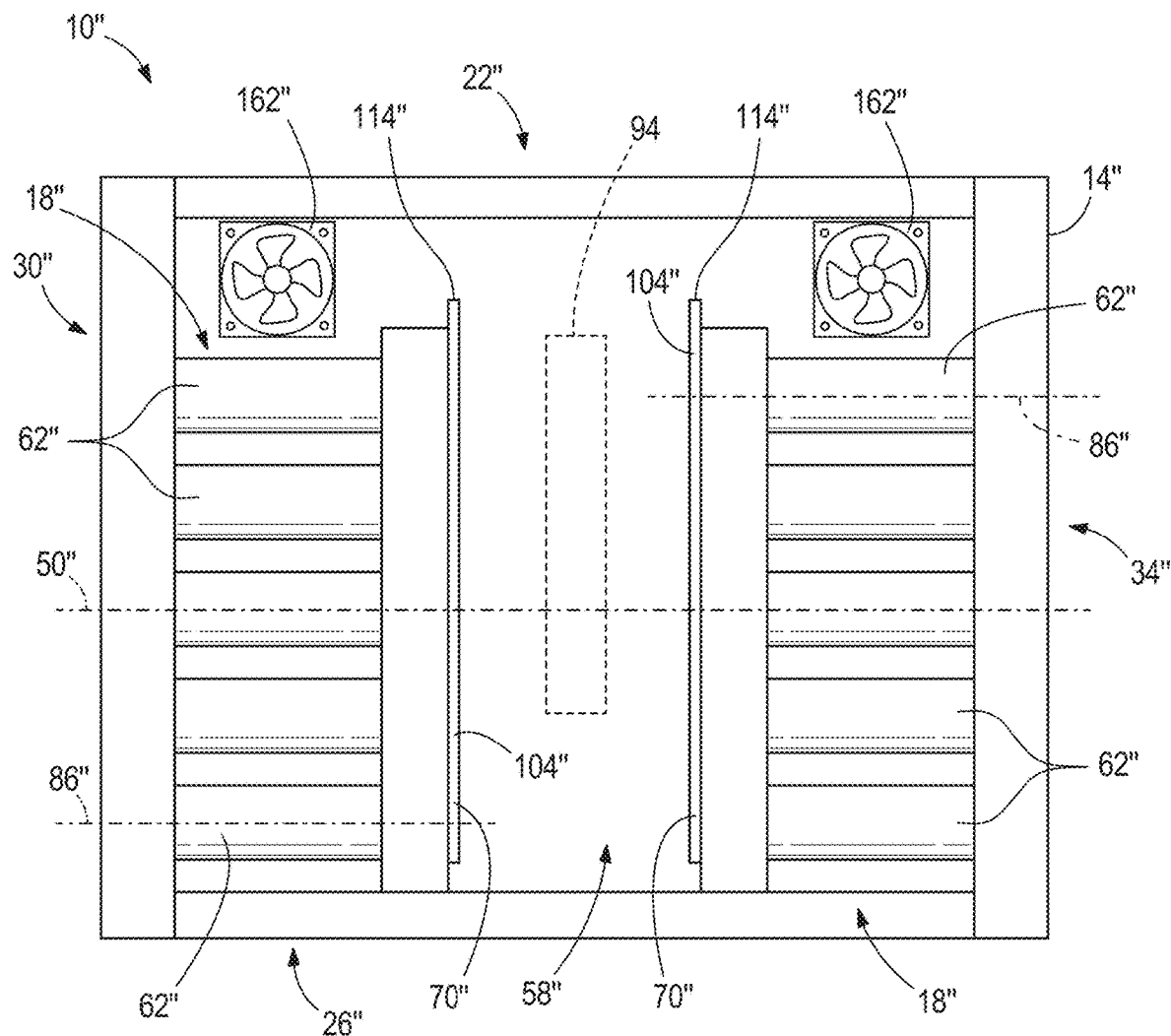
FIG. 5B is a schematic cross-sectional view of yet another battery pack assembly.

Each of FIGS. 5A and 5B schematically illustrates another example of a battery pack assembly 10', 10" with like components and features as the embodiment of the battery pack assembly 10 shown in FIGS. 1-4A being labeled with like reference numerals plus a prime symbol ("'"), double prime symbol ("""), respectively. Accordingly, the discussion of the battery pack assembly 10 above similarly applies to the battery pack assembly 10', 10" and is not re-stated. In particular, FIGS. 5A and 5B illustrate a location of the PCB 94 of the battery pack electronics. The PCB 94 is positionable relative to the battery cell assemblies 18', 18". In one example, as shown in FIG. 5A, the PCB 94 is positioned between a top-most edge of each of the battery cell assemblies 18' and the top side 22' of the housing 14'. In another example as shown in FIG. 5B, the PCB 94 is positioned between lateral-facing surfaces of the battery cell assemblies 18".

Referring again to FIGS. 2-4A, the frame 70 of each battery cell assembly 18 includes a plurality of support members 102, 104 and a plurality of leg members 106 connecting the plurality of support members 102, 104. Each support member 102, 104 has a body 110 extending between a first edge 114 and a second edge 118 opposite the first edge 114 (FIG. 4A). In addition, the body 110 defines a plurality of openings 122. Each opening 122 is configured to align with one of the battery cells 62 within the internal cavity 58. As such, each support member 102, 104 has the same number of openings 122 as the number of battery cells 62. Each end 78, 82 of the respective battery cell 62 is received in one of the openings 122. The illustrated openings 122 are arranged in rows, and some of the rows are spaced apart from each other to form gaps 126 (FIG. 4) between some of the rows of battery cells 62, as further discussed below. Accordingly, the support members 102, 104 may be configured to locate and maintain a position of the battery cells 62 within the internal cavity 58. The remaining spaces in the battery cell assembly 18 not forming the gaps 126 may be sealed.

In the illustrated embodiment, each battery cell assembly 18 includes two support members 102, 104 positioned at opposite ends of the battery cells 78, 82. A first support member 102 is positioned adjacent an inner surface of the housing 14. The first support member 102 of each battery cell assembly 18 is coupled to the inner surface of the housing 14. As such, the frame 70 is configured to at least partially support the battery cells 62 within the internal cavity 58 of the housing 14.

A second support member 104 is positioned opposite the first support member 102. Each second support member 104 of the two battery cell assemblies 18 includes a lateral surface 130 (FIG. 4A). The lateral surfaces 130 of the second support members 104 are positioned in facing relationship with each other within the internal cavity 58. The connectors 66 of each battery cell assembly 18 are positioned on the respective lateral surface 130 of the second support member 104.

With reference to FIG. 4A, the leg members 106 of the frame 70 extend between the first and second support members 102, 104, respectively. Each of the leg members 106 is positioned on the first or second edge 114, 118, respectively, of the support member 102, 104. Each leg member 106 extends parallel with the battery cell axis 86 of the respective battery cell 62. The leg members 106 may be formed by one or more sections 134, 136, 138. For example, in the illustrated embodiment, each leg member 106 is formed by three sections 134, 136, 138 in which a first one 134 is coupled to the first support member 102, a second one 136 is coupled to the second support member 104, and a third, intermediate one 138 extends between the first and second ones 134, 136. Furthermore, the leg member 106 and/or a portion thereof may be integral with one or more of the support members 102, 104. Alternatively, the leg members 106 may be separately formed and fixed to the support members 102, 104.

With reference to FIGS. 2-4, the space within the internal cavity 58 not taken up by the battery cell assemblies 18 or the battery electronics is divided up into one or more airflow channels 142. The airflow channels 142 are positioned to surround each battery cell assembly 18 within the sealed housing 14. In the illustrated embodiment, the battery pack assembly 10 further includes a plurality of airflow tunnels 150 disposed on the top side 22 of the housing 14. The airflow tunnels 150 are in fluid communication with the internal cavity 58 of the housing 14. The illustrated housing 14 includes four holes 154 and two airflow tunnels 150. Each airflow tunnel 150 is positioned to cover one of the holes 154. The remaining two holes 154 are covered by a plate member 158 (FIG. 3). In other embodiments, the illustrated battery pack assembly 10 may include four or less airflow tunnels 150.

With reference to FIG. 2, the battery pack assembly 10 may further include a plurality of fans 162. Each fan 162 is positioned adjacent one or more of the plurality of battery cell assemblies 18. In the illustrated embodiment, the battery pack assembly 10 includes two fans 162 in which each fan 162 is positioned within one of the airflow tunnels 150. As such, one, some, or all of the airflow tunnels 150 includes a fan 162. In other embodiments, one, some, or all of the fans 162 are positionable within the housing 14 of the battery pack assembly 10. For example, as shown in FIGS. 5A-5B, the battery pack assembly 10 includes two fans 162 positioned within the internal cavity 58 of the housing 14. More specifically, the fans 162 are positioned on each side of the PCB 94 and proximate the top side 22 of the housing 14.

Figure 23:
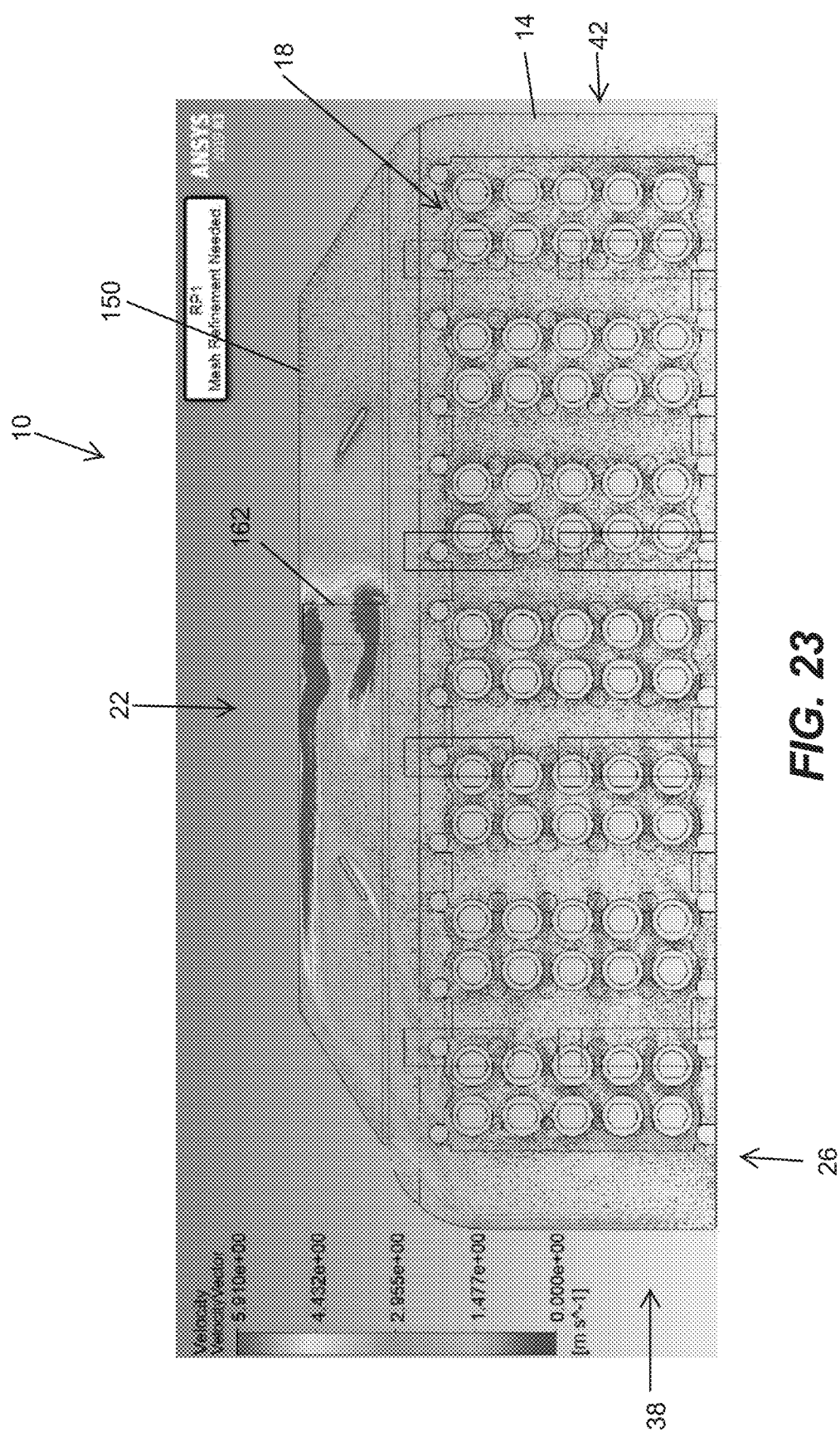
FIG. 23 is a cross-sectional view of the battery pack assembly of FIG. 1 illustrating an airflow path within the housing.

The plurality of fans 162 is operable to circulate airflow within the sealed housing 14 of the battery pack assembly 10. More specifically, the air is circulated around the internal cavity 58 of the sealed battery pack assembly 10, but does not escape the internal cavity 58 of the battery pack assembly 10 (or at least only a negligible amount of air may escape). In the illustrated embodiment, the airflow is directed between the top side 22 and the bottom side 26 of the housing 14. In other embodiments, the battery pack assembly 10 may include one or more fans 162 (three, four, etc.) for circulating airflow in the same or different directions within the sealed housing 14. FIG. 23 illustrates one example of the airflow circulated within the housing 14.

Figure 6:
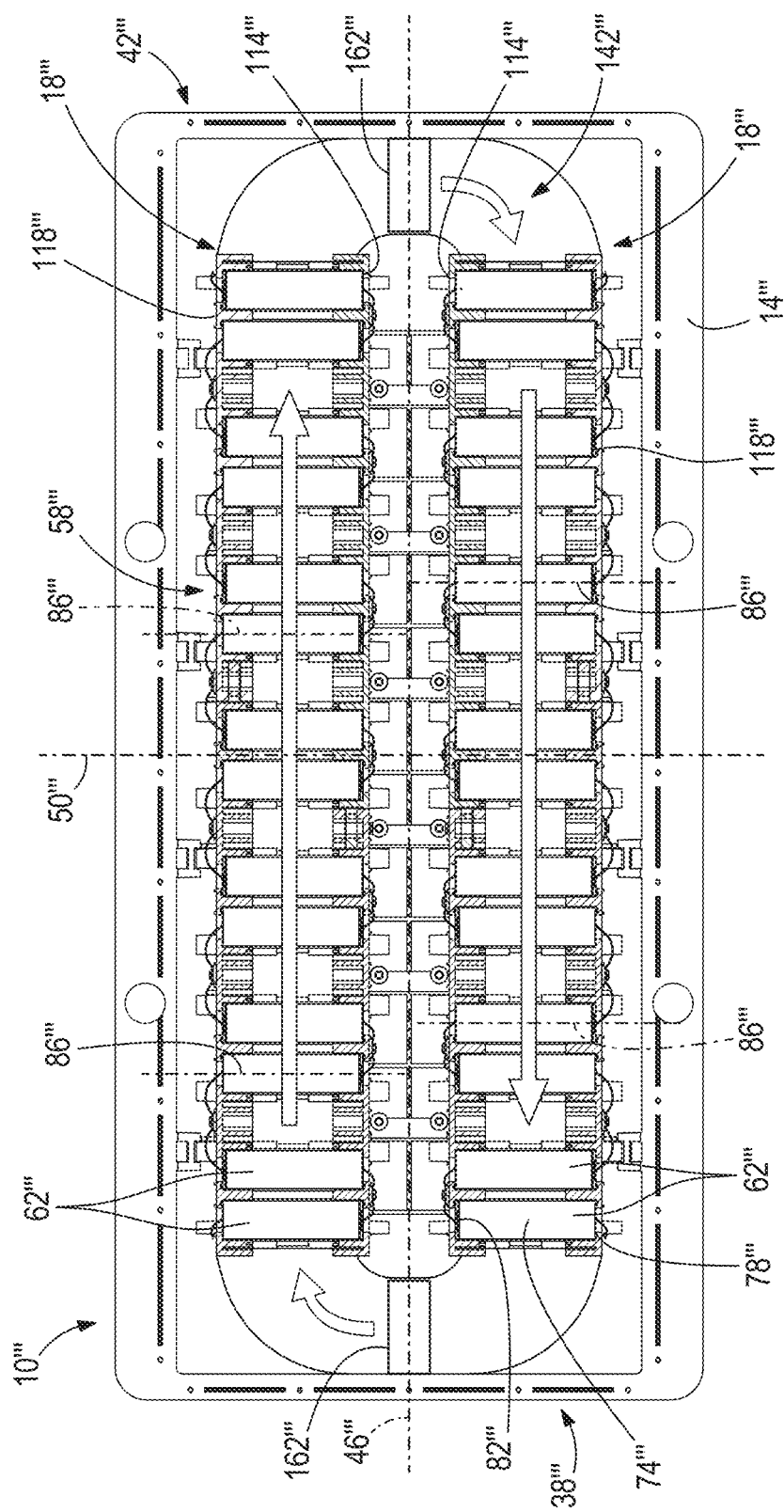
FIG. 6 is a cross-sectional view of yet still another battery pack assembly.
Figure 7:
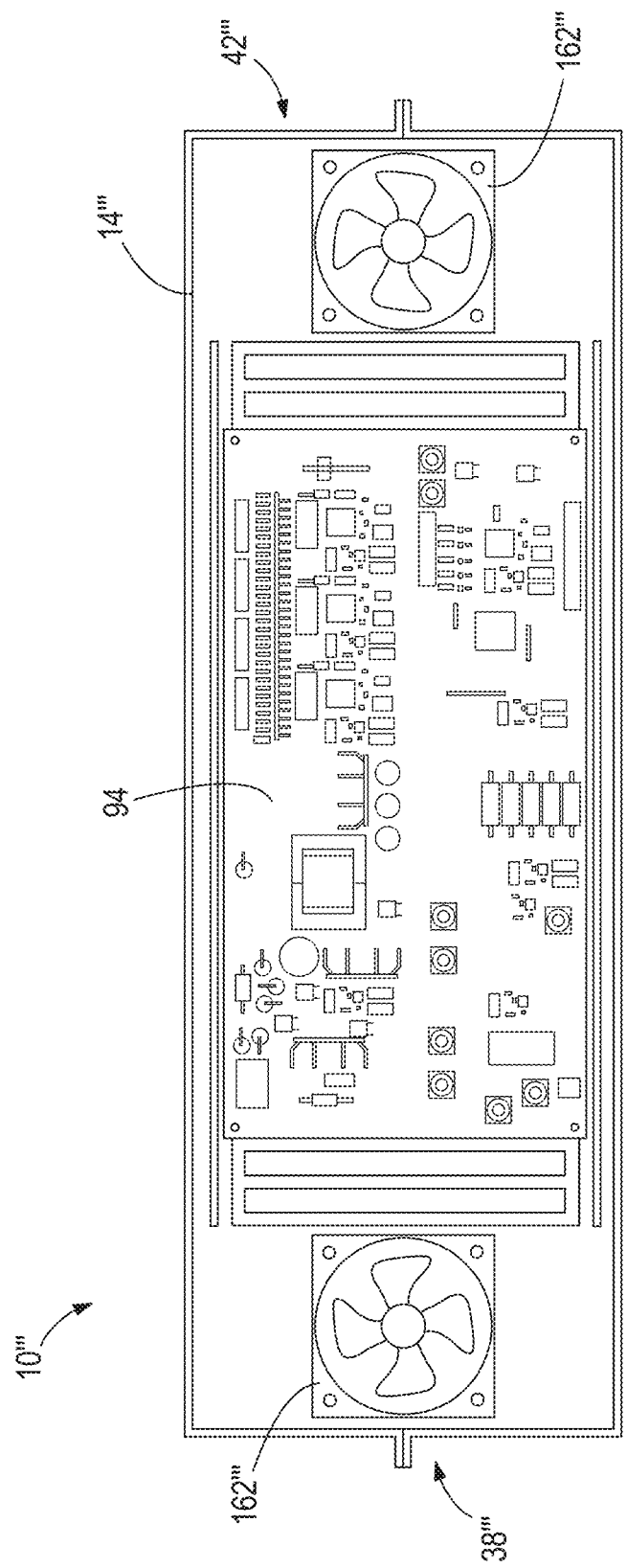
FIG. 7 is another cross-sectional view of the battery pack assembly of FIG. 6 illustrating a position of a printed circuit board.

FIGS. 6-7 illustrate yet another example of a battery pack assembly 10''' with like components and features as the embodiment of the battery pack assembly 10 shown in FIGS. 1-4A being labeled with like reference numerals plus a triple prime symbol "'''." Accordingly, the discussion of the battery pack assembly 10 above similarly applies to the battery pack assembly 10''' and is not re-stated. In particular, FIGS. 6-7 illustrate an alternative location of the plurality of fans 162'''. The plurality of fans 162''' is positionable relative to the battery cell assemblies 18''' within the internal cavity 58'''. In addition, each fan 162 is positioned proximate each of the first and second ends 38''', 42''' of the housing 14'''. Furthermore, each fan 162''' is positioned between the respective end 38''', 42''' of the housing 14''' and the battery cell assembly 18'''. One or more airflow tunnels 150''' may be provided proximate the first and second ends 38''', 42''' of the housing 14''' of the battery pack assembly 10''' (rather than on the top side 22 as shown in FIGS. 1-4A) for each fan 162''' for directing airflow within the housing 14''' similar to the airflow tunnels 150''' shown in FIGS. 1-4A. In the illustrated embodiment, the airflow is directed between the first lateral side 30''' and the second lateral side 34''' of the housing 14'''. More specifically, the airflow may be directed in a direction of increasing voltage through the plurality of battery cells 62'''.

With reference to FIGS. 8-13, in other embodiments, one or more of the airflow tunnels 150 and/or the housing 14 may include a plurality of deflectors 170A, 170B, 170C included therewithin such that some of the air may be directed by the one or more fans 162 around the perimeter of the battery cell assemblies 18, and some of the air may be directed through the gaps 126 between adjacent battery cell rows of the battery cell assemblies 18.

The deflectors 170A, 170B, 170C may be coupled to the housing 14 of the battery pack assembly 10, the frame 70 of one or more of the battery cell assemblies 18, or a combination thereof. The deflectors 170A, 170B, 170C may be integral with or separately formed the housing 14/frame 70. One or more of the deflectors 170A, 170B, 170C may be in fluid communication with each other.

Figure 8:
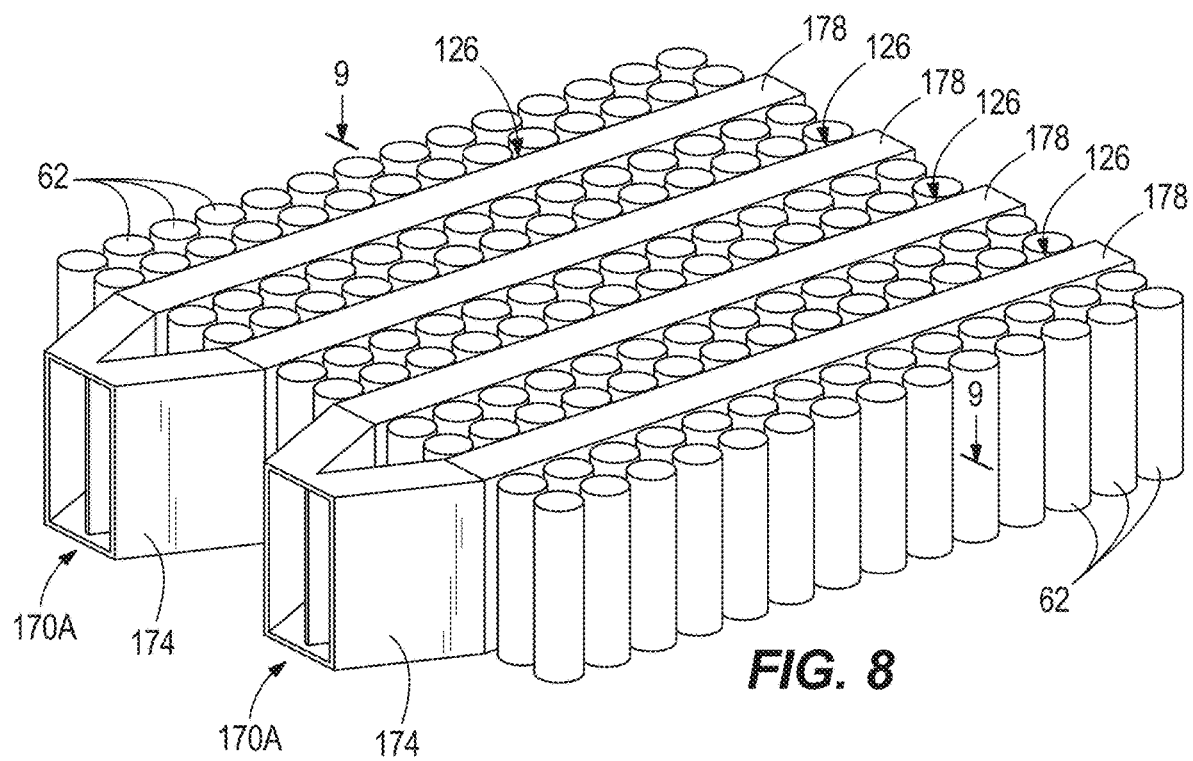
FIG. 8 is a perspective view of some of a plurality of battery cells of one of the battery cell assemblies of FIG. 4 and further including a plurality of deflectors according to a first configuration, one of the deflectors positioned between two adjacent rows of the plurality of battery cells.
Figure 9:
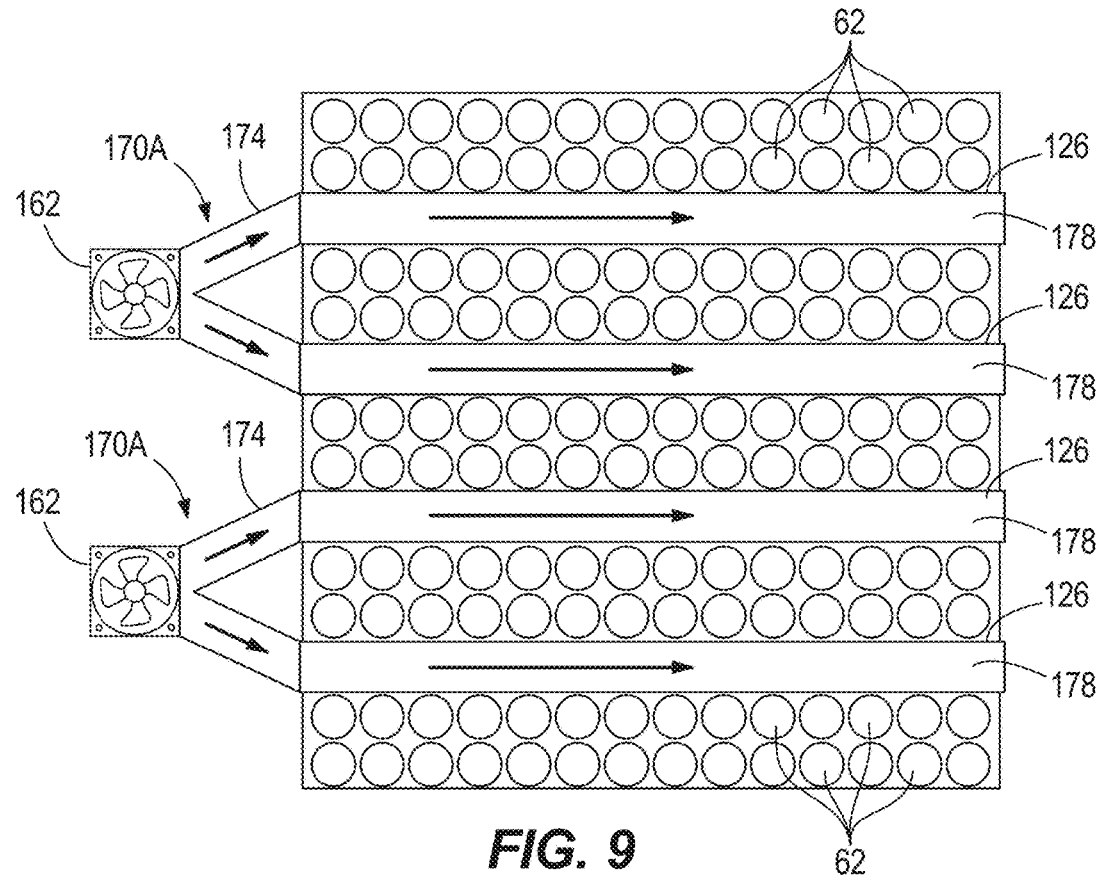
FIG. 9 is a schematic view of the some of a plurality of battery cells of FIG. 8 and a plurality of fans.

FIGS. 8-9 illustrate one example having two deflectors 170A positioned adjacent to each other. Each deflector 170A is positioned at one end of the rows of battery cells 62, and extends through the respective gap 126 between two of the rows of battery cells 62. Each deflector 170A includes an end portion 174 and a plurality of guide members 178 fluidly connected to the end portion 174. The illustrated deflector 170A includes two guide members 178 in which each guide member 178 extends through one of the gaps 126. Furthermore, the end portion 174 is positionable adjacent one of the fans 162 (FIG. 9) for directing airflow through the respective deflector 170A. In some embodiments, the end portion 174 may be configured to at least partially receive or positioned adjacent one of the fans 162.

Figure 10:
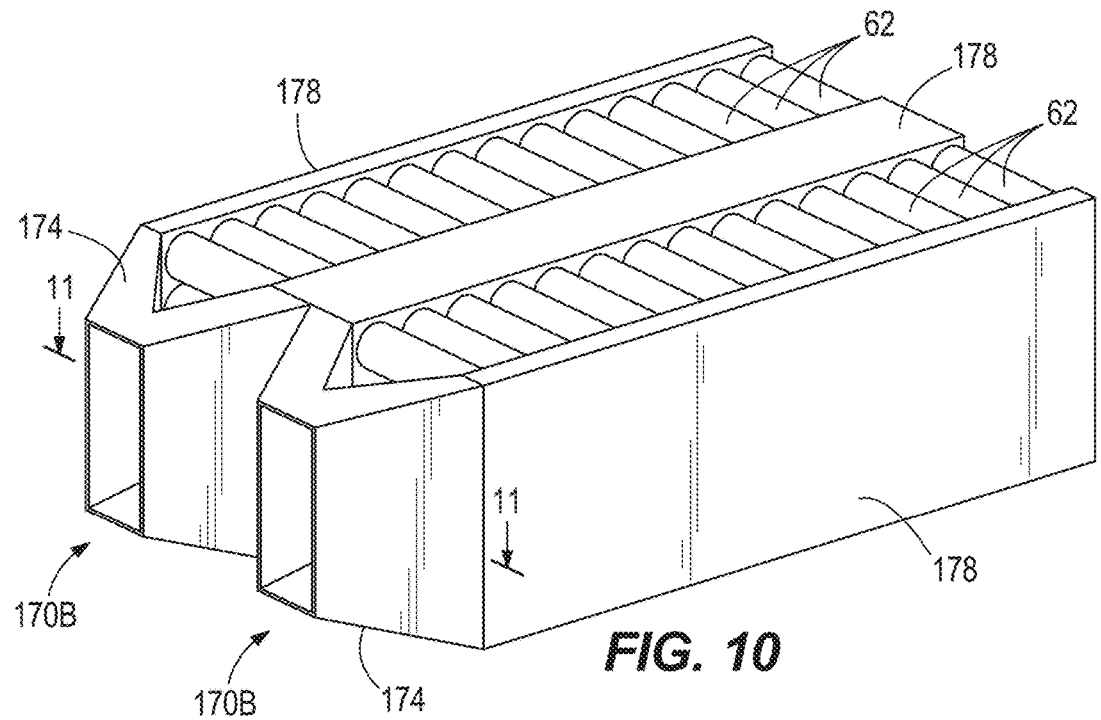
FIG. 10 is a perspective view of some of the plurality of battery cells of one of the battery cell assemblies of FIG. 4 and further including a plurality of deflectors according to a second configuration.
Figure 11:
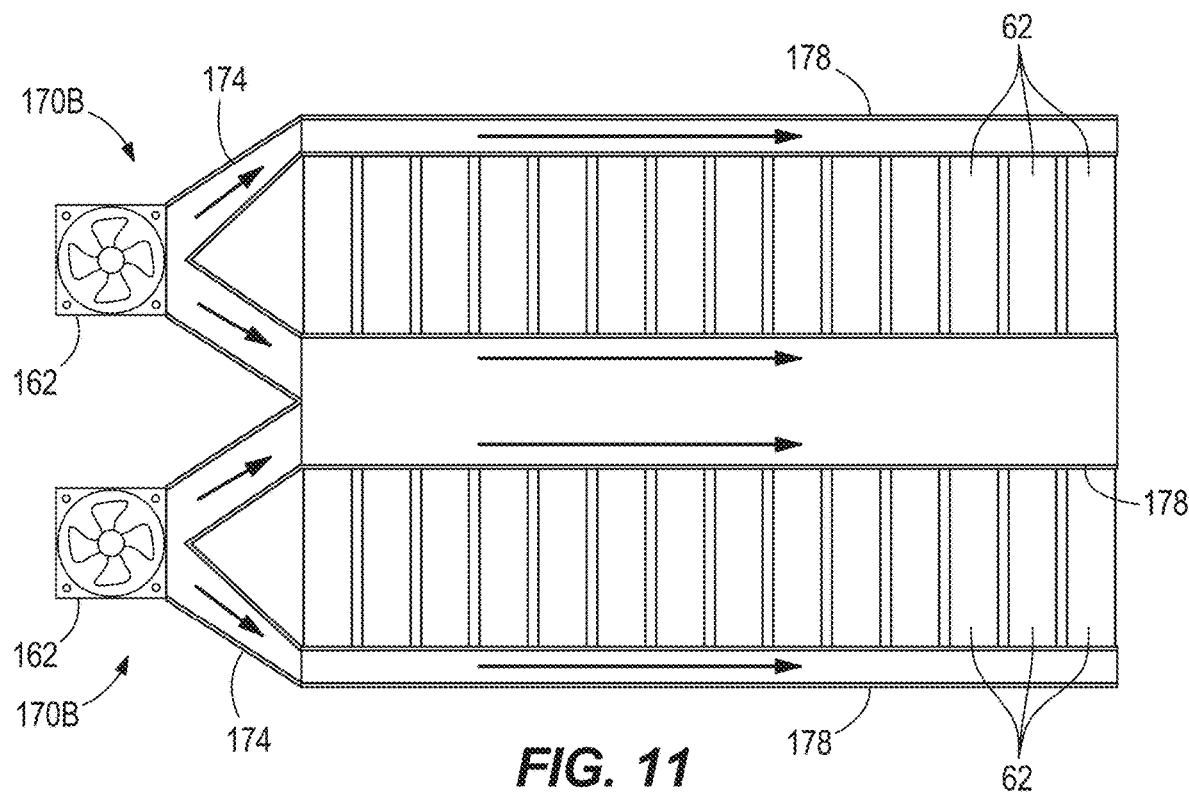
FIG. 11 is a schematic view of the some of a plurality of battery cells of FIG. 10 and a plurality of fans.

In another example, with reference to FIGS. 10-11, the deflectors 170B may be positioned at one end of the rows of battery cells 62, and extends past one of the first and second ends 78, 82 of the battery cells 62. Similar to above, the deflector 170B includes an end portion 174 and a plurality of guide members 178 fluidly connected to the end portion 174. Rather than extending through the gaps 126 between adjacent battery rows as shown in FIGS. 8-9, each guide member 178 extends past one of the first end 78 and the second end 82 of the battery cells 62. The end portion 174 is positionable adjacent one of the fans 162 (FIG. 11) for directing airflow through the respective deflector 170B. Furthermore, in the illustrated example, one of the guide members 178 of a first deflector 170B is in fluid communication with an adjacent guide member 178 of a second deflector 170B. According, multiple fans 162 may be configured to direct a combined airflow through two or more deflectors 170B.

Figure 12A:
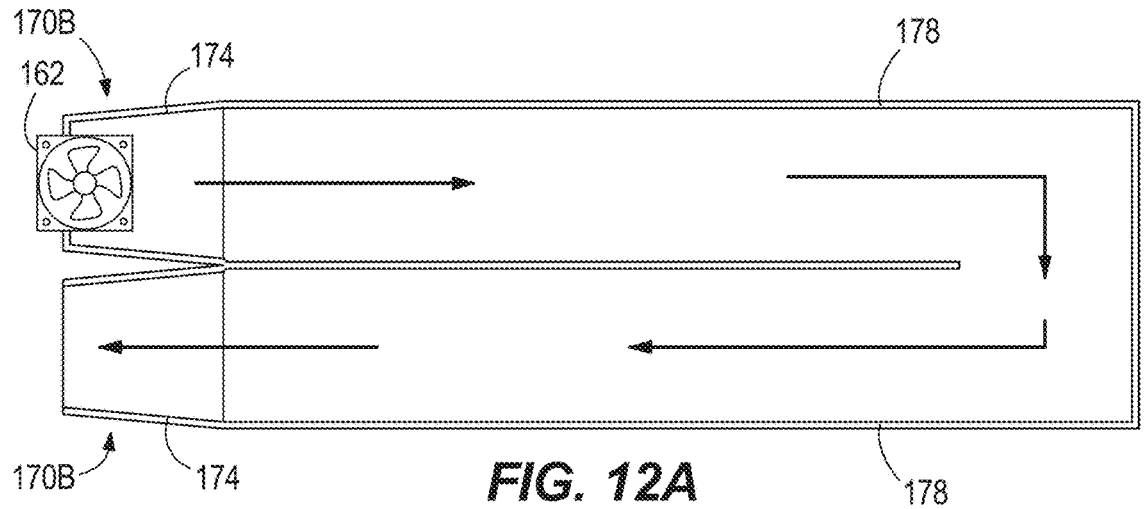
FIG. 12A is another schematic view of the some of the plurality of battery cells and the plurality of fans of FIG. 11, illustrating a first direction of airflow through the plurality of deflectors.
Figure 12B:
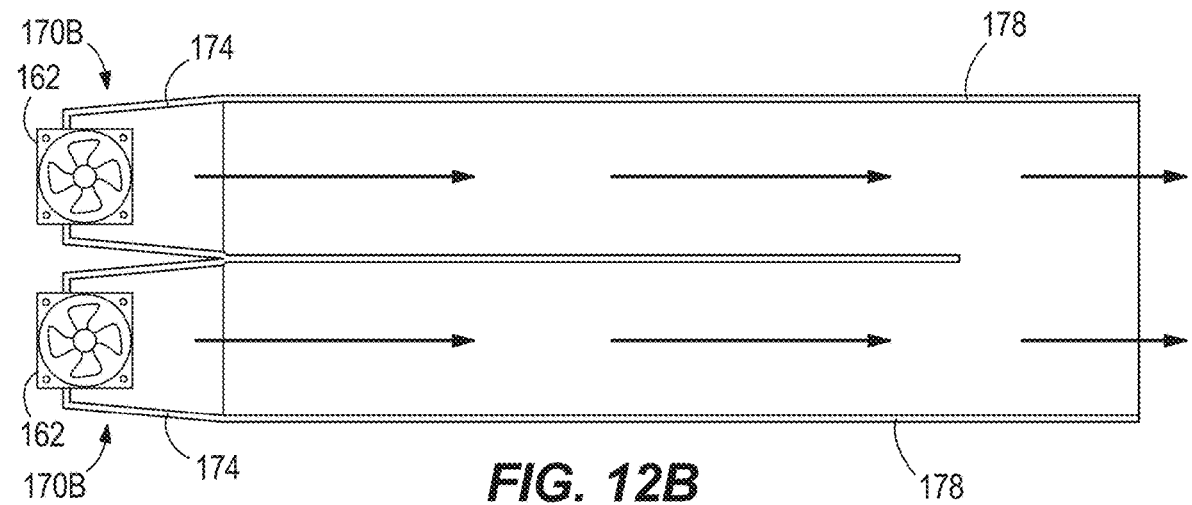
FIG. 12B is yet another schematic view of the some of the plurality of battery cells and the plurality of fans of FIG. 11, illustrating a second direction of airflow through the plurality of deflectors.
Figure 12C:
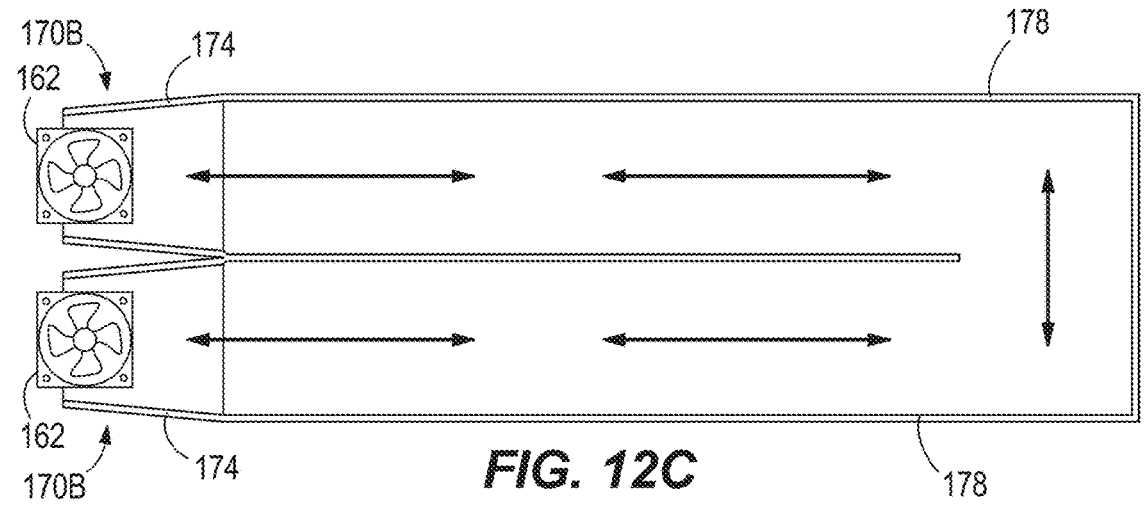
FIG. 12C is yet still another schematic view of the some of the plurality of battery cells and the plurality of fans of FIG. 11, illustrating a reciprocating direction of airflow through the plurality of deflectors.

FIGS. 12A-12C illustrate multiple examples of airflow direction through the deflectors 170B. FIG. 12A illustrates one example having a single fan 162 causing airflow through a first deflector 170B in a first direction and then the airflow is directed through a second deflector 170B in a second direction opposite the first direction. FIG. 12B illustrates another example having two fans 162 in which each fan 162 causes airflow through the respective deflector 170B. FIG. 12C illustrates yet another example also having two fans 162 in which airflow may be directed through connected deflectors 170B in a reciprocating flow.

Figure 13:
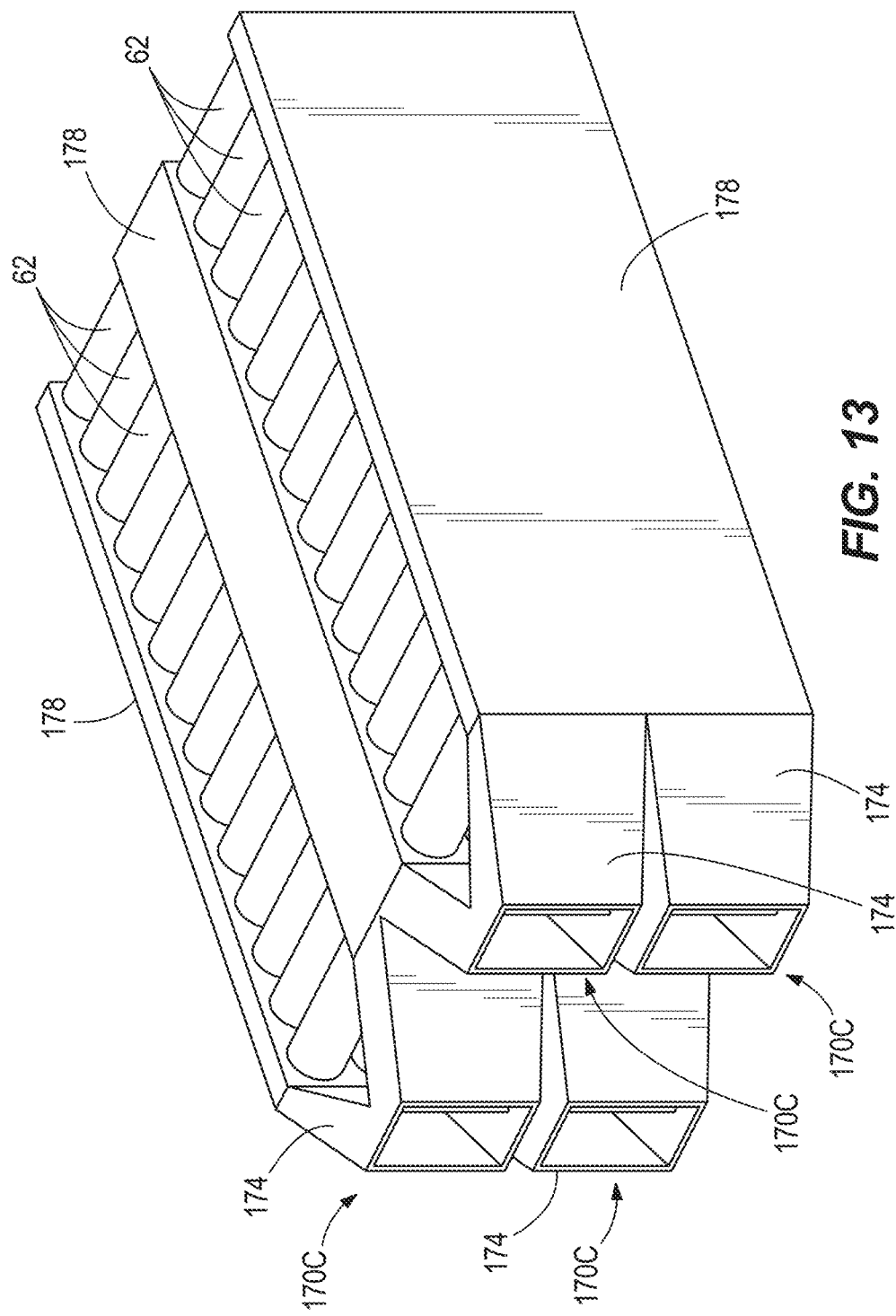
FIG. 13 is a perspective view of some of the plurality of battery cells of one of the battery cell assemblies of FIG. 4 and further including a plurality of deflectors according to a third configuration.

FIG. 13 illustrates yet still another example including four deflectors 170C positioned adjacent each other in which each deflector 170C has the end portion 174 and two guide members 178. Similar to the examples discussed above, the guide members 178 extend past one of the first end 78 and the second end 82 of the battery cells 62. In some embodiments, a fan 162 may be positionable adjacent each end portion 174 of the respective deflector 170C. In other embodiments, only some of the end portions 174 are adjacent a respective fan 162, and the remaining deflectors 170C are fluidly communicated to the deflector 170C that receives airflow from a fan 162. In further other embodiments, some of the guide members 178 may be positioned to extend past one of the first end 78 and the second end 82 of the battery cells 62 and the remaining guide members 178 may extend through the gaps 126 between adjacent rows of battery cells 62.

In other embodiments, the configurations of the airflow tunnels 150 and deflectors 170A, 170B, 170C, the battery cells 62 may be thermally coupled to the airflow tunnels 150, the deflectors 170A, 170B, 170C, and/or the end portions 174 by a thermally conductive gap filler, adhesive, potting, or/and encapsulant for sealing the housing 14 or a portion thereof. The PCB 94, power routing, and the battery cells 62 are positioned in the sealed portion of the housing 14. In the sealed housing 14 or a portion thereof, the airflow tunnels 150, the deflectors 170A-C, and/or the end portions 174 are thermally coupled to the battery cells 62 via the thermally conductive gap filler, adhesive, potting, or/and encapsulant. Accordingly, the fan(s) 162 are configured to direct air from outside of the sealed battery pack assembly 10 or portion thereof through the airflow tunnels 150.

Figure 14:
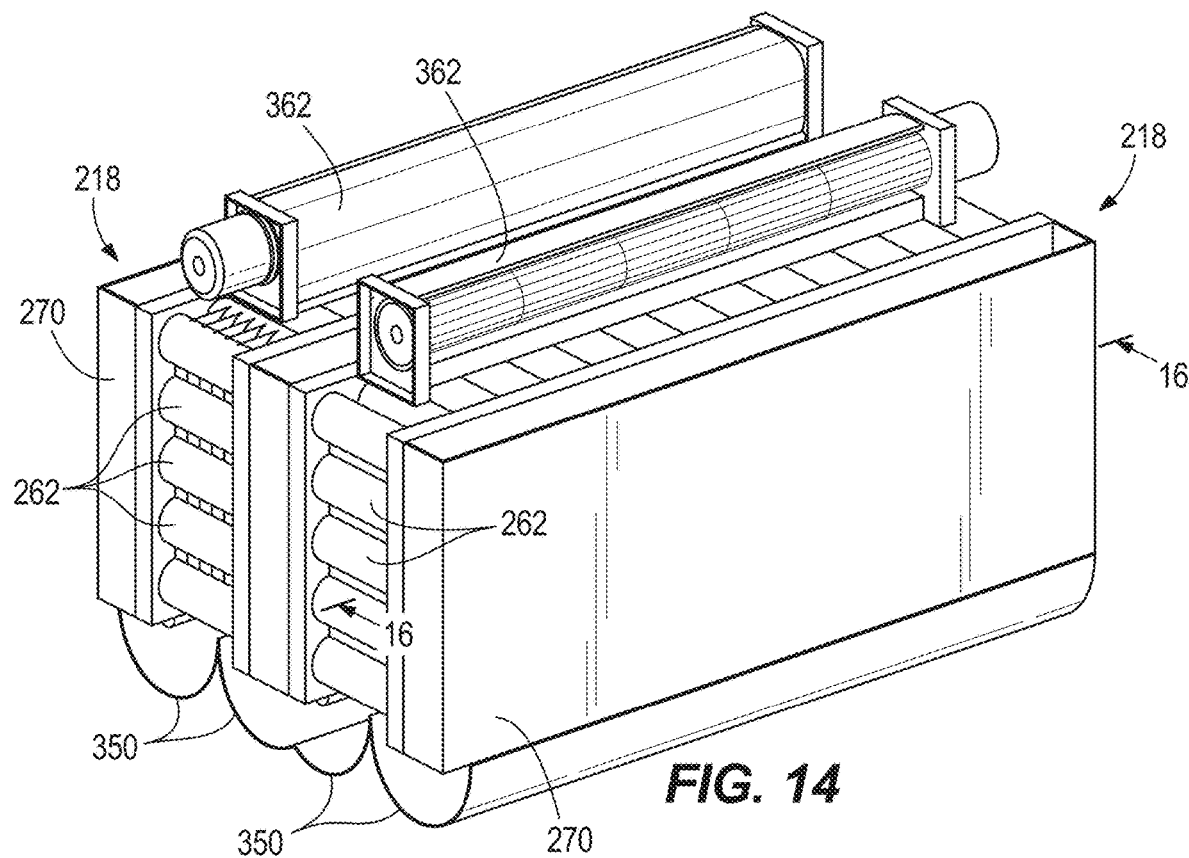
FIG. 14 is a perspective view of a portion of another battery pack assembly including a plurality of battery cell assemblies and a plurality of fans.
Figure 15:
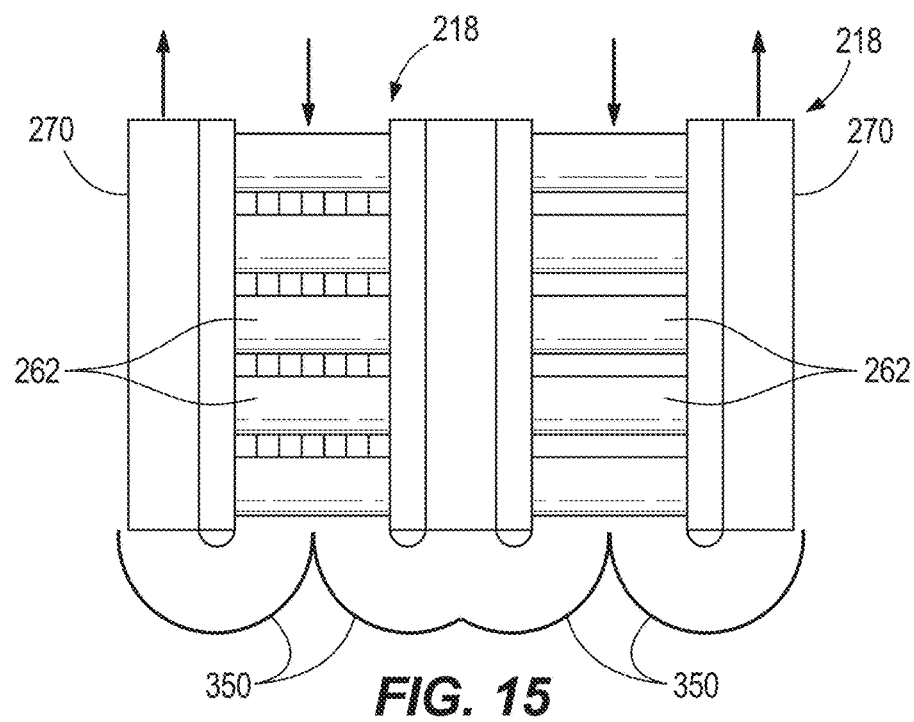
FIG. 15 is a side view of the portion of the battery pack assembly of FIG. 14 without the plurality of fans.
Figure 16:
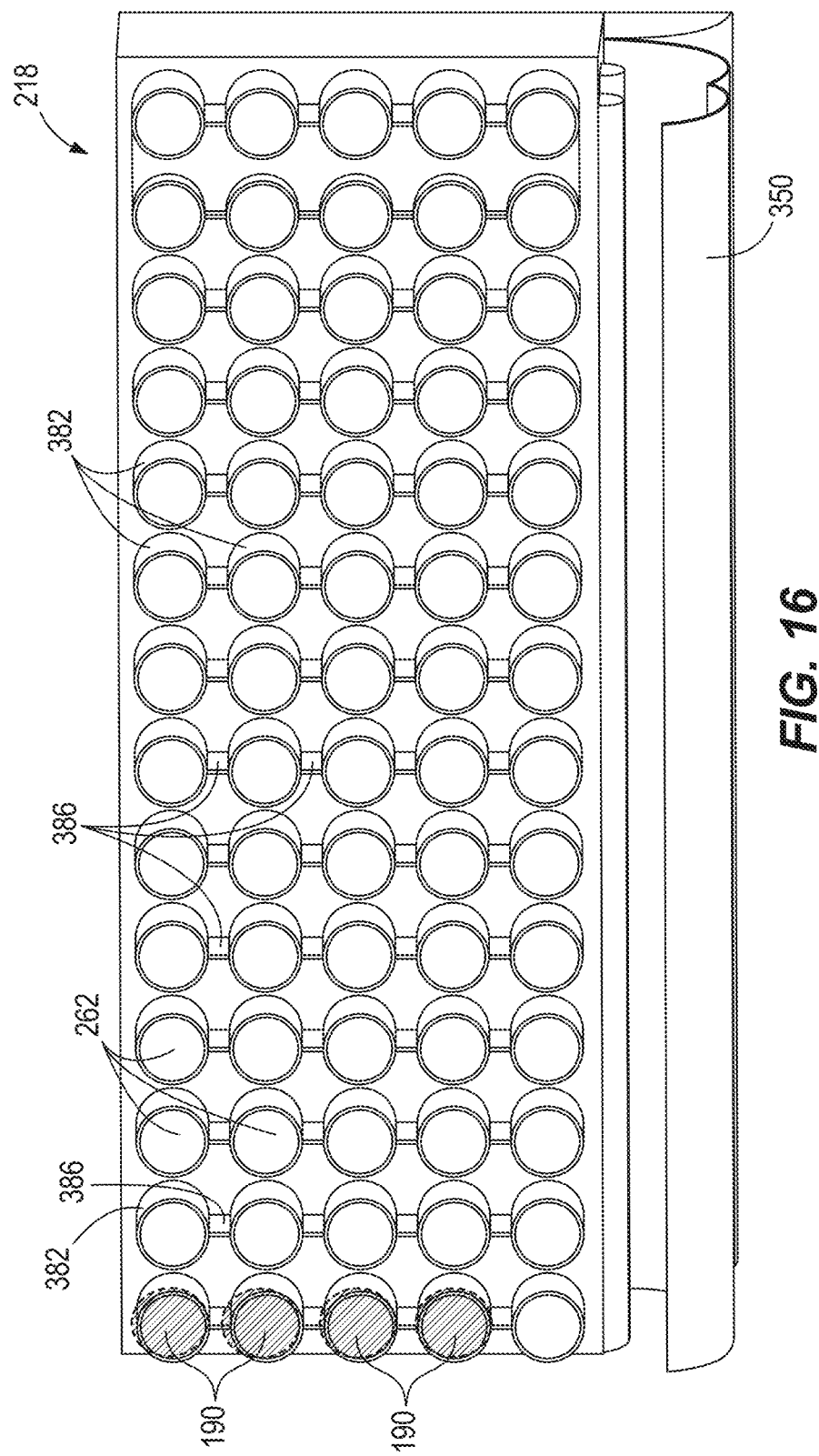
FIG. 16 is a cross-sectional view of the portion of the battery pack assembly of FIG. 15.

FIGS. 14-16 illustrate yet still another example of a portion of a battery pack assembly 210, with like components and features as the embodiment of the battery pack assembly 10 shown in FIGS. 1-4A being labeled with like reference numerals plus "200." Accordingly, the discussion of the battery pack assembly 10 above similarly applies to the battery pack assembly 210 and is not re-stated. In particular, FIGS. 14-16 illustrate an alternative configuration of the airflow tunnels 350 and plurality of fans 362 of the battery pack assembly 210. The airflow tunnels 350 are positioned on one side of the battery cell assemblies 218 and the fans 362 are positioned on another, opposite side. Each of the airflow tunnels 350 has a curvilinear shape for receiving airflow and guiding the airflow back toward the battery cells 262 of the battery pack assembly 210. The fans 362 are oriented to direct airflow through the battery cell assemblies 218 and toward the airflow tunnels 350. A crossflow airflow is created within the housing 214 of the battery pack assembly 210. In other words, each fan 362 is configured to cause the air to flow through the respective battery cell assembly 218 in a first direction and then is re-directed by the respective airflow tunnel 350 to flow through the respective battery cell assembly 218 in a second direction opposite the first direction.

Furthermore, with reference to FIG. 16, each battery cell row is spaced equidistantly from each other (rather than gaps 126 provided between some of the adjacent rows as in FIG. 4). Each of the battery cells 262 are positioned in a sleeve member 382. Ribs 386 extend between and connect the sleeve members 382. More specifically, each of the battery cells in a row are connected by the ribs 386. In other embodiments, all of the battery cells 362 of the battery cell assembly 218 are connected by the ribs 386. The sleeve members 382 and the ribs 386 are formed by a material. In the illustrated embodiment, the material is plastic.

The battery cells 262 are positioned in a metal or plastic sleeve 382 for sealing the battery cells 262 from the outside environment. In this configuration, the housing 14 or a portion thereof surrounding the battery cells 262 may not be sealed such that the fans 362 can exchange air from outside the battery pack assembly 310. In addition, the airflow tunnels 350 and the power routing (e.g., bus bars, cell headers etc.) may also be sealed but thermally coupled to airflow tunnels of the frame 270. This may inhibit or prevent damage to the battery cells 262 by the air flowing from the outside environment.

In other embodiments, the battery cells 262 are not in a metal or plastic sleeve but rather positioned in a sealed housing 14 as disclosed in FIGS. 1-4A. The crossflow fans 362 are then configured to circulate air internal to the sealed housing 14 of FIGS. 1-4A.

Figure 17:
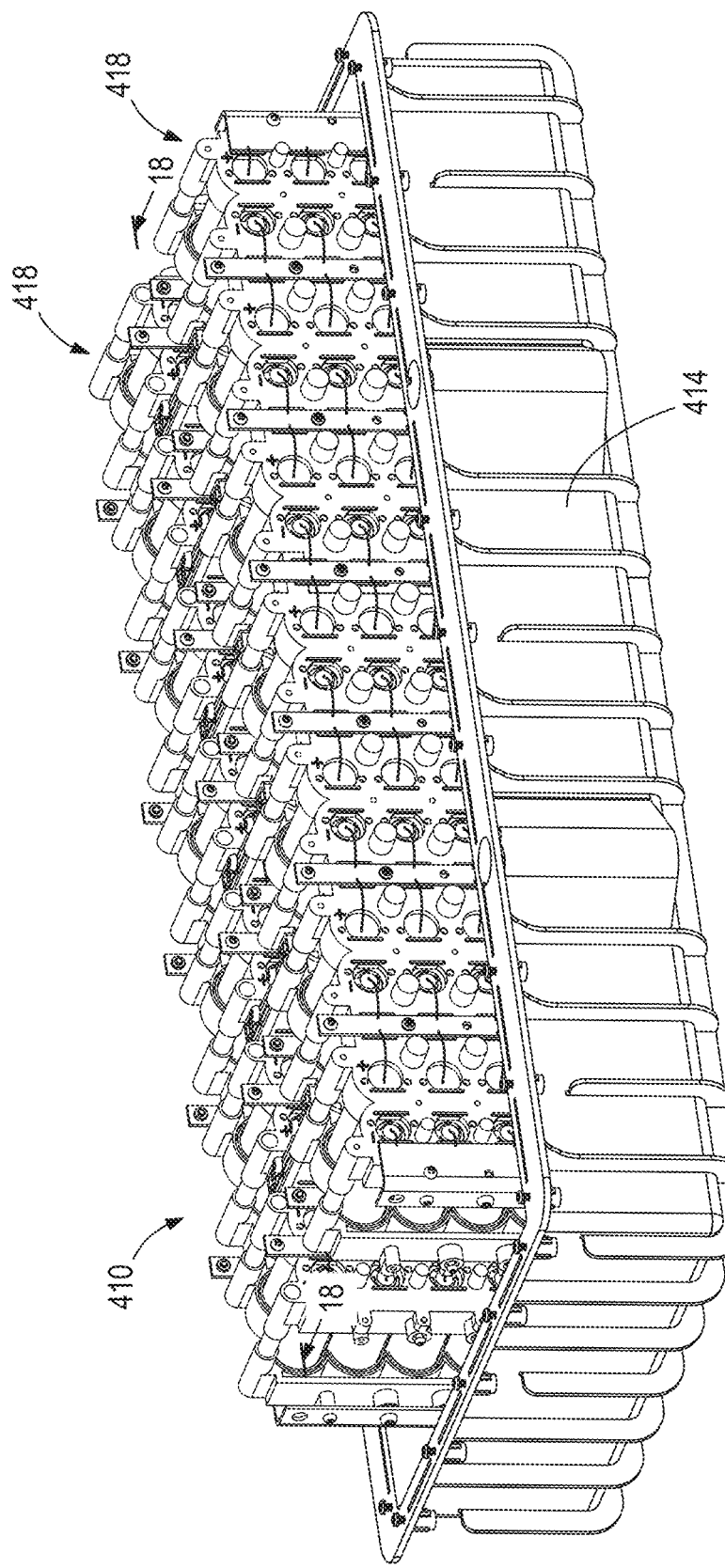
FIG. 17 is a perspective view of a portion of yet another battery pack assembly including a plurality of battery cell assemblies and thermally conductive material positioned in one of the battery cell assemblies.
Figure 18:
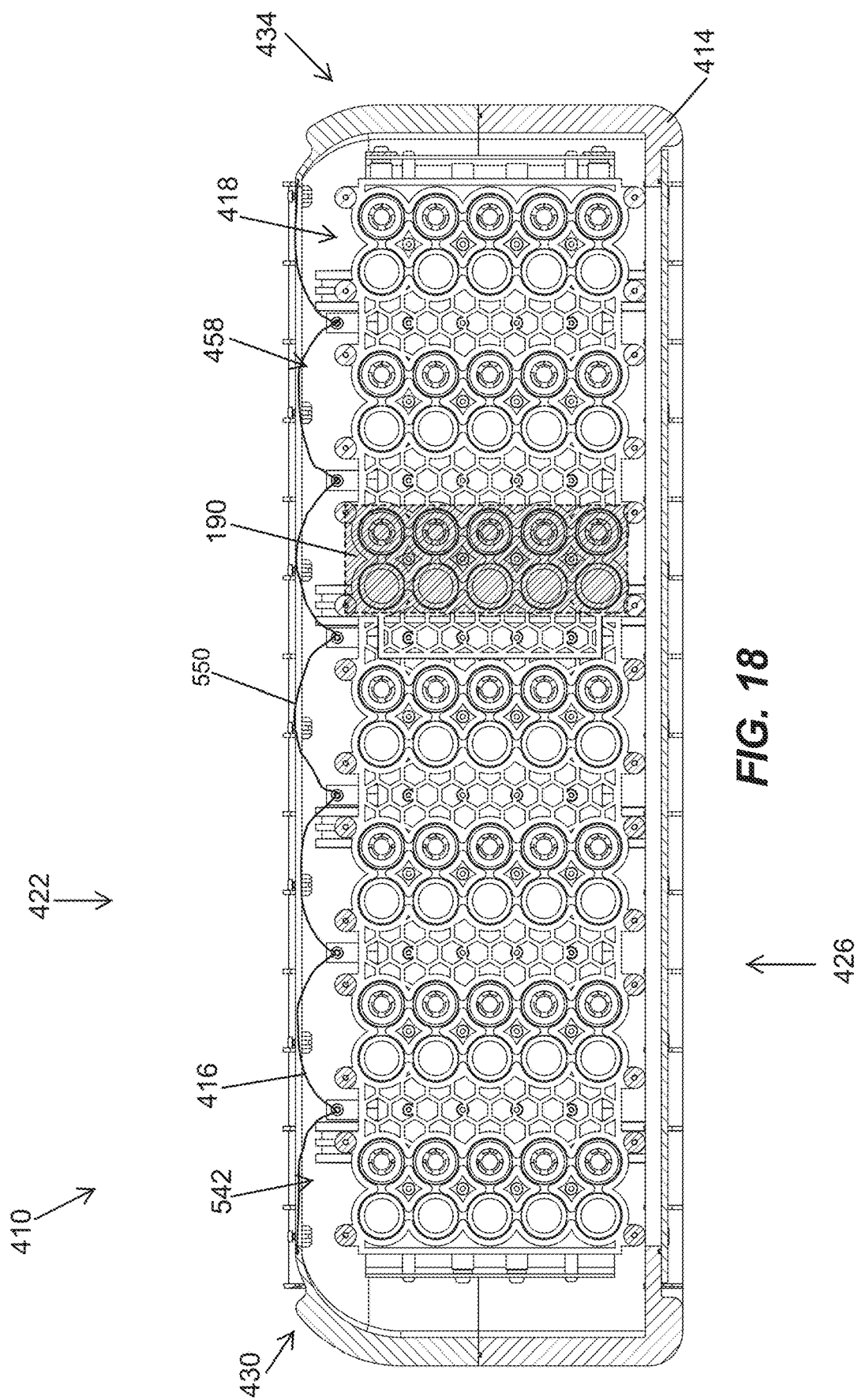
FIG. 18 is cross-sectional view of the portion of the battery pack assembly of FIG. 17 illustrating thermally conductive material positioned in one of the battery cell assemblies of FIG. 17.

FIGS. 17-18 illustrate yet still another example of a portion of a battery pack assembly 410, with like components and features as the embodiment of the battery pack assembly 10 shown in FIGS. 1-4A being labeled with like reference numerals plus "400." Accordingly, the discussion of the battery pack assembly 10 above similarly applies to the battery pack assembly 410 and is not re-stated. In particular, FIGS. 17-18 illustrate an alternative configuration of the airflow tunnels 550 which are coupled with an interior surface 416 of the housing 414 (FIG. 18). The illustrated airflow tunnels 550 are baffles that are integral with the top side 422 of the housing 414 and at least partially define one or more of the airflow channels 542. The airflow tunnels 550 have curvilinear surfaces. The airflow tunnels 550 are positioned within the internal cavity 458. The battery pack assembly 410 may further include additional airflow tunnels (not shown) similar to the airflow tunnels 150 of FIGS. 1-4A that are disposed on a side (e.g., bottom side 426) of the housing 414 opposite the airflow tunnels 550. Furthermore, one or more fans (e.g., fans 162 of FIGS. 1-4A) may be positioned in the internal cavity 458 and/or in one or more of the addition airflow tunnels.

FIGS. 19-22 illustrate another example of a battery pack assembly 610 including a plurality of battery cell assemblies 618, with like components and features as the embodiment of the battery pack assembly 10 shown in FIGS. 1-4A being labeled with like reference numerals plus "600." Accordingly, the discussion of the battery pack assembly 10 above similarly applies to the battery pack assembly 610 and is not re-stated. In particular, the differences in the housing and the frame are discussed herein.

Each battery cell assembly 618 includes a plurality of battery cells 662, a plurality of connectors 666, and a housing or frame 670 supporting the plurality of battery cells 662. The frame 670 includes a base portion 672 and a cover portion 676 coupled to the base portion 672. The base portion 672 and the cover portion 676 cooperatively define a portion of the internal cavity 658 of the battery pack assembly 610. The portions of the internal cavity 658 is divided into a plurality of sections 680.

Figure 21:
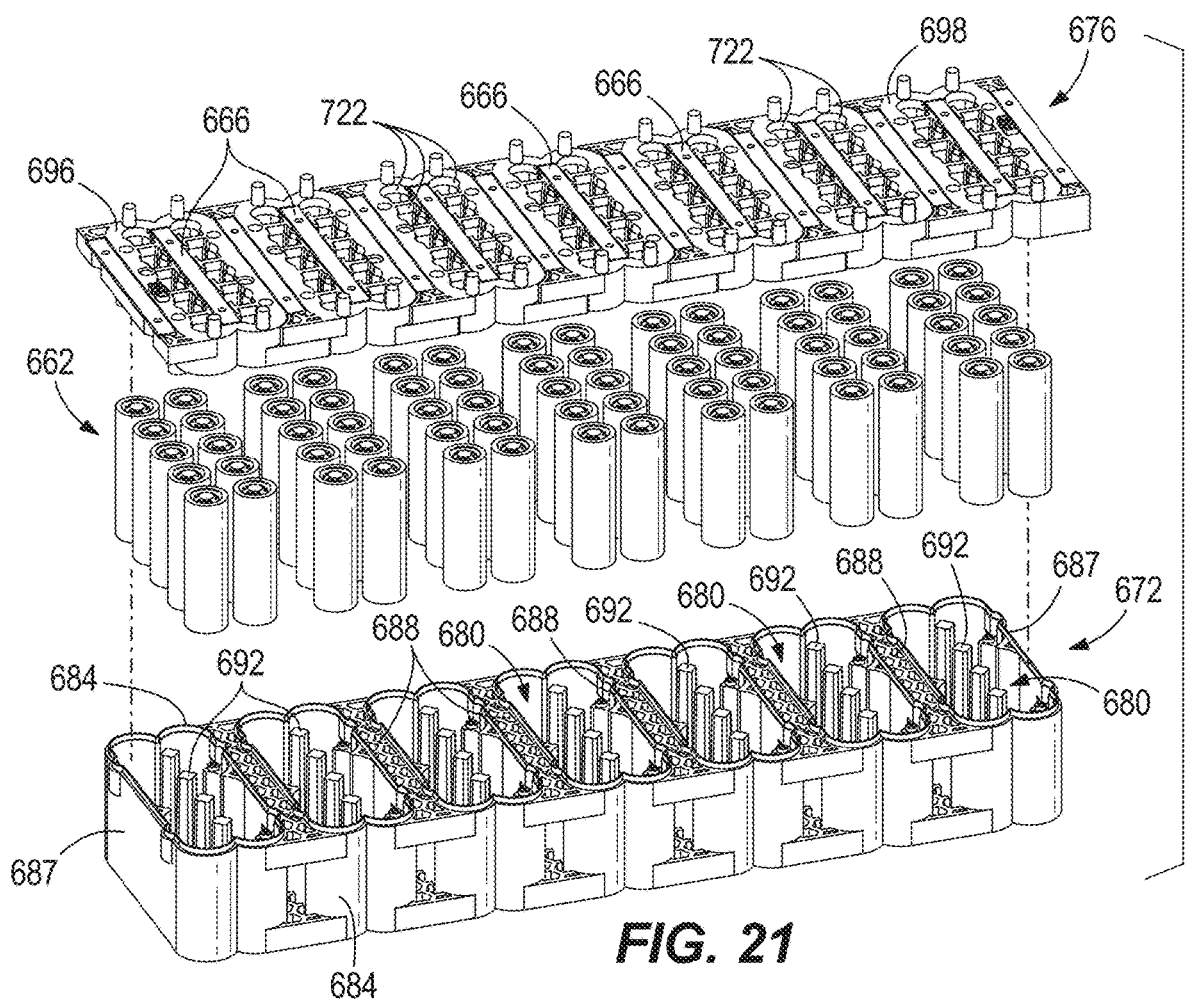
FIG. 21 is an exploded view of one of the battery cell assemblies of FIG. 19.

In the illustrated embodiment, the base portion 672 includes a plurality of outer walls 684, 685, 687 and a plurality of inner walls 688 (FIG. 21). The plurality of outer walls 684, 685, 687 includes first and second outer walls 684 that define the first and second edges 714, 718, respectively of the battery cell assembly 618. The plurality of outer walls 684, 685, 687 further includes a lateral wall 685 and first and second end walls 687. The plurality of inner walls 688 extend between the first and second outer walls 684. The inner walls 688 also extend from the lateral wall 685 toward the cover portion 676. The inner walls 688 divide the internal cavity 658 into the plurality of sections 680.

The base portion 672 further includes a plurality of projections 692 extending from the lateral wall 685 toward the cover portion 676. The projections 692 are positionable in each of the plurality of sections 680. In addition, the projections 692 are positionable between the plurality of battery cells 662 within the internal cavity 658. Each illustrated projection 692 has a generally diamond shaped cross-sectional shape. In other embodiments, the projections 692 may have other cross-sectional shapes such as rectangular, circular and the like, and some or all of the projections 692 may have the same or different shape. Each of the projections 692 extends parallel to each of the battery cells 662.

The cover portion 676 includes a body 696 and a plurality of openings 722 defined by the body 696. Each opening 722 is configured to align with one of the battery cells 662 within the internal cavity 658. As such, the cover portion 676 has the same number of openings 722 as the number of battery cells 662. The first end 678 of each of the battery cells 662 is received in the respective one of the openings 722. In addition, the body 696 has a surface 698, and the connectors 666 are supported by the surface 698.

Figure 19:
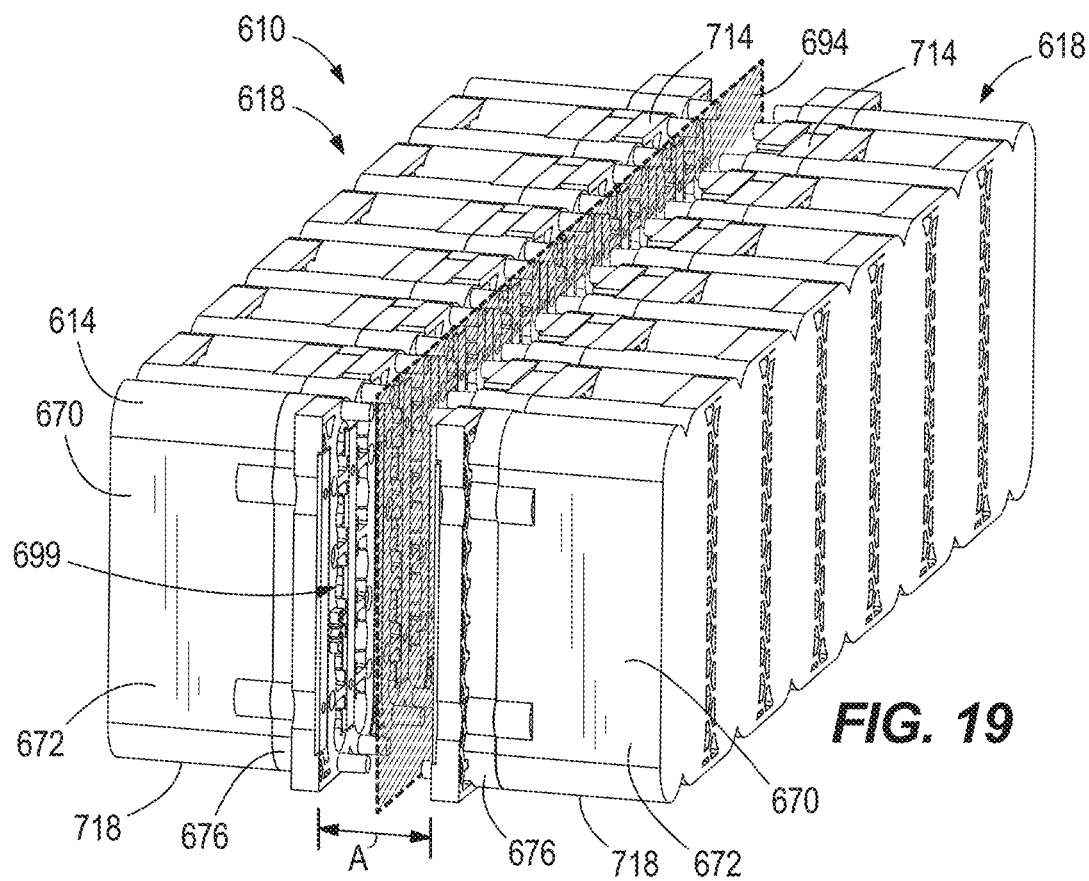
FIG. 19 is a perspective view of a plurality of battery cell assemblies according to another configuration and illustrating a first position of a printed circuit board.
Figure 20:
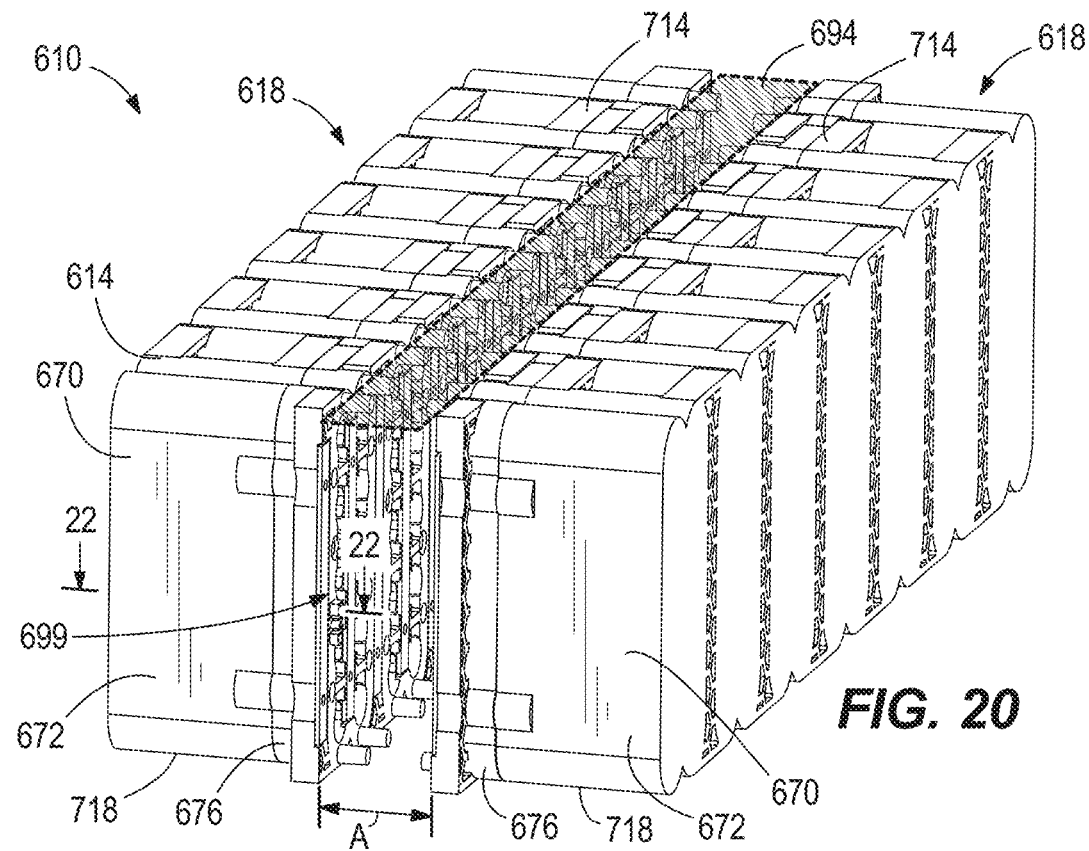
FIG. 20 is a perspective view of the plurality of battery cell assemblies of FIG. 19 illustrating a second position of a printed circuit board.

With particular reference to FIGS. 19 and 20, the battery pack assembly 10 includes two battery cell assemblies 618. The battery cell assemblies 618 are arranged such that the cover portions 676 are in facing relationship with each other. The battery cell assemblies 618 may be positioned such that the cover portions 676 are spaced by a predetermined distance A. The predetermined distance A is selected to form a space 699 between the battery cell assemblies 618.

Each battery cell assembly 618 forms a portion of the housing 614 of the battery pack assembly 610 (rather than being positioned in a housing as disclosed in the battery pack assembly 10 of FIGS. 1-4A). More specifically, the base portion 672 of each battery cell assembly 618 defines one or more sides of the housing 614. In the illustrated embodiment, each battery cell assembly 618 forms one half of the battery pack assembly 610. In addition, the space 699 is sealed to form a sealed area between the battery cell assemblies 618. The space 699 is configured to receive the electronics (e.g., PCB 694, the connectors 666 connecting the battery cells 662, and the like). Accordingly, a sealed enclosure is formed by the battery cell assemblies 618 and the sealed gap 699 therebetween.

The PCB 694 is positionable relative to the battery cell assemblies 618. In one example, as shown in FIG. 20, the PCB 694 is positioned in the space 699 and proximate the first edge 714 of each of the battery cell assemblies 618. In this embodiment, the PCB 694 extends laterally relative to the battery cell assemblies 618. In another example as shown in FIG. 19, the PCB 694 is positioned in the space 699 between the cover portions 676 of the battery cell assemblies 618, and extends parallel to the surface of the cover portions 676.

Figure 24:
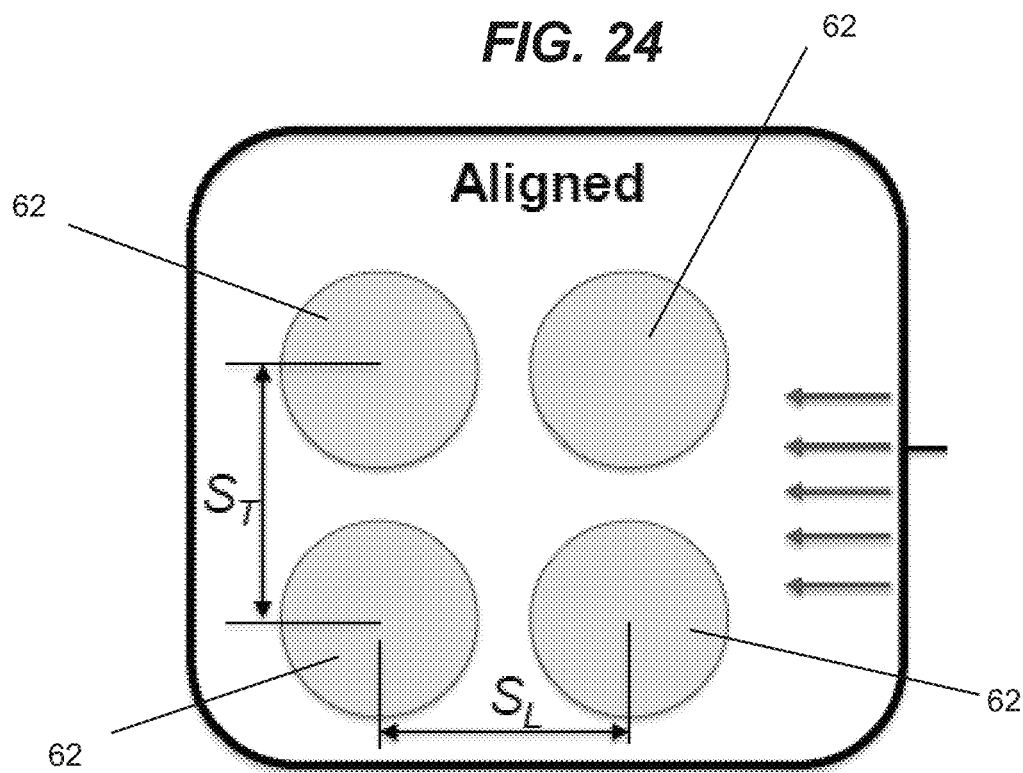
FIG. 24 is a schematic view of a portion of one of the battery cell assemblies of FIG. 3.
Figure 25:
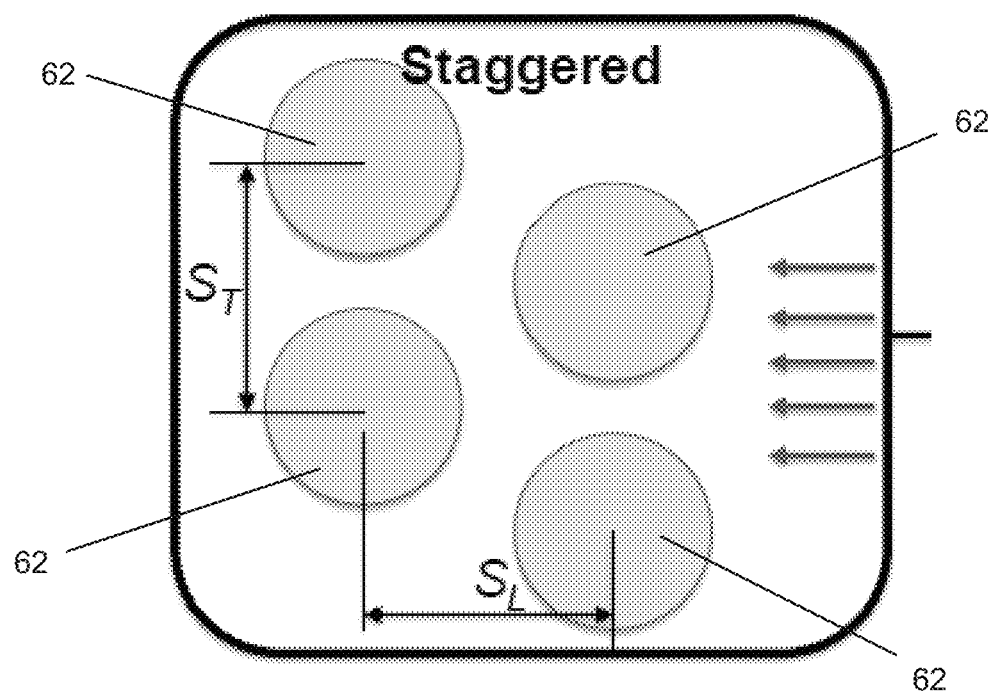
FIG. 25 is a schematic view of an alternative arrangement of the portion of one of the battery cell assemblies of FIG. 3.

FIGS. 24 and 25 schematically illustrates alternative arrangements of the battery cells 62 for the battery cell assembly 18. Each of the battery cells 62 are equidistantly spaced. As shown in FIG. 24, each of the adjacent rows are aligned such that the battery cells 62 are aligned in one or more of a longitudinal direction (parallel to the longitudinal axis 46), a vertical direction, and a lateral direction (parallel to the lateral axis 50). In contrast, as shown in FIG. 25, each of the adjacent rows are staggered such that the battery cells 62 are offset relative to each other. This may affect the direction of airflow through the housing 14.

Figure 26:
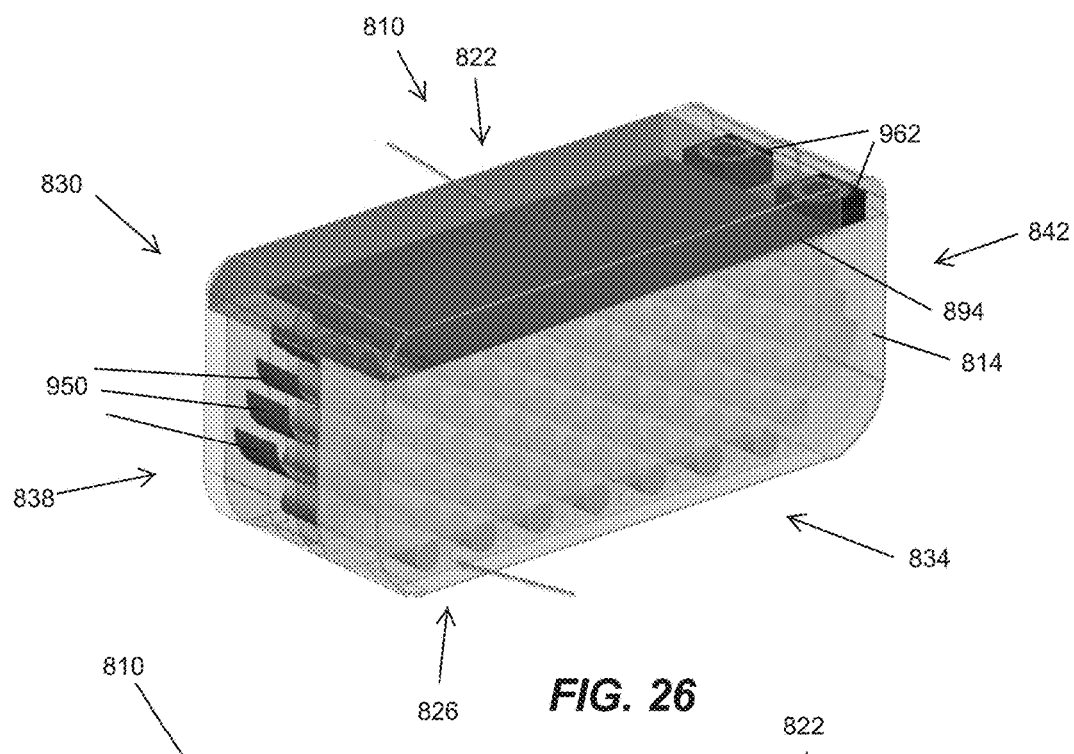
FIG. 26 is a perspective view of another battery pack assembly including a plurality of battery cell assemblies and a plurality of fans.
Figure 27:
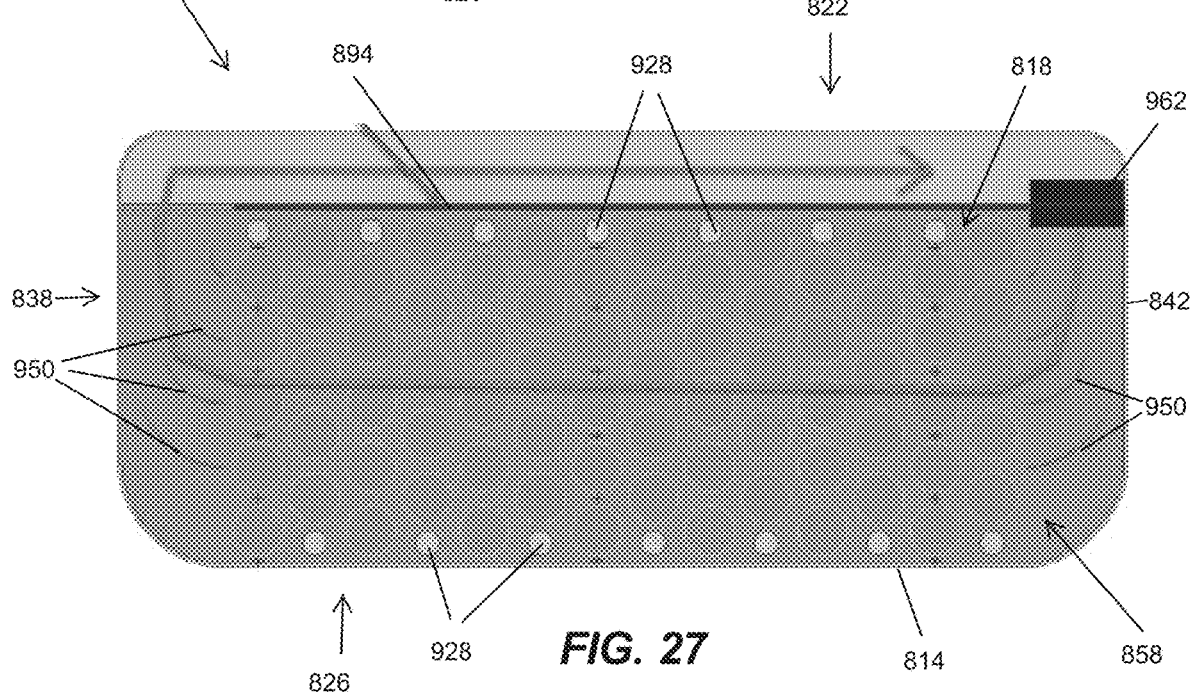
FIG. 27 is a cross-sectional view of the battery pack assembly of FIG. 26.
Figure 28:
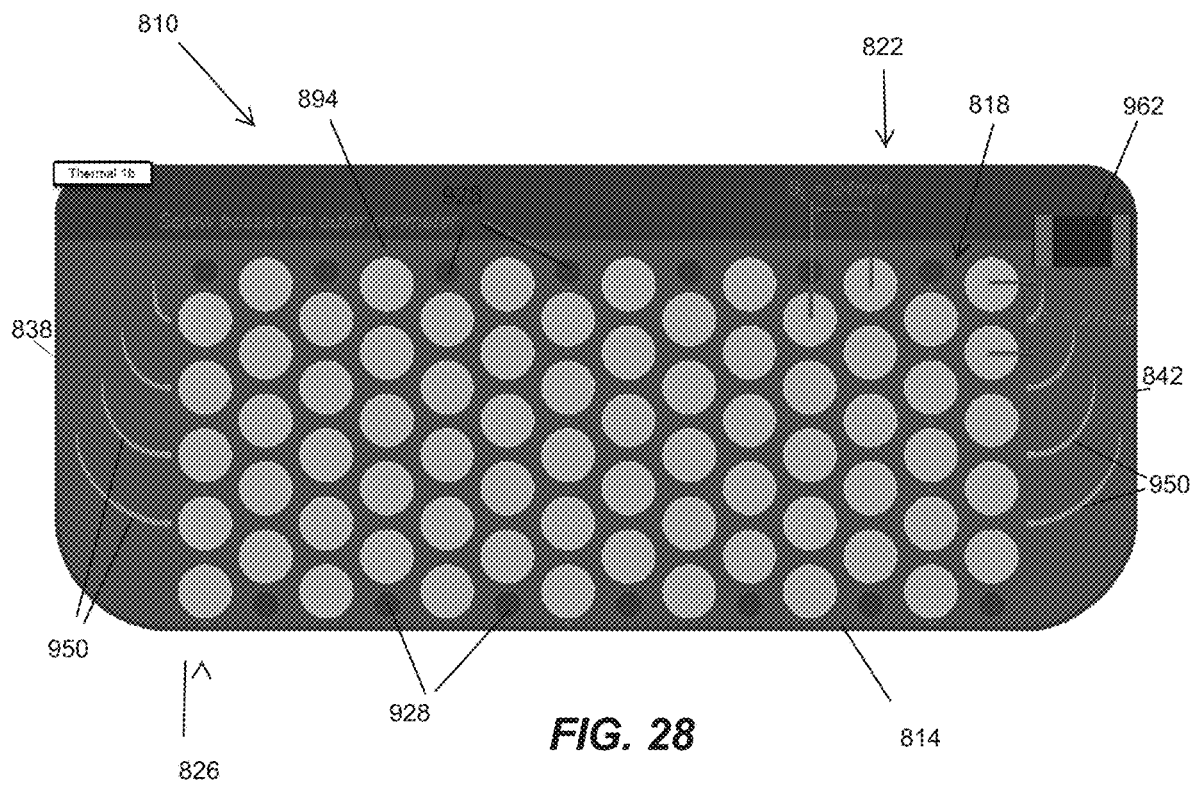
FIG. 28 is another is a cross-sectional view of the battery pack assembly of FIG. 26.
Figure 29:
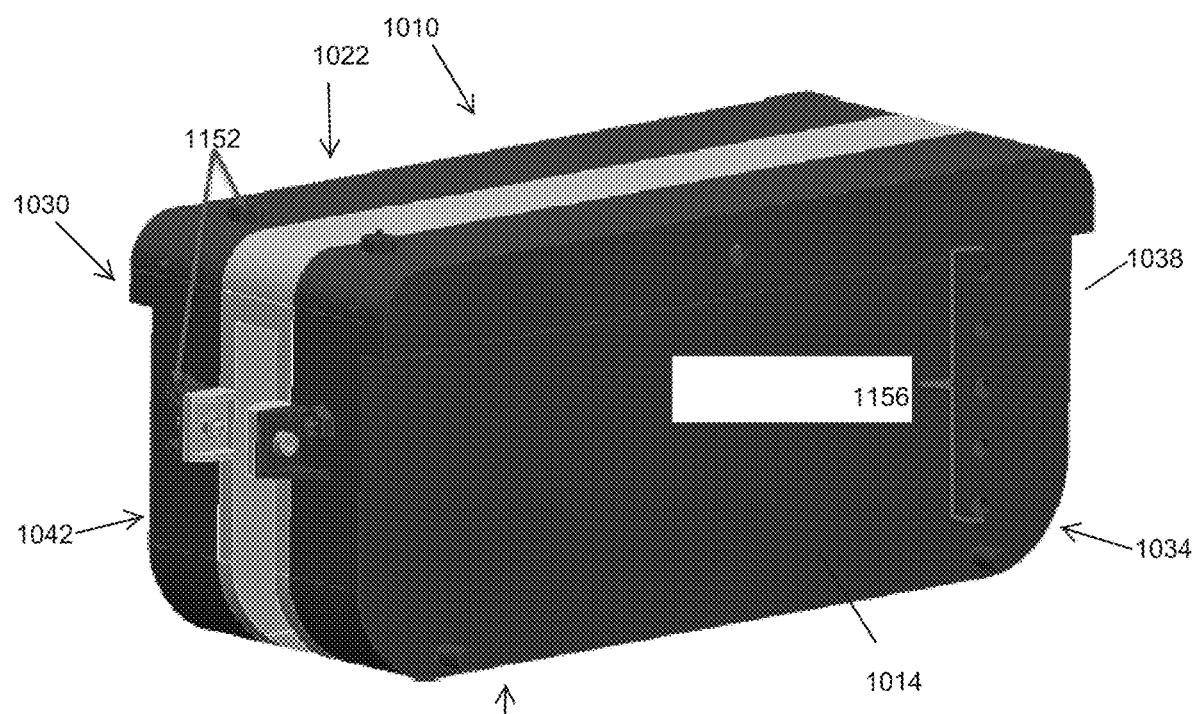
FIG. 29 is a perspective view of another example of the battery pack assembly of FIG. 26.
Figure 30:
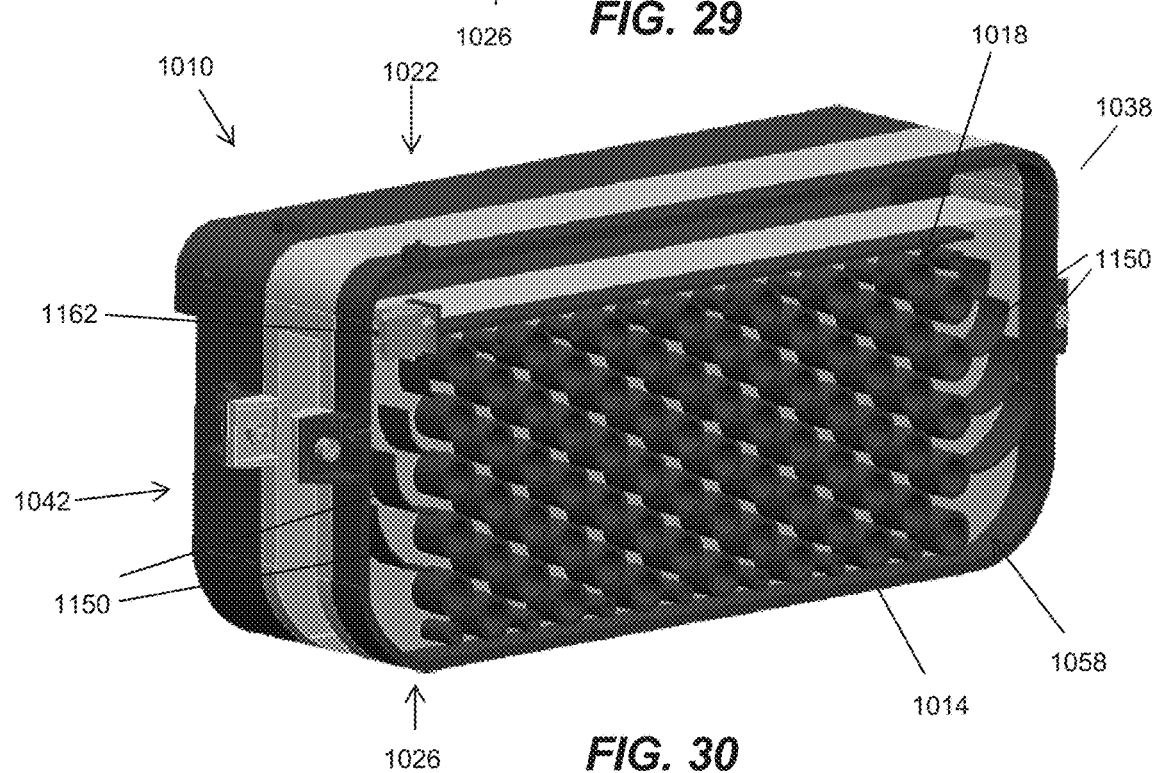
FIG. 30 is a perspective cross-sectional view of the battery pack assembly of FIG. 29.
Figure 31:
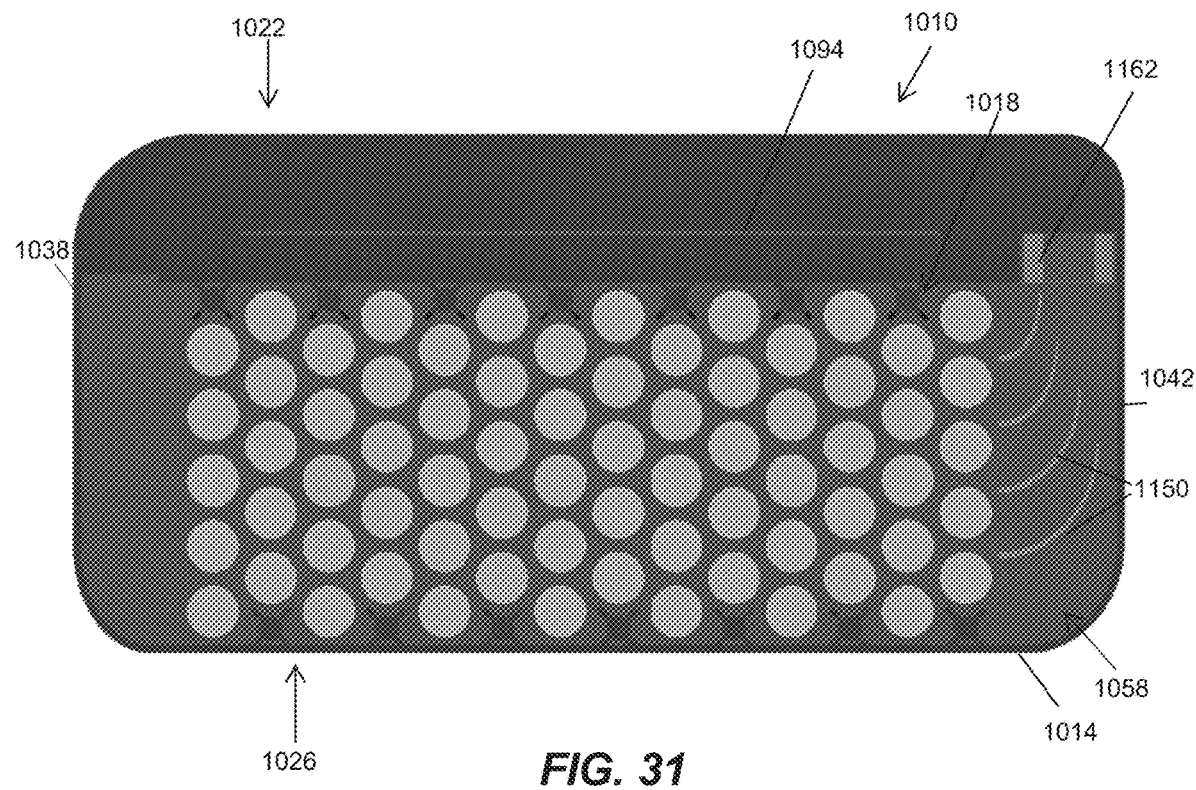
FIG. 31 is a cross-sectional view of yet another example of the battery pack assembly of FIG. 26.

FIGS. 26-28 illustrate another example of a battery pack assembly 810, with like components and features as the embodiment of the battery pack assembly 10 shown in FIGS. 1-4A being labeled with like reference numerals plus "800." Accordingly, the discussion of the battery pack assembly 10 above similarly applies to the battery pack assembly 810 and is not re-stated. In particular, FIGS. 26-28 illustrate the staggered arrangement of the rows of the battery cells 862 as shown in FIG. 25. In addition, FIGS. 26-28 illustrate an alternative position of the fans 962 proximate one end (the second end 842) and the top side 822 within the housing 814. Furthermore, FIGS. 26-28 illustrate an alternative configuration of the airflow tunnels 950 (i.e., baffles) which each has a curvilinear shape for directing the airflow along the flow path through the housing 814. In addition, the airflow tunnels 950 are positioned proximate each end 838 and 842 within the housing 814. The fans 962 are oriented to direct airflow toward the airflow tunnels 950 proximate one end 842 for directing the airflow through the battery cell assemblies 818. The airflow tunnels 950 may be coupled to or otherwise integrated with the housing 814. The airflow tunnels 950 are positioned within the internal cavity 858.

With particular reference to FIG. 28, the housing 814 may include screw bosses 928 positioned on an outer perimeter of the battery cells 862. The PCB 894 is s positioned between a top-most edge of each of the battery cell assemblies 818 and the top side 822 of the housing 814. The fans 962 are positioned between an edge of the PCB 894 and the end 842 of the housing 814.

FIGS. 29-32 illustrate another example of a battery pack assembly 1010, with like components and features as the embodiment of the battery pack assembly 10 shown in FIGS. 1-4A being labeled with like reference numerals plus "1000." Accordingly, the discussion of the battery pack assembly 10 above similarly applies to the battery pack assembly 1010 and is not re-stated. Similar to the embodiment of FIGS. 26-28, the embodiment of FIGS. 29-32 also illustrates the staggered arrangement of the rows of the battery cells 1062 as shown in FIG. 25, the alternative position of the fans 1162 proximate one end (the second end 1042) and the top side 1022 within the housing 1014, and the airflow tunnels 1150 (i.e., baffles). The fans 1162 are oriented to direct airflow toward the airflow tunnels 1150 proximate the one end 1042 for directing the airflow through the battery cell assemblies 1018. The airflow tunnels 1150 may be coupled to or otherwise integrated with the housing 1014. The airflow tunnels 1150 are positioned within the internal cavity 1058. Furthermore, the PCB 1194 (FIG. 31) is positioned between a top-most edge of each of the battery cell assemblies 1018 and the top side 1022 of the housing 1014. The fans 1162 (only one of which is shown) are positioned between an edge of the PCB 1094 and the end 1042 of the housing 1014.

The battery pack assembly 1010 further includes a plurality of ports 1152, 1156. In the illustrated embodiment, the battery pack assembly 1010 includes a first plurality of ports 1152 and a second plurality of ports 1156. Each of the ports 1152, 1156 is defined by the housing 1014. The first plurality of ports 1152 are static pressure ports and the second plurality of ports 1156 are velocity ports. The fans 1162 are spaced away from the second plurality of ports 1156 within the housing 1014. Each of the ports 1152, 1156 is adjustable to selectively fluidly communicate the internal cavity 1058 with the external of the battery pack assembly 1010.

Figure 32:
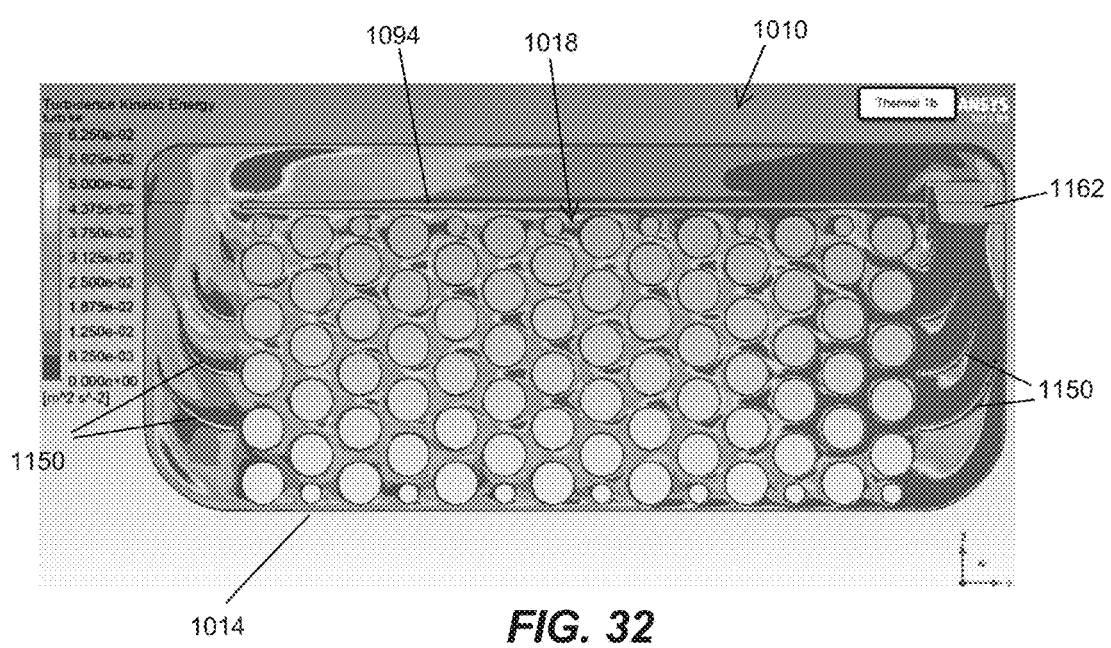
FIG. 32 is another cross-sectional view of the battery pack assembly of FIG. 29 illustrating kinetic energy of airflow flowing along an airflow path within the housing.
Figure 33:
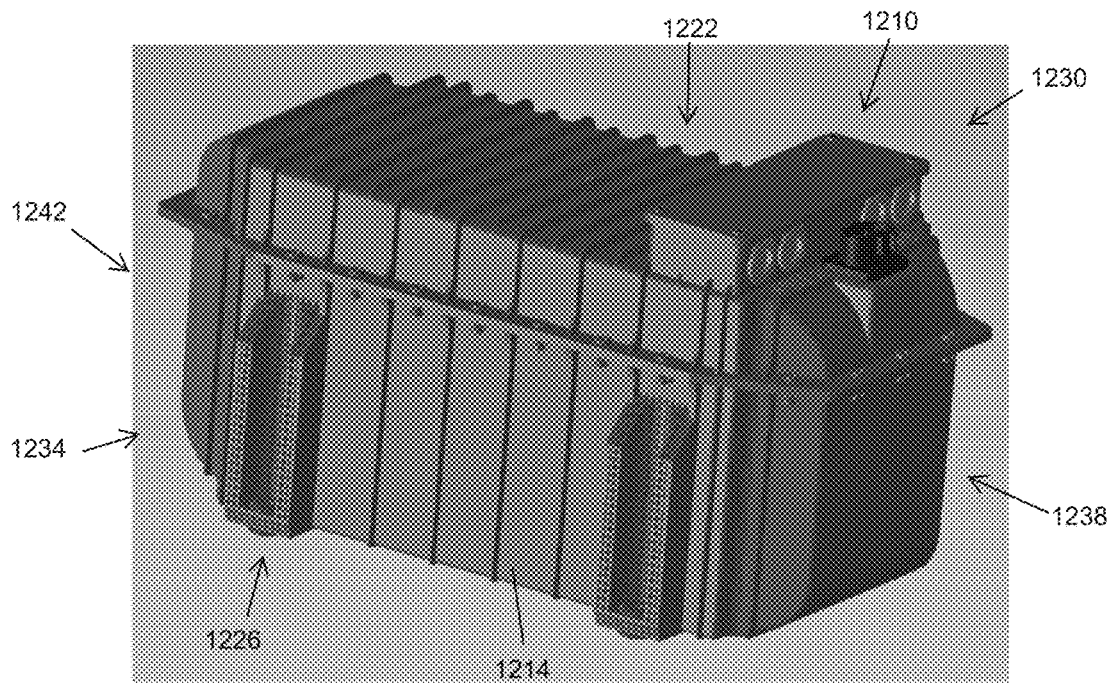
FIG. 33 is a perspective view of yet still another battery pack assembly.
Figure 34:
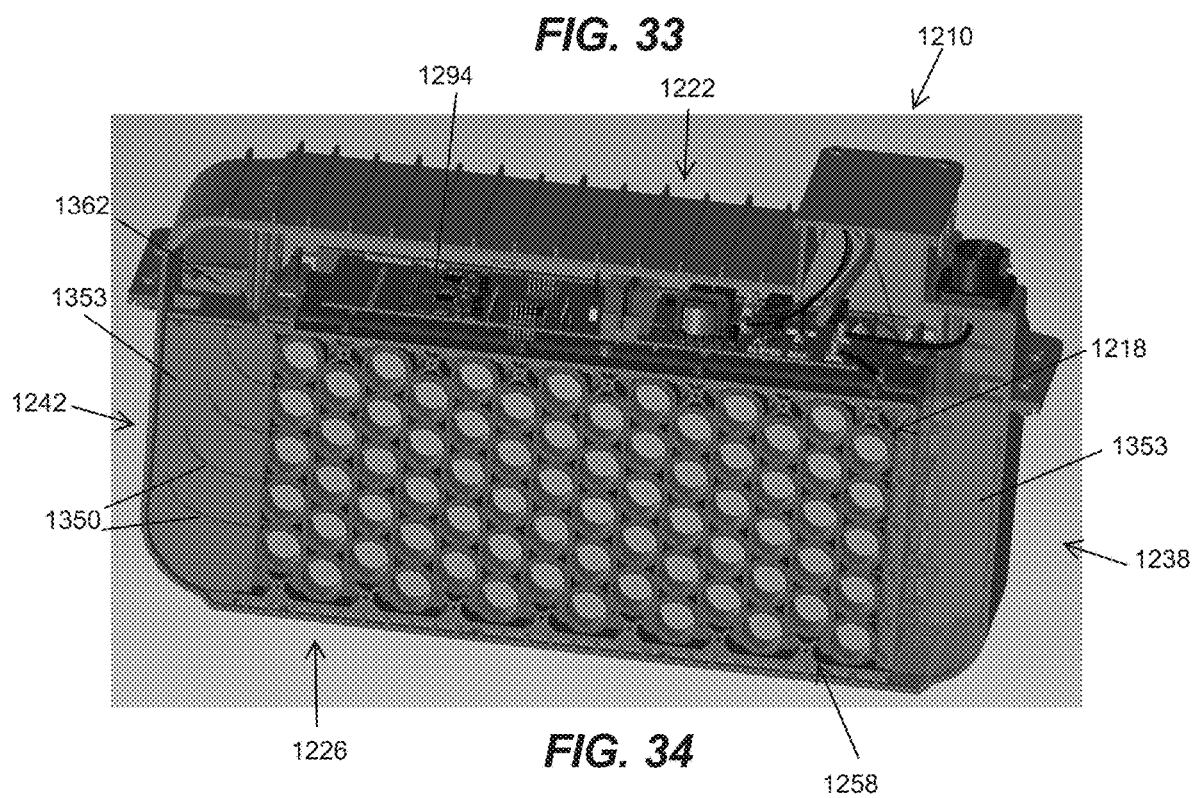
FIG. 34 is a perspective cross-sectional view of the battery pack assembly of FIG. 33.
Figure 35:
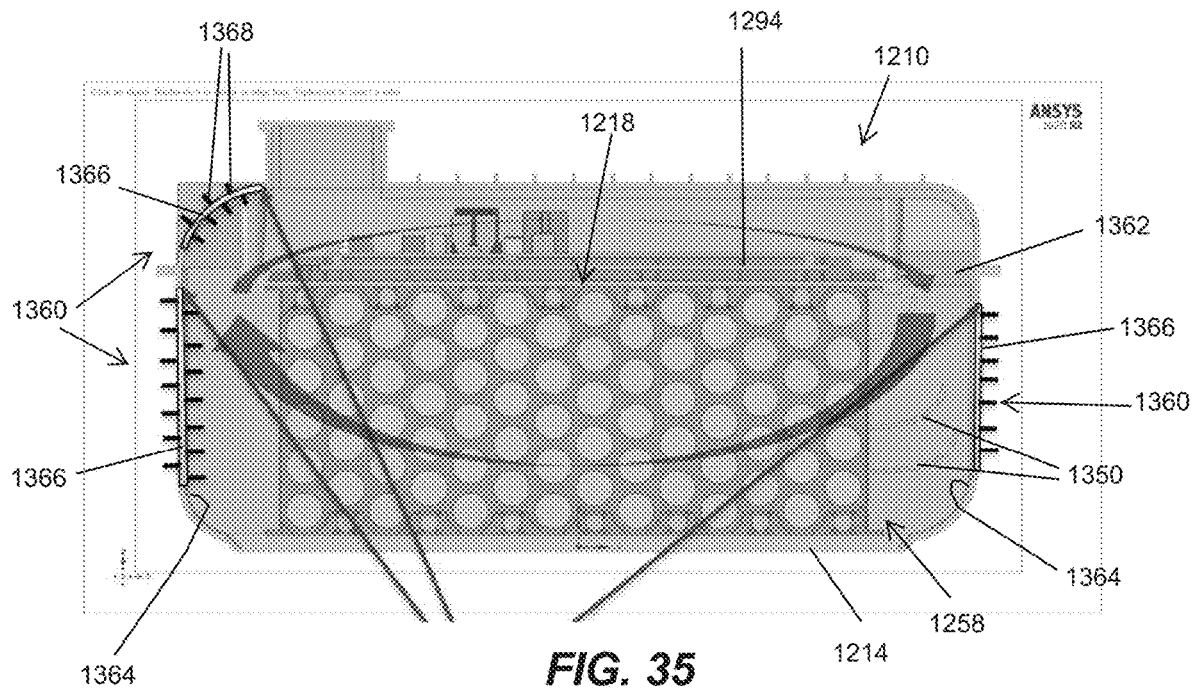
FIG. 35 is a cross-sectional view of the battery pack assembly of FIG. 33.
Figure 36:
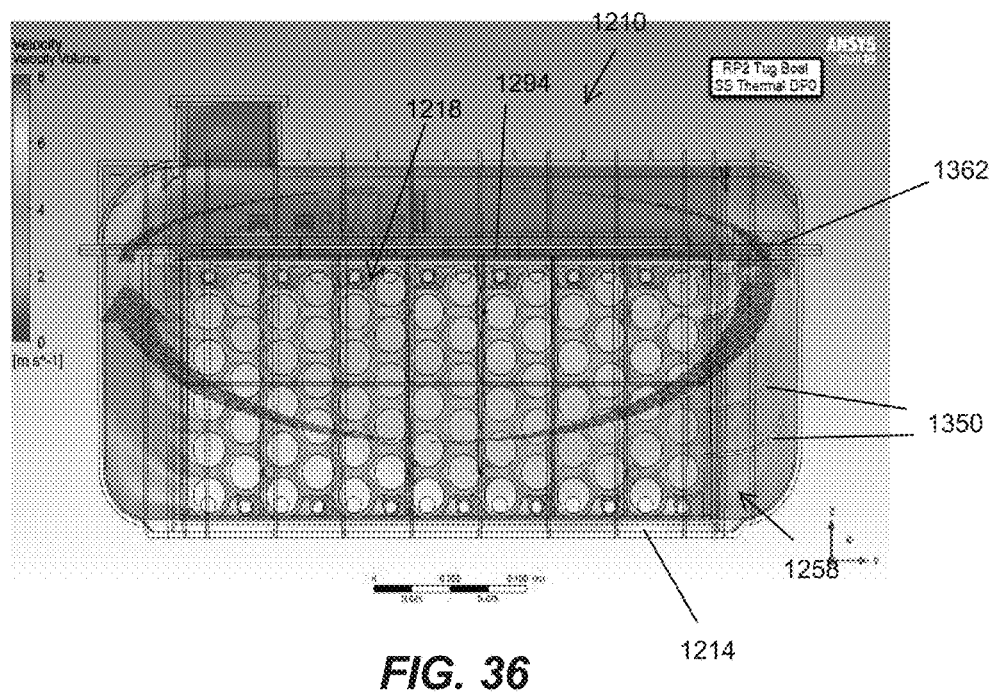
FIG. 36 is another cross-sectional view of the battery pack assembly of FIG. 33 illustrating an airflow velocity magnitude of air flowing along an airflow path within the housing.

FIG. 32 illustrates an intensity of the air's turbulent energy spatially through the steady state airflow.

FIGS. 33-36 illustrate another example of a battery pack assembly 1210, with like components and features as the embodiment of the battery pack assembly 10 shown in FIGS. 1-4A being labeled with like reference numerals plus "1200." Accordingly, the discussion of the battery pack assembly 10 above similarly applies to the battery pack assembly 1210 and is not re-stated. Similar to the embodiment of FIGS. 26-28 and the embodiment of FIGS. 29-32, the embodiment of FIGS. 33-36 also illustrates the staggered arrangement of the rows of the battery cells 1262 as shown in FIG. 25, the alternative position of the fans 1362 proximate one end (the second end 1242) and the top side 1222 within the housing 1214, and the airflow tunnels 1350 (i.e., baffles). The battery pack assembly 1210 may include additional airflow guide members 1353 within the housing 1214 and positioned between an end of the battery cell assembly 1218 and the respective end 1238, 1242 of the housing 1214. The baffles 1350 may be positioned in the guide members 1353. Furthermore, similar to the embodiment of FIGS. 26-28 and the embodiment of FIGS. 29-32, the embodiment of FIGS. 33-36 further illustrates the PCB 1394 (FIG. 34) is positioned between a top-most edge of each of the battery cell assemblies 1218 and the top side 1222 of the housing 1214. The fans 1362 (only one of which is shown) are positioned between an edge of the PCB 1294 and the end 1242 of the housing 1214.

The battery pack assembly 1210 further includes a plurality of heat sinks 1360 (FIGS. 35-36) coupled to or otherwise integrated with an interior of the housing 1214. In the illustrated embodiment, an interior surface 1364 of one or more of the walls of the housing 1214 includes the heat sinks 1360. Each of the illustrated heat sinks 1360 includes a plate member 1366 having a plurality of fins 1368 extending therefrom. In addition, each of the illustrated heat sinks 1360 is made by insert molded aluminum stamping. Each of the heat sinks 1360 is configured to thermally conduct heat from the internal cavity 1258 to the housing 1214.

Figure 37:
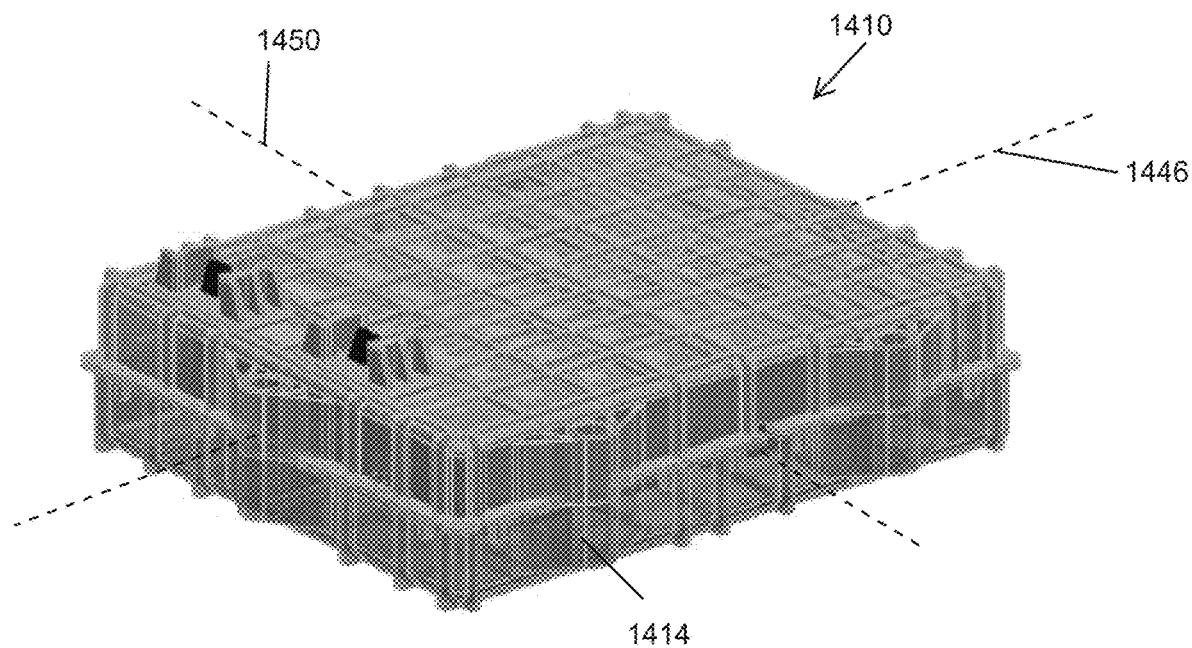
FIG. 37 is a perspective view of another battery pack assembly.
Figure 38:
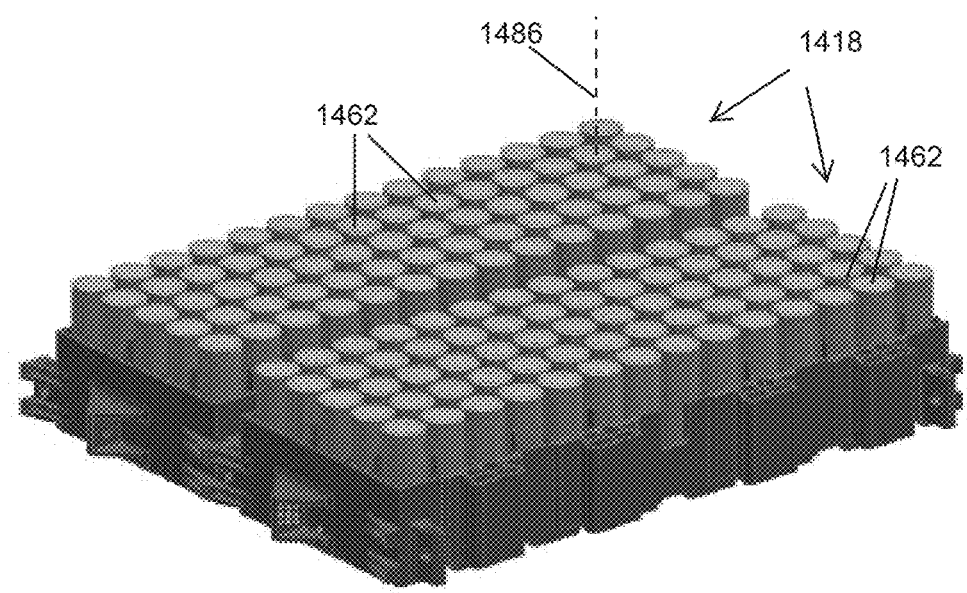
FIG. 38 is a plurality of battery cell assemblies positionable in a housing of the battery pack assembly of FIG. 37.

FIGS. 37-39 illustrate another example of a battery pack assembly 1410, with like components and features as the embodiment of the battery pack assembly 10 shown in FIGS. 1-4A being labeled with like reference numerals plus "1400." Accordingly, the discussion of the battery pack assembly 10 above similarly applies to the battery pack assembly 1410 and is not re-stated. The embodiment of FIGS. 37-39 illustrate each of the battery cell assemblies 1418 positioned within the housing 1414 such that the battery cell axis 1486 of each respective battery cell 1462 extends perpendicular to the longitudinal axis 1446 and perpendicular to the lateral axis 1450 within the internal cavity 1458. In other words, the battery cells 1462 extend vertically within the housing 1414.

FIG. 40 illustrates another example of the battery pack assembly 810 of FIGS. 26-28, with like components and features as the embodiment of the battery pack assembly 810 shown in FIGS. 26-28 being labeled with like reference numerals plus "A." Accordingly, the discussion of the battery pack assembly 810 above similarly applies to the battery pack assembly 810A and is not re-stated. The embodiment of FIG. 40 illustrates an alternative position of the fan 962A in a middle or center relative to the battery cells 862A. In addition, the baffles 950 are positioned in the center between the battery cells 862A to divide the airflow from the fan 962A in opposite directions toward two separate battery cell assemblies 818A positioned on opposite sides within the housing 814.

Each of the battery pack assemblies 10, 210, 410, 610, 810, 1010, 1210, 1410 is a sealed enclosure, and heat generated by the battery cells 62, 262, 462, 662, 862, 1062, 1262, 1462 is configured to be transferred from within the internal cavity 58, 258, 458, 658, 858, 1058, 1258, 1458 to the housing 14, 214, 414, 614, 814, 1014, 1214, 1414 of the battery pack assembly 10, 210, 410, 610, 810, 1010, 1210, 1410. In some embodiments, the housing 14, 214, 414, 614, 814, 1014, 1214, 1414 is made by plastic, and the heat is transferred to the plastic housing 14, 214, 414, 614, 814, 1014, 1214, 1414.

Figure 41:
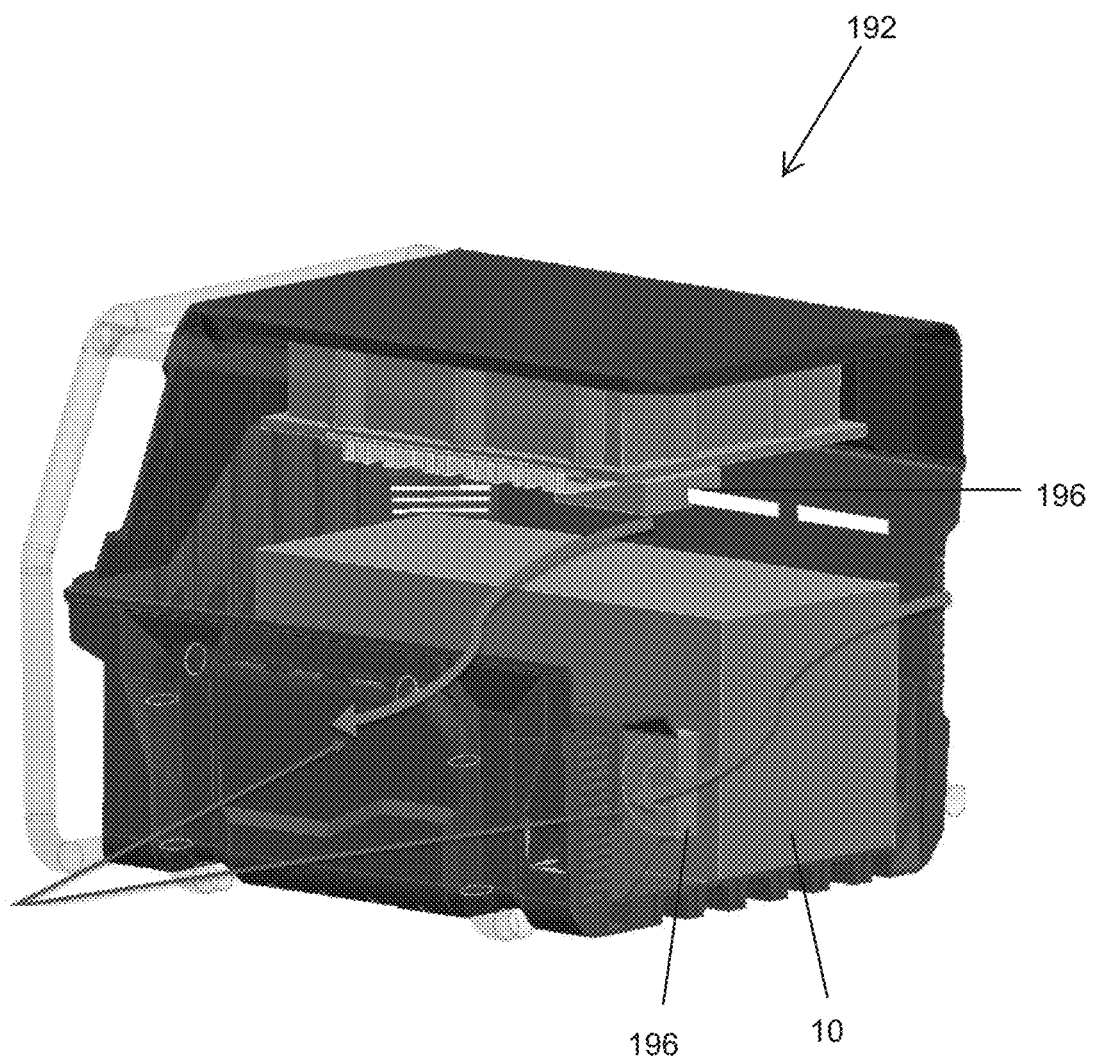
FIG. 41 is a perspective view of a system configured to receive one of the battery pack assemblies.

With reference to FIG. 41, the sealed battery pack assembly 10, 210, 410, 610, 810, 1010, 1210, 1410 may be positioned in a system 192. The system 192 may or may not be sealed. Fans 196 of the system 192 may be positioned external to the sealed battery pack assembly 10, 210, 410, 610, 810, 1010, 1210, 1410 for directing airflow over the sealed battery pack assembly 10, 210, 410, 610, 810, 1010, 1210, 1410 (e.g., the lateral sides and top sides), for transferring heat from the housing 14, 214, 414, 614, 814, 1014, 1214, 1414 to external of the housing 14, 214, 414, 614, 814, 1014, 1214, 1414.

Figure 22:
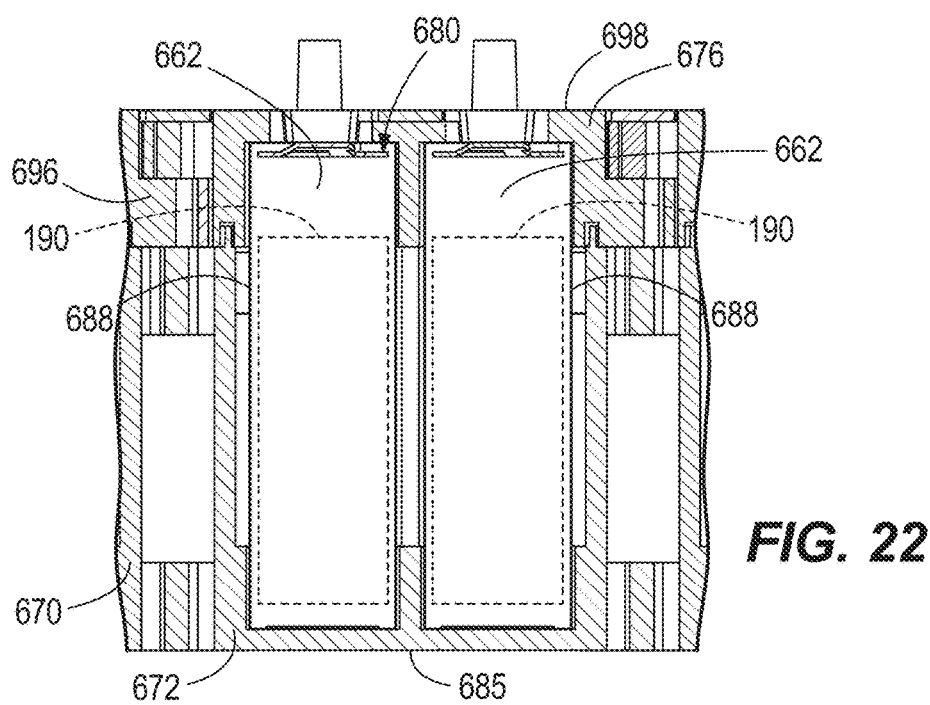
FIG. 22 is a cross-sectional view of a portion of one of the plurality of battery cell assemblies illustrating thermally conductive material positioned in the one of the plurality of battery cell assemblies.

Furthermore, with reference to FIGS. 9, 16, 18, and 22, the battery pack assembly 10, 10', 10", 10''', 210, 410, 610 is configured to receive a fluid 190 such as during assembly of the battery cell assembly 18. The fluid 190 comprises a thermally conductive material having adhesive properties such as gap filler, potting, encapsulant, or an adhesive material (e.g., glue) that is thermally conductive. In the illustrated embodiment, the fluid 190 is thermally conductive silicone. With reference to FIGS. 9 and 18, each battery cell row of the battery cell assembly 18, 418 is configured to receive the fluid 190 (only one row being shown to receive the fluid 190). The fluid 190 is configured to fill the space defined by the battery cell rows of the battery cell assembly 18, 418 not taken up by the respective battery cells 62, 462. The rows are separated by the gaps 126, 526 provided within the battery cell assemblies 18, 418. With reference to FIG. 16, the fluid 190 is configured to be received in each sleeve member 382 of the respective battery cell 262. As such, the fluid 190 is positioned between the battery cell 262 and an inner surface of the respective sleeve member 382. With reference to FIG. 22, the fluid 190 is configured to be received in one or more of the sections 680 of the internal cavity 658. More specifically, the fluid 190 is configured to be positioned between adjacent inner walls 688 of the base portion 672 of the frame 670.

The fluid 190 is positioned to contact each of the battery cells 62, 262, 462, 662 within the battery cell rows. Once hardened, the adhesive material is configured to facilitate heat transfer away from the battery cells 62, 262, 462, 662. In particular, in some of the illustrated embodiments, the adhesive material is positioned to direct the heat produced by the battery cells 62, 262, 462, 662 toward the gaps 126, 526 and/or the first and second ends 78, 82 of the battery cells 62, 262, 462, 662. As such, the primary dissipation of heat is axially along the battery cell axis 86 of the respective battery cell 62, 262, 462, 662.

In operation, one or a combination of the airflow produced by the plurality of fans 162, 362, 962, 1162, 1362 and the adhesive material 190 is configured to facilitate transfer of the heat away from the battery cells 62, 262, 462, 662, 862, 1062, 1262, 1462. More specifically, when the battery pack assembly 10 is being discharged, the heat generated by the battery cells 62, 262, 462, 662, 862, 1062, 1262, 1462 is directed via the adhesive material 190 (with respect to some embodiments) toward the airflow channels 142 and, in some embodiments, the gaps 126, 526 between some of the adjacent rows in the internal cavity 58, 58', 58", 58''', 258, 458, 658, 858, 1058, 1258 of the housing 14 in fluid communication with the airflow channels 142. Accordingly, the adhesive material 190 facilitates thermal conduction of heat within the battery cell assembly 18, 18', 18", 18''', 218, 418, 618. The battery cell assemblies 18, 18', 18", 18''', 218, 418, 618 are positioned in the housing 14, 14', 14", 14''', 214, 414 to facilitate heat transfer from the adhesive material 190 to the airflow produced by the plurality of fans 162 flowing through the airflow channels 142 and/or the gaps 126, 526. Furthermore, the airflow tunnels/baffles 150, 350, 550, 950, 1150, 1350 within or otherwise integrated with the housing 14, 214, 414, 614, 814, 1014, 1214, 1414 is further configured to direct airflow through the battery cell assemblies 18, 218, 418, 618, 818, 1018, 1218, 1418.

Figure 42:
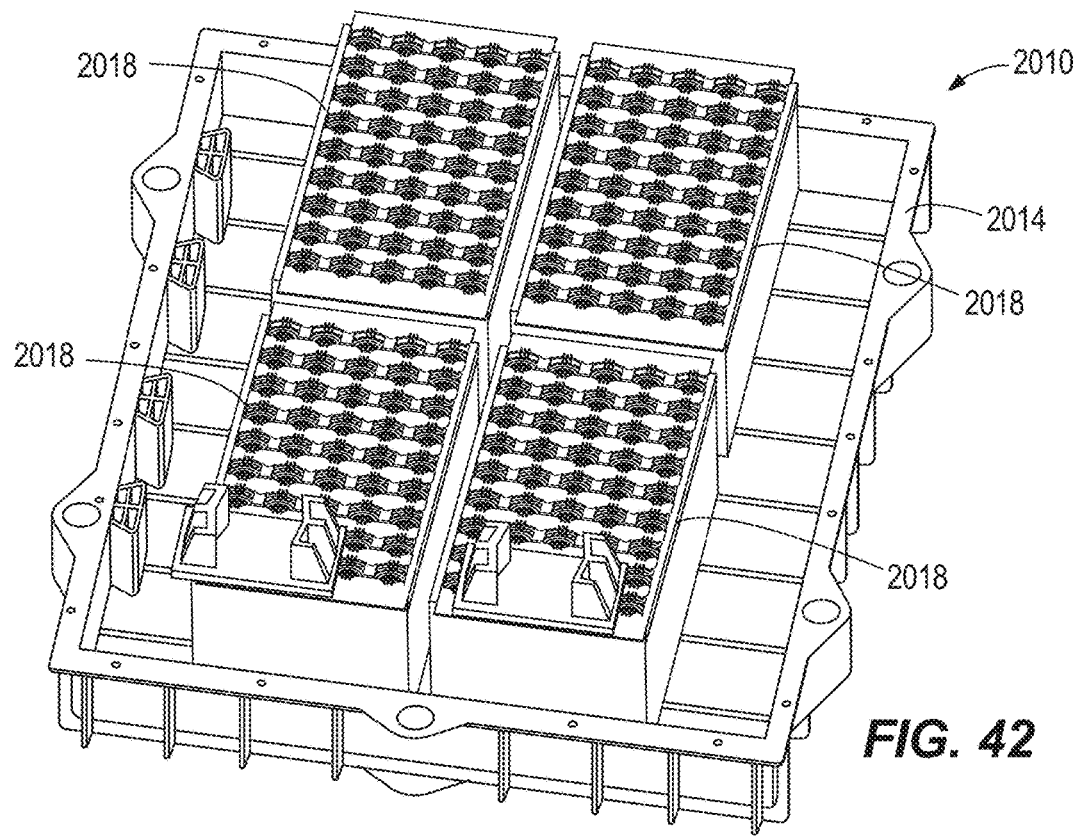
FIG. 42 is a perspective view of a portion of a battery pack assembly illustrating multiple battery cell assemblies of the battery pack assembly.

FIG. 42 illustrates a portion of a battery pack assembly 2010 including a portion of a housing 2014 and a plurality of battery cell assemblies 2018 received within the portion of the housing 2014. In the illustrated embodiment, the battery pack assembly 2010 includes four battery cell assemblies 2018. In other embodiments, the battery pack assembly 2010 may include one or more battery cell assemblies 2018 (e.g., two, three, etc.). The battery pack assembly 2010 is configured to be a high power battery pack (e.g., having a nominal voltage of at least about 2080 volts (V)) connectable to and operable to power various motorized power tools (e.g., a cut-off saw, a miter saw, a table saw, a core drill, an auger, a breaker, a demolition hammer, a compactor, a vibrator, a compressor, a drain cleaner, a welder, a cable tugger, a pump, etc.), outdoor tools (e.g., a chain saw, a string trimmer, a hedge trimmer, a blower, a lawn mower, etc.), other motorized devices (e.g., vehicles, utility carts, a material handling cart, etc.), etc. and non-motorized electrical devices (e.g., a power source, a light, an AC/DC adapter, a generator, etc.), any one of which is now referred to herein as "device."

With reference to FIGS. 44-47, each battery cell assembly 2018 includes a plurality of battery cells 2022, a housing or frame 2026, a cover 2030 coupled to the frame 2026, a plurality of connectors 2034, 2038, 2042, and a heat sink 2050. The battery cell assembly 2018 includes a front side 2054, a rear side 2058, a first lateral side 2062, a second lateral side 2066 opposite the first lateral side 2062, a first end 2070, and a second end 2074 opposite the first end 2070. In the illustrated embodiment, the plurality of connectors 2034, 2038, 2042 are positioned on the front side 2054, and the heat sink 2050 is positioned on the rear side 2058. In addition, the battery cell assembly 2018 includes a longitudinal axis 2078 extending through the first end 2070 and the second end 2074.

Figure 49:
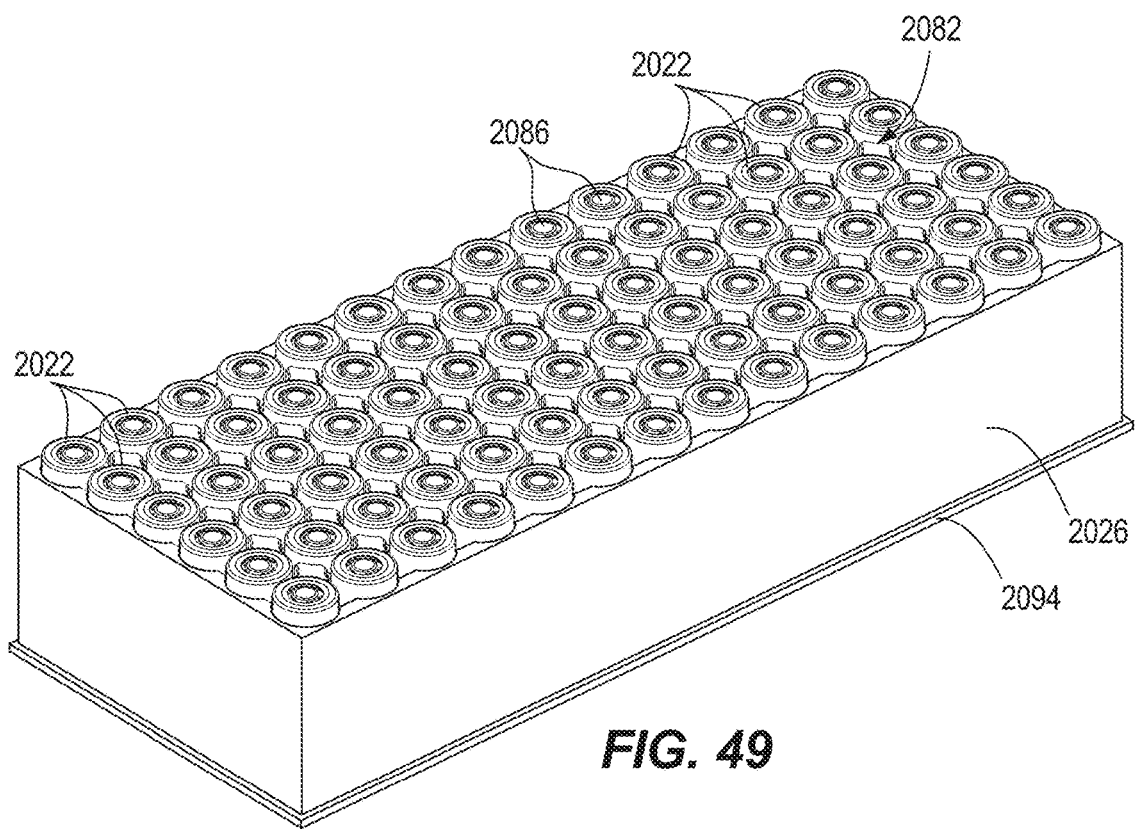
FIG. 49 is another perspective view of the battery cell assembly of FIG. 44 with the portion of the heat sink, the cover, and the connectors removed.
Figure 62:
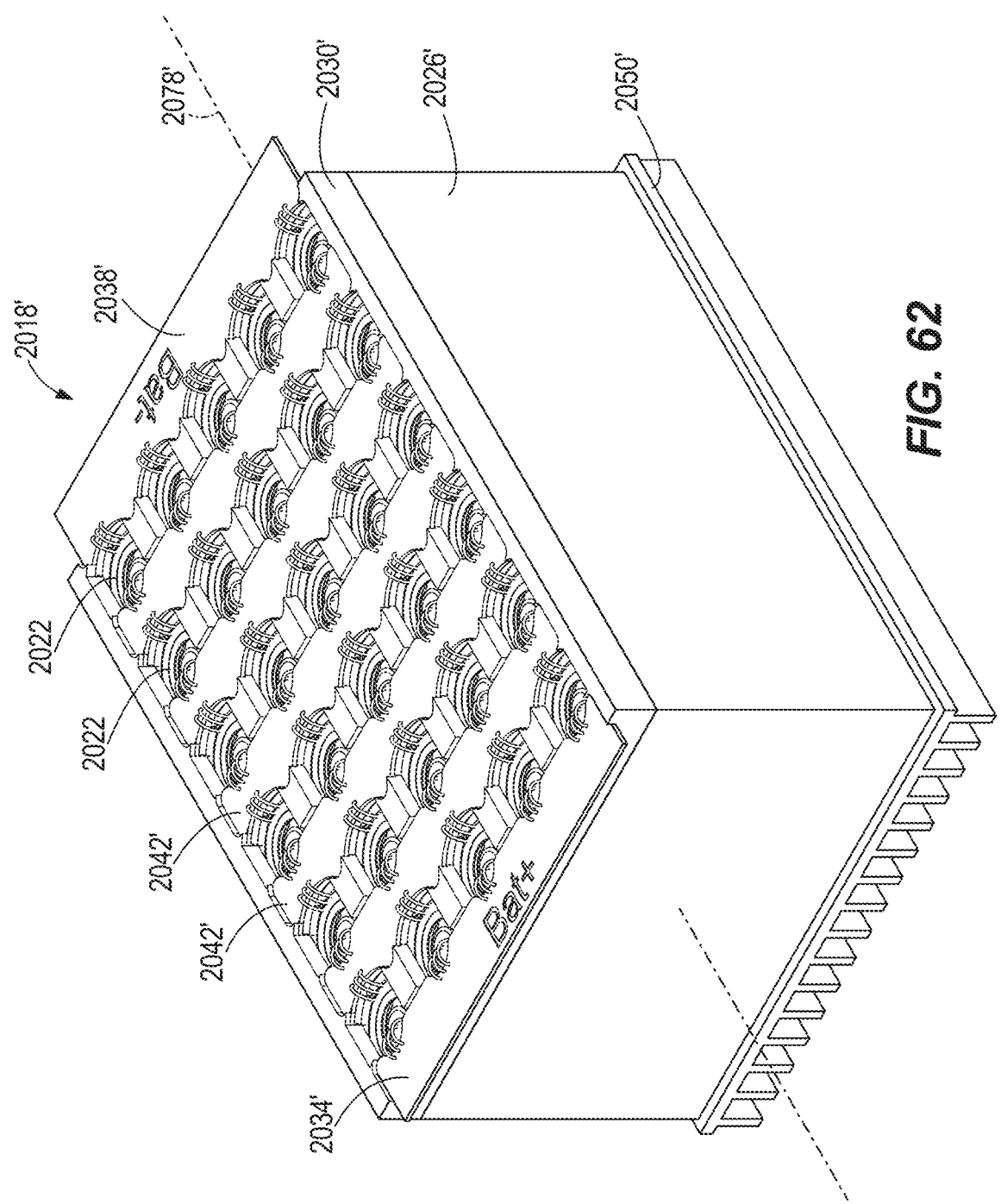
FIG. 62 is another example of a battery cell assembly of FIG. 44.

With reference to FIG. 49, the frame 2026 and the cover 2030 cooperatively define an internal cavity 2082 of the battery cell assembly 2018 in which one or more of the battery cells 2022 are received. Each battery cell 2022 extends perpendicular to the longitudinal axis 2078 within the internal cavity 2082. In the illustrated embodiment, the battery cell assembly 2018 includes eighty-four battery cells 2022. In other embodiments, the battery cell assembly 2018 may include two or more battery cells 2022. For example, as shown in FIG. 62, the battery cell assembly 2018' includes thirty battery cells 2022. The frame 2026 and the cover 2030 are shaped and sized to receive a predetermined number of battery cells 2022. The cover 2030 is positioned adjacent a first end 2086 of each of the battery cells 2022. The frame 2026 and the cover 2030 are configured to support the battery cells 2022.

Figure 49A:
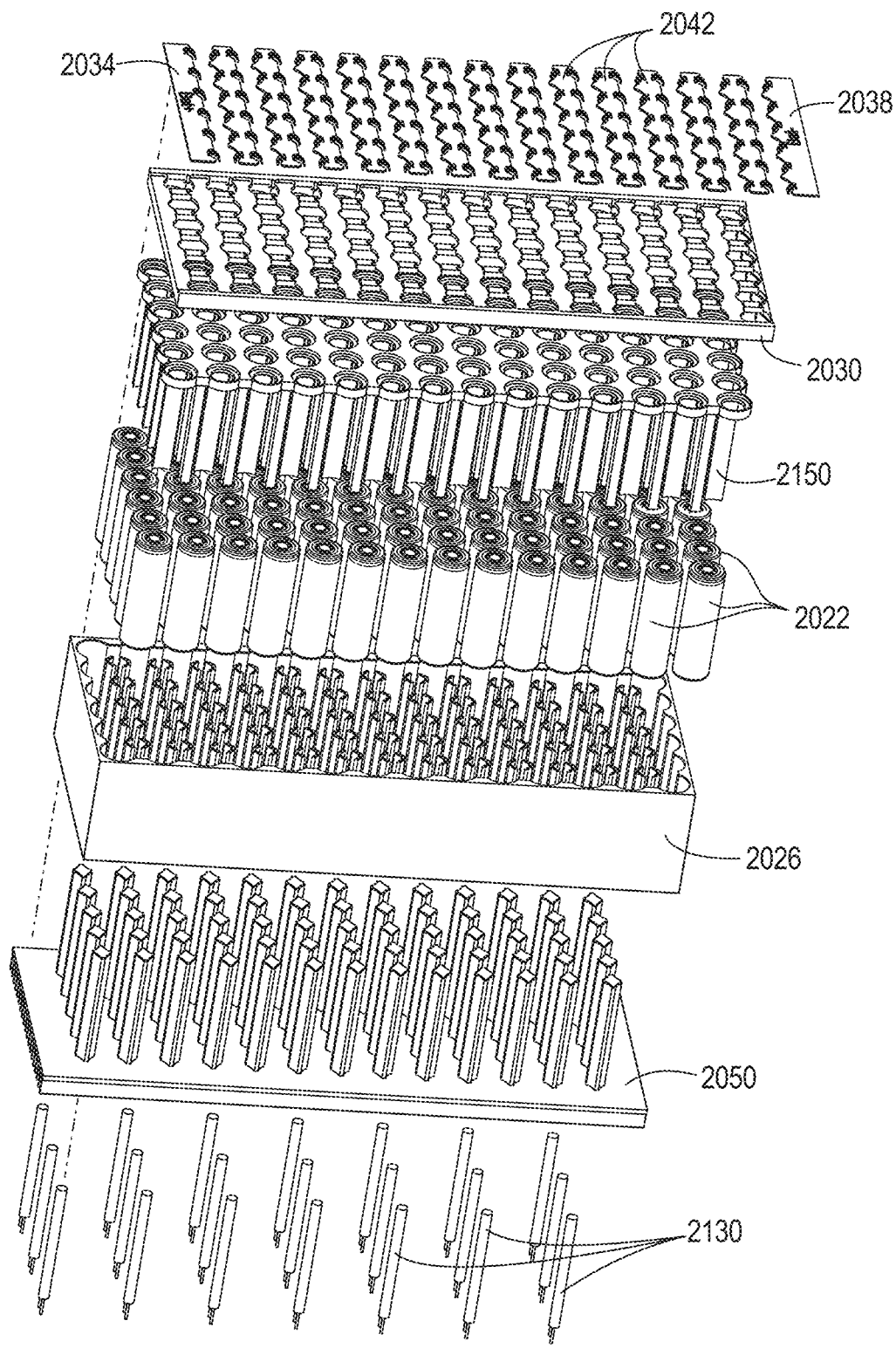
FIG. 49A is an exploded view of the battery cell assembly of FIG. 44.
Figure 49E:
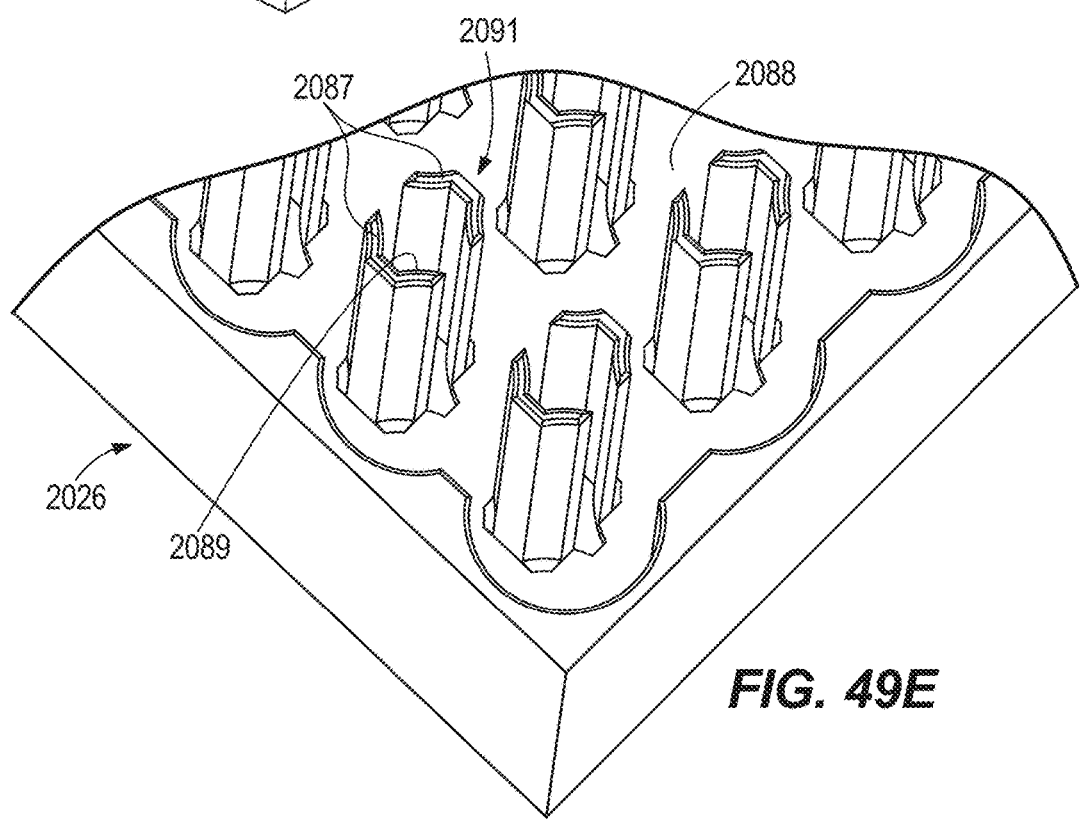
FIG. 49E is a perspective view of a portion of the frame of FIG. 49D.
Figure 50:
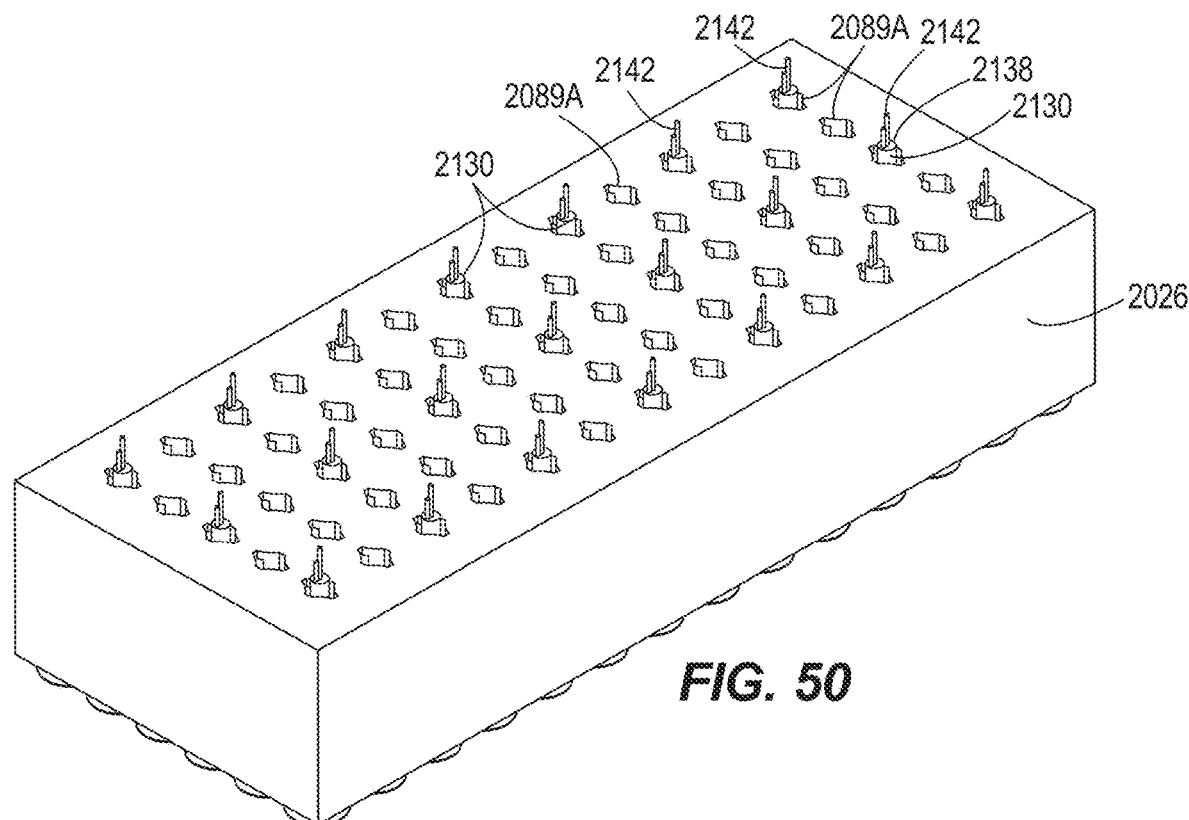
FIG. 50 is a rear perspective view of the battery cell assembly of FIG. 44 with the cover, the heat sink, and the connectors removed, and including the frame.

With reference to FIGS. 49B and 49D-50, the frame 2026 of the battery cell assembly 2018 includes a plurality of support members 2087. Each support member 2087 is coupled to and extends from a bottom surface 2088 of the frame 2026 (FIG. 49E). In the illustrated embodiment, the support members 2087 are integral with the frame 2026. Alternatively, the support members 2087 may be separately formed and fixed to the frame 2026. Each support member 2087 is positioned within the internal cavity 2082. In addition, each support member 2087 is configured to be positioned between two adjacent battery cells 2022 of the plurality of battery cells 2022 within the internal cavity 2082. Furthermore, two of the support members 2087 facing each other cooperatively define a space 2089 within the internal cavity 2082 to receive a portion of the heat sink 2050, as further discussed below. As such, each support member 2087 forms one of a pair of a support member assembly 2091. As shown in FIG. 50, each space 2089 is connected to a hole 2089A extending through the bottom surface of the frame 2026.

Figure 49C:
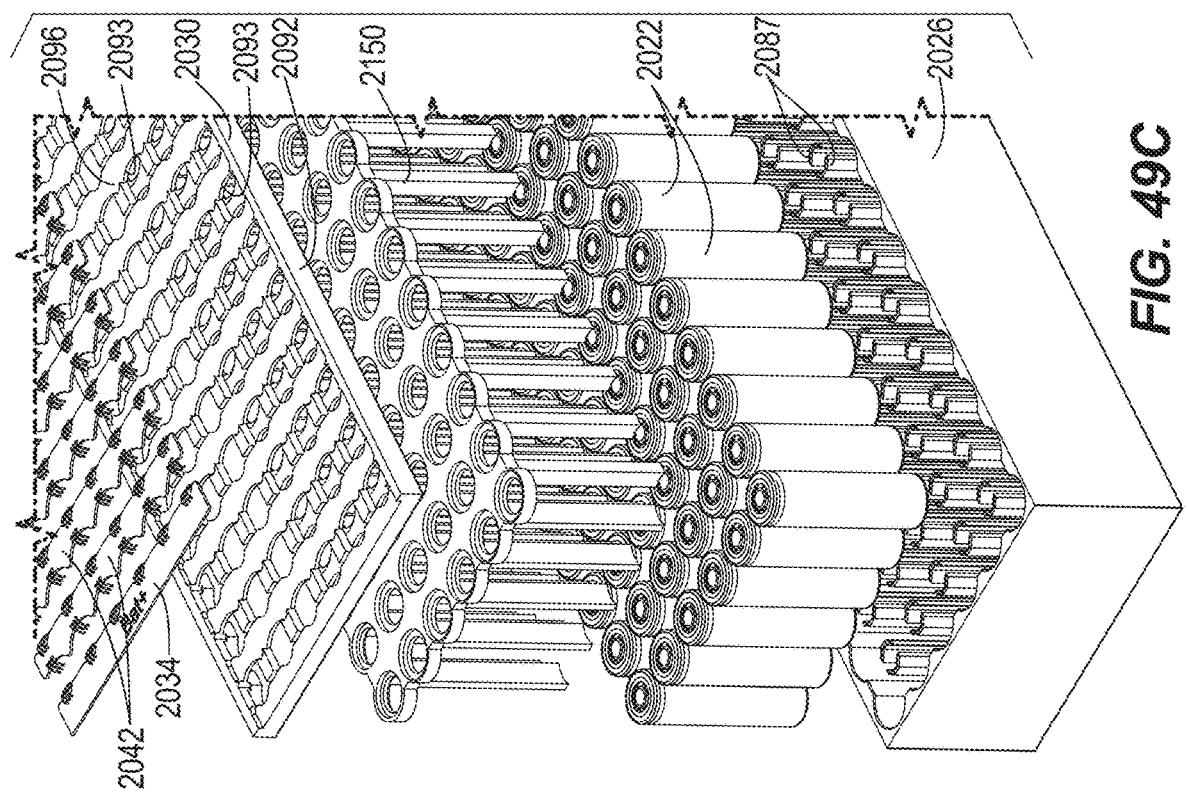
FIG. 49C is an exploded view of another portion of the battery cell assembly of FIG. 49A.
Figure 49B:
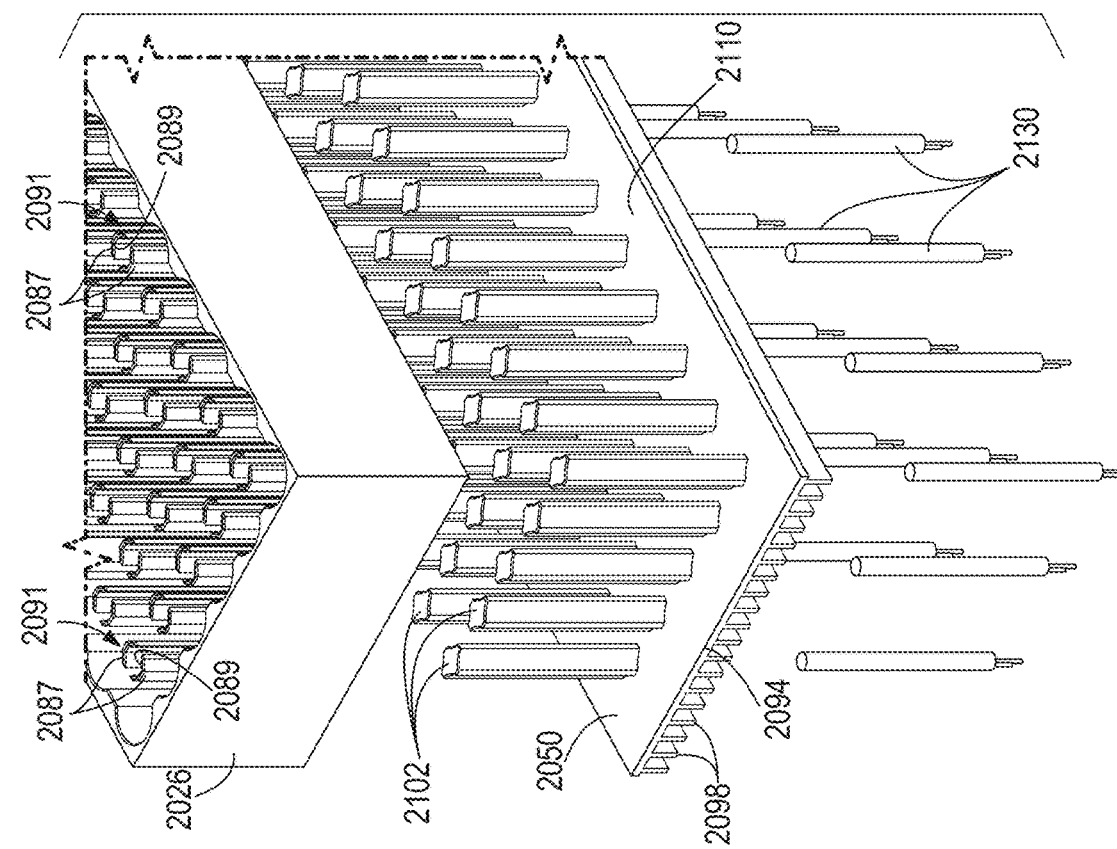
FIG. 49B is an exploded view of a portion of the battery cell assembly of FIG. 49A.
Figure 49D:
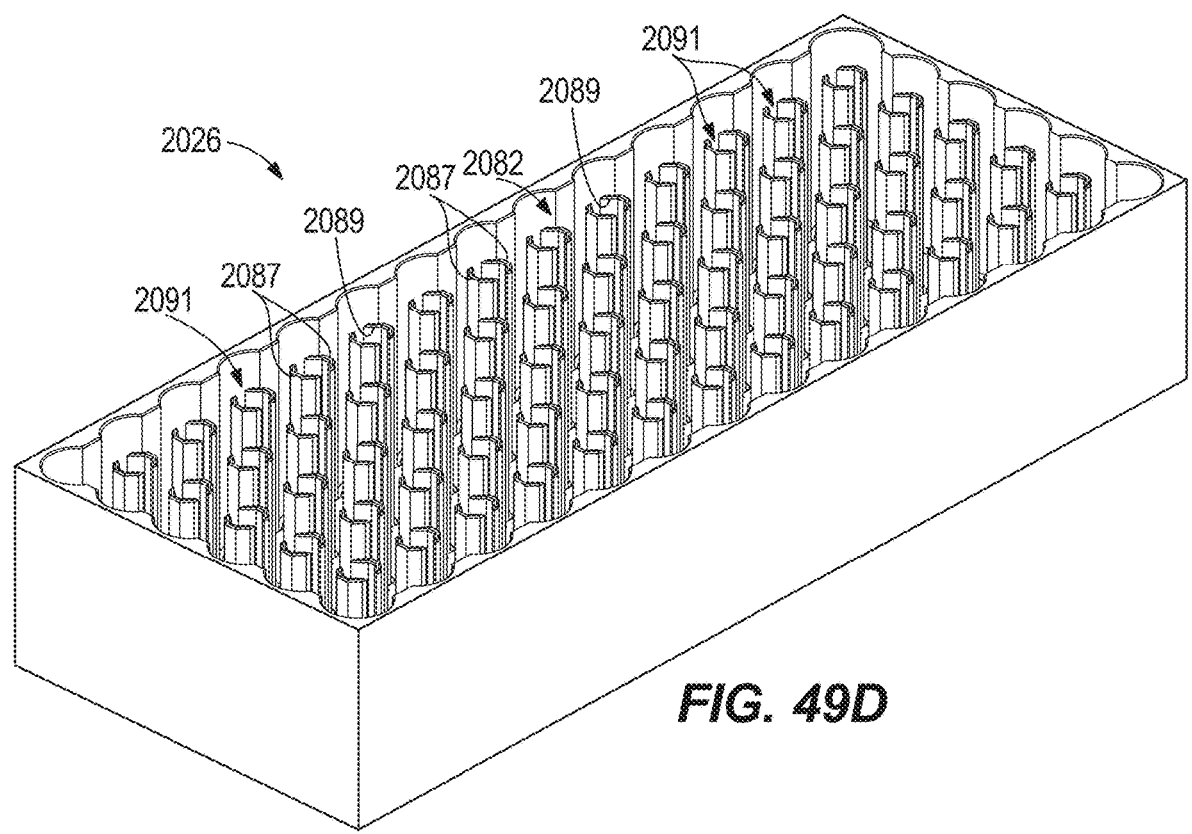
FIG. 49D is a perspective view of the frame of the battery cell assembly of FIG. 44.

With particular reference to FIG. 49C, the cover 2030 includes a body 2092 and a plurality of openings 2093 defined by the body 2092. Each opening 2093 is configured to align with one of the battery cells 2022 within the internal cavity 2082. As such, the cover 2030 has the same number of openings 2093 as the number of battery cells 2022. The first end 2086 of each of the battery cells 2022 is received in the respective one of the openings 2093. In addition, the body 2092 has a surface 2096, and the connectors 2034, 2038, 2042 are supported by the surface 2096. Accordingly, the cover 2030 may be configured to locate and maintain a position of the battery cells 2022 within the internal cavity 2082.

The frame and the cover is each formed by a material. The material may be plastic (e.g., nylon, polycarbonate, ABS, and the like). In some embodiments, the material may be a thermally conductive material such as metal (e.g., aluminum).

Each battery cell 2022 may have a nominal voltage between about 3 V and about 5 V and may have a nominal capacity between about 2 Ah and about 6 Ah (in some cases, between about 3 Ah and about 5 Ah). The battery cells 2022 may be any rechargeable battery cell chemistry type, such as, for example, lithium (Li), lithium-ion (Li-ion), other lithium-based chemistry, nickel-cadmium (NiCd), nickel-metal hydride (NiMH), etc.

Figure 46:
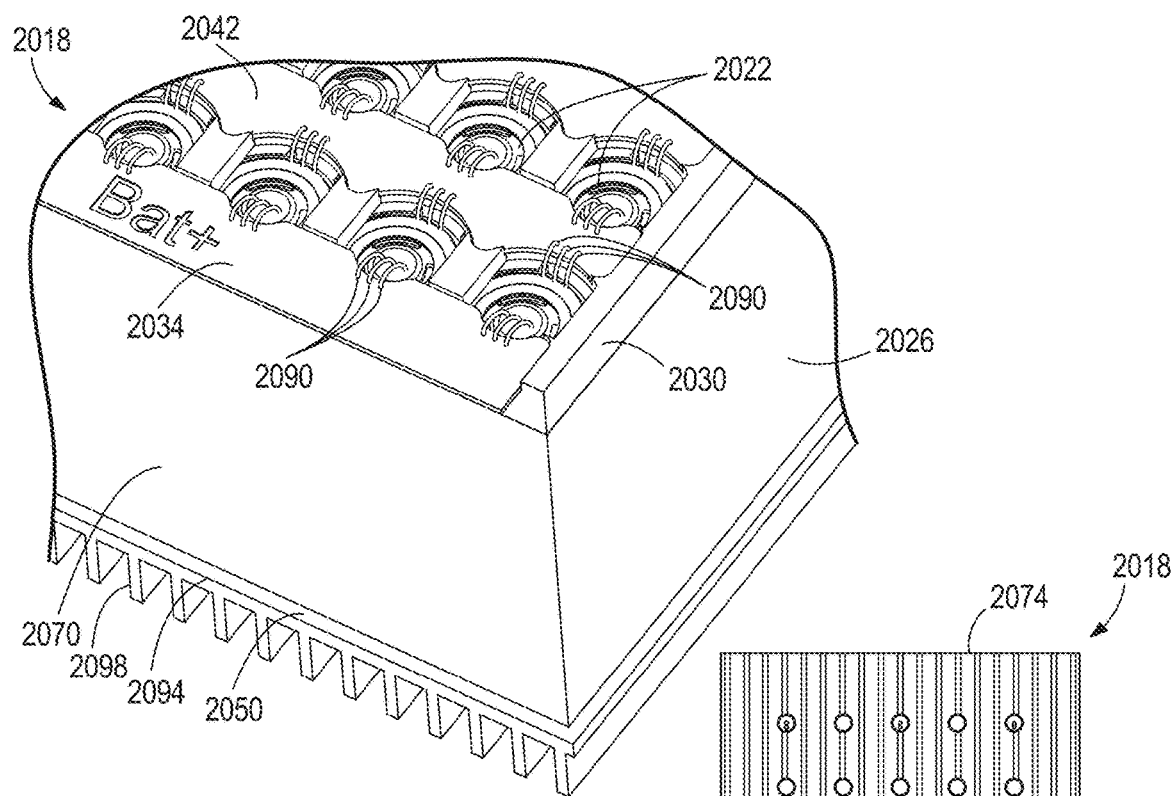
FIG. 46 is an enlarged view of a portion of the battery cell assembly of FIG. 44.
Figure 47:
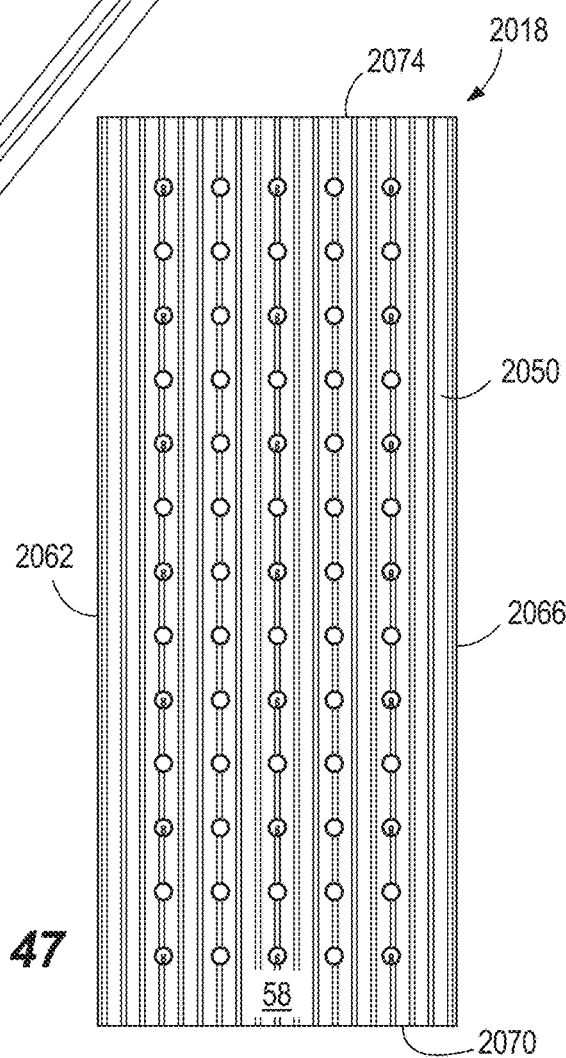
FIG. 47 is a rear view of the battery cell assembly of FIG. 45.
Figure 48:
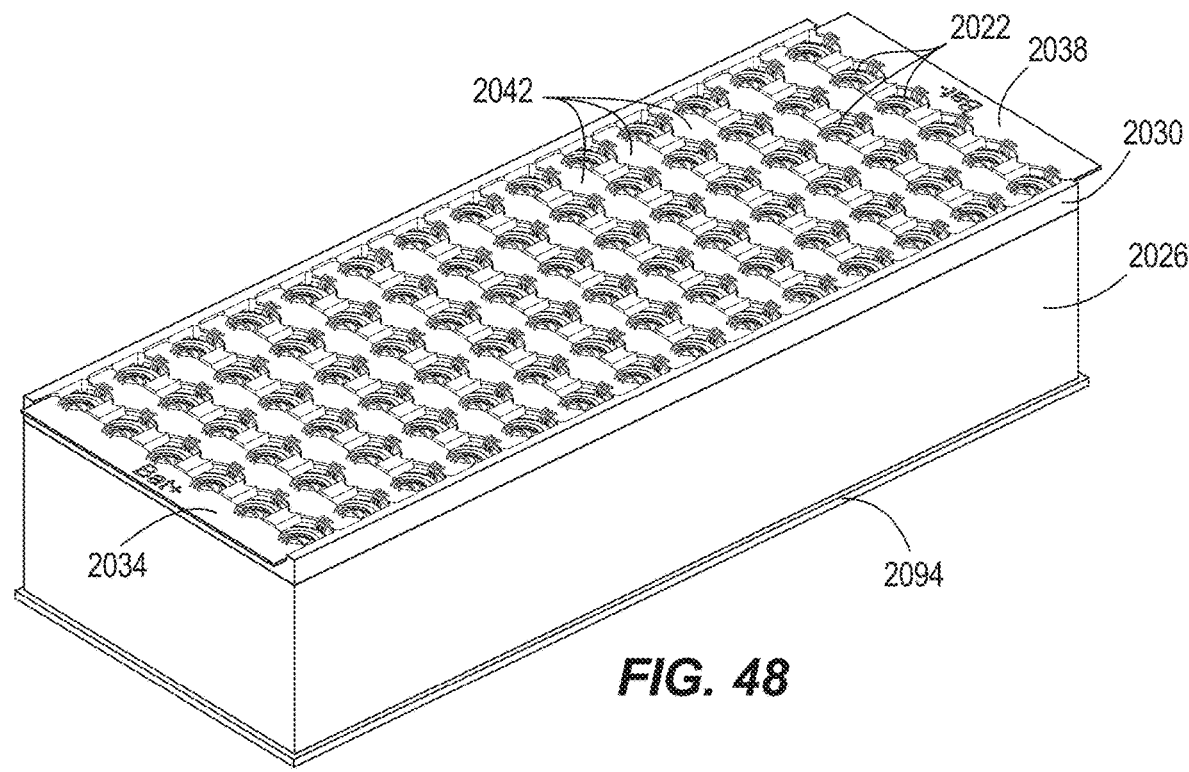
FIG. 48 is a perspective view of the battery cell assembly of FIG. 44 with a portion of the heat sink removed.

With reference to FIG. 46, the battery cells 2022 may be connected in series, parallel, or combination series-parallel to provide the desired electrical characteristics (e.g., nominal voltage, current output, current capacity, power capacity, etc.) of the battery pack assembly 2010. The battery cells 2022 are connected together by the connectors 2034, 2038, 2042 (e.g., bus bars). The connectors 2034, 2038, 2042 include a first connector 2034, a second connector 2038, and one or more intermediate connectors 2042. Each battery cell 2022 is connected by one or more wires 2090 to two of the connectors 2034, 2038, 2042. In the illustrated embodiment, each battery cell 2022 is connected by three wires 2090 to each connector 2034, 2038, 2042 adjacent the respective battery cell 2022. The wires 2090 are coupled to the first end 2086 of the battery cell 2022 (e.g., by a wire bonding process such as welding). Each connector 2034, 2038, 2042 is directly coupled to at least two or more battery cells 2022. In the illustrated embodiment, each connector 2034, 2038, 2042 is directly coupled to twelve battery cells 2022.

Figure 44:
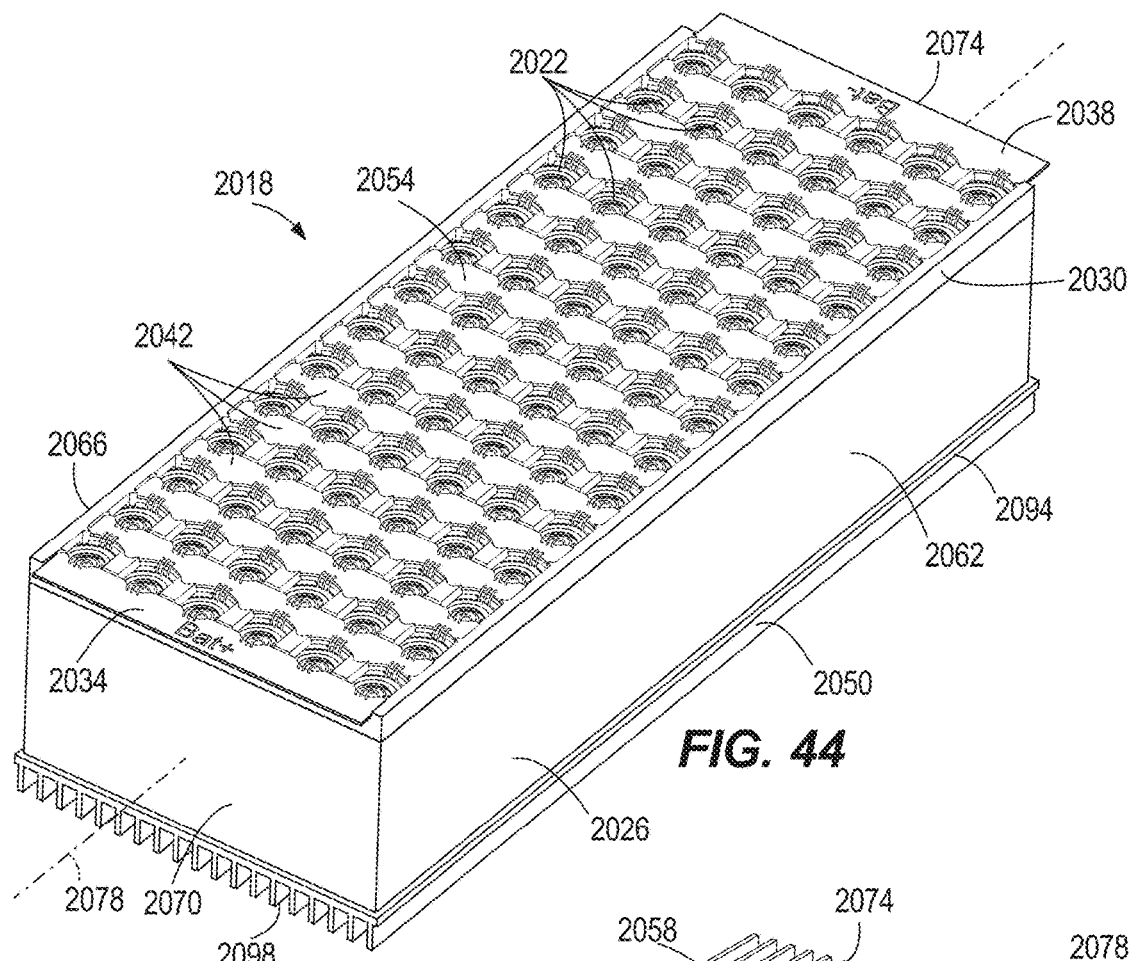
FIG. 44 is a front perspective view of one of the battery cell assemblies of FIG. 43, illustrating a frame, a cover, a plurality of connectors, and a heat sink.

As shown in FIGS. 44 and 49C, the connectors 2034, 2038, 2042 are positioned on the front side 2054 of the battery cell assembly 2018. In addition, the illustrated connectors 2034, 2038, 2042 are coupled to the cover 2030. The first connector 2034 is positioned at the first end 2070 of the battery cell assembly 2018. The second connector 2038 is positioned at the second end 2074 of the battery cell assembly 2018. Each of the intermediate connectors 2042 are positioned between the first connector 2034 and the second connector 2038 relative to the longitudinal axis 2078. Each illustrated connector 2034, 2038, 2042 is configured is an electrically conductive plate. Furthermore, each of the first and second connectors 2034, 2038, respectively, is configured as electrical contacts configured to electrically connect to other battery cell assemblies 2018 within the battery pack assembly 2010 and/or battery terminal contacts of the battery pack assembly 2010 (not shown). The first connector 2034 is configured as a positive electrical contact and the second connector 2038 is configured as a negative electrical contact.

The battery terminal contacts of the battery pack assembly 2010 are configured to electrically and mechanically engage device contacts of the device to facilitate the transfer of electrical power between the device and the battery pack assembly 2010. As such, each of the battery cell assemblies 2018 may be electrically connected within the battery pack assembly 2010 and electrically connected to the battery terminal contacts. The battery pack assembly 2010 is configured to be modular such that each battery pack assembly 2010 may include one or more battery cell assemblies 2018, and in which each battery cell assembly 2018 may include two or more battery cells 2022. The battery pack assembly 2010 may further include battery pack electronics (not shown) positioned within the housing 2014. The battery pack electronics may include, among other things, a printed circuit board (PCB), one or more electrical component(s) (e.g., CPU, a transformer, FETs, etc.)), and the battery terminal contacts.

Figure 57:
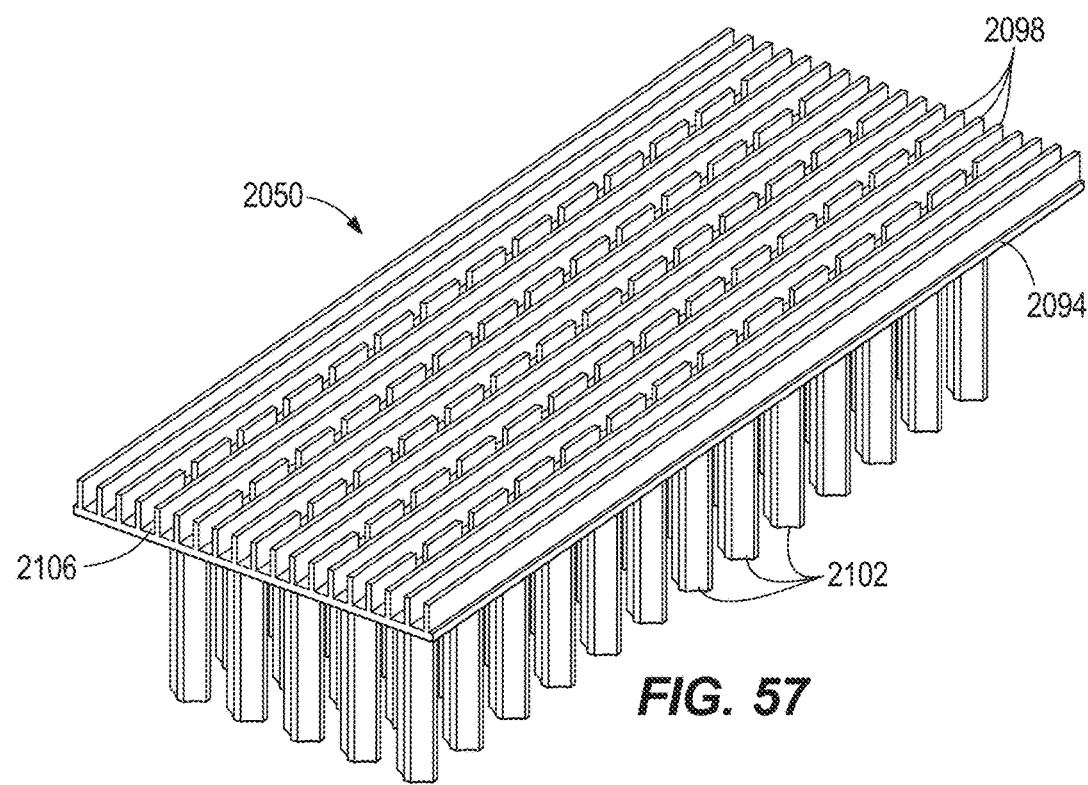
FIG. 57 is a rear perspective view of the heat sink of FIG. 56.
Figure 61:
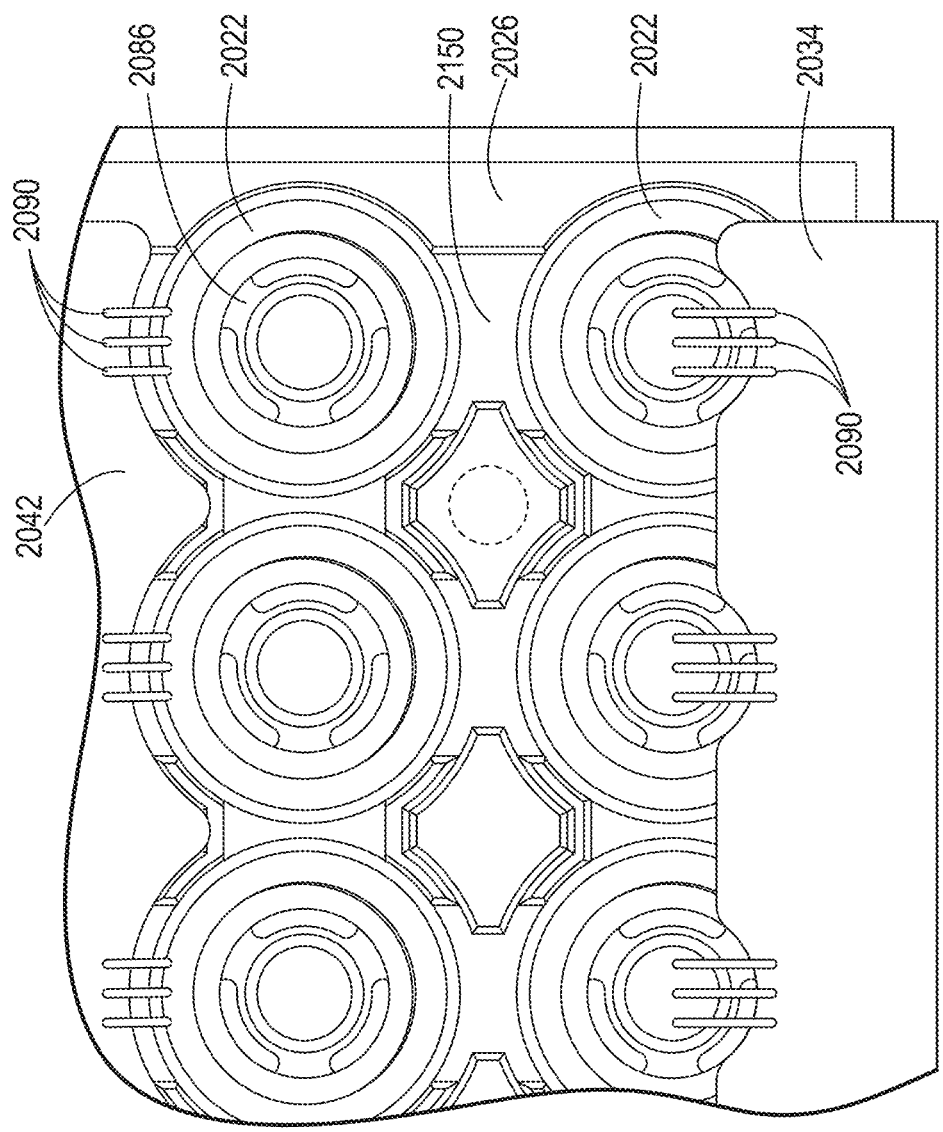
FIG. 61 is an enlarged front view of a portion of the battery cell assembly of FIG. 52 and further including adhesive material positioned within the battery cell assembly.
Figure 60:
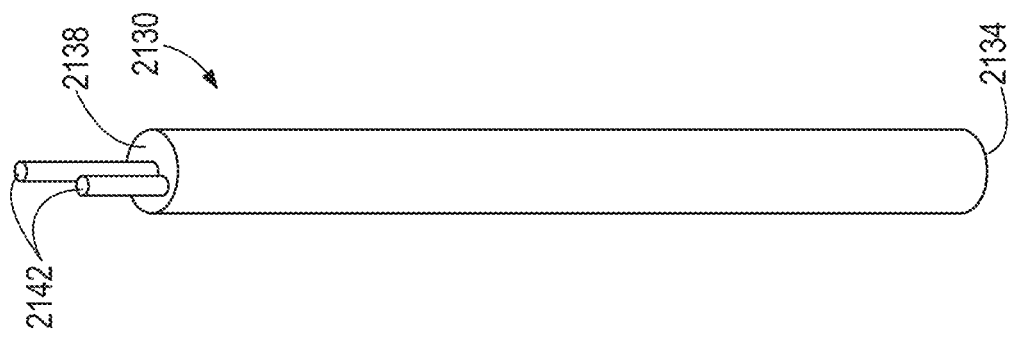
FIG. 60 is a perspective view of the heating rod of FIG. 55.

With reference to FIGS. 54-59, the heat sink 2050 of each battery cell assembly 2018 includes a body 2094, a plurality of fins 2098, and a plurality of projections 2102 opposite the fins 2098. The body 2094 is positioned adjacent the rear side 2058 of the battery cell assembly 2018. The body 2094 includes a first side 2106 and a second side 2110 opposite the first side 2106 (FIGS. 46 and 57). The first side 2106 includes the plurality of fins 2098 extending outwardly therefrom. As such, the fins 2098 are positioned external of the internal cavity 2082 of the battery cell assembly 2018. The body is formed by a thermally conductive material. The material may be metal such as aluminum, copper, and the like.

Figure 54:
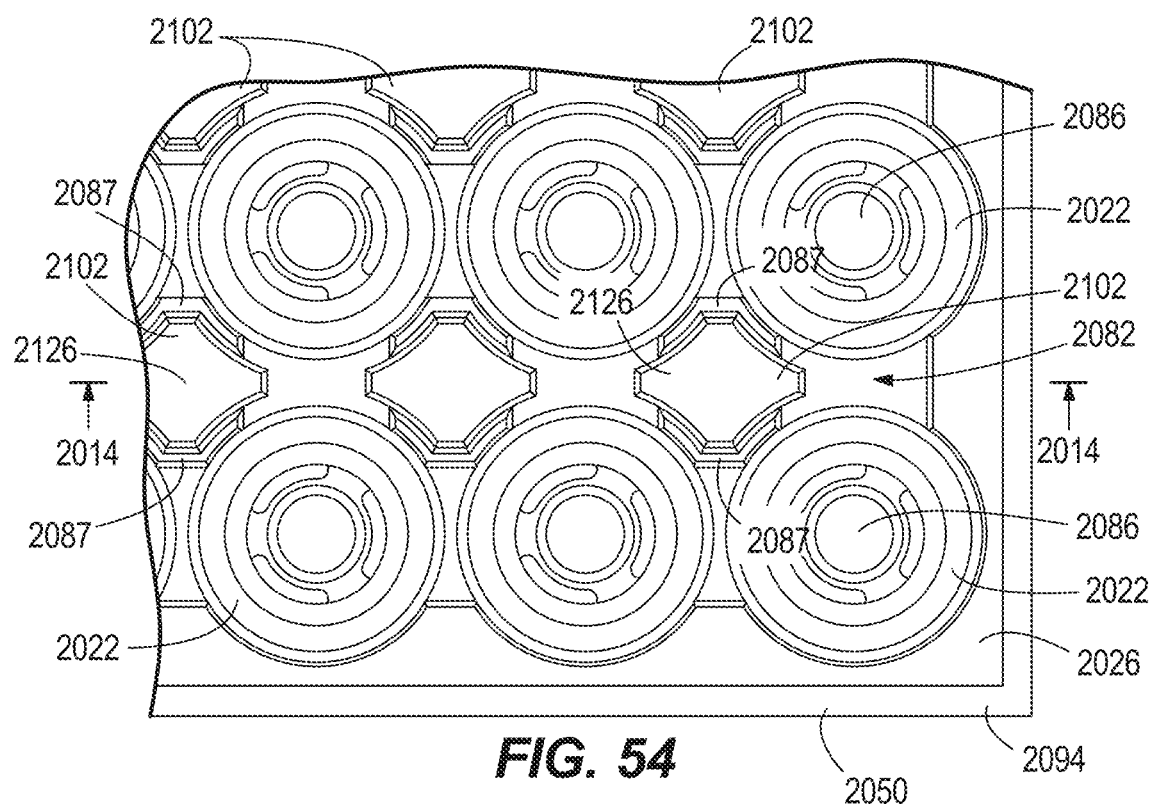
FIG. 54 is an enlarged front view of a portion of the battery cell assembly of FIG. 52.

The second side 2110 of the body 2094 partially defines the internal cavity 2082. More specifically, the body 2094 covers the rear side 2058 of the battery cell assembly 2018. The second side 2110 incudes the plurality of projections 2102 extending therefrom. When the heat sink 2050 is coupled to the frame 2026, the projections 2102 extend from the body 2094 into the internal cavity 2082. The projections 2102 are positionable between the plurality of battery cells 2022 within the internal cavity 2082. In particular, as shown in FIG. 54, a portion of each projection 2102 is positioned between two adjacent battery cells 2022 of the plurality of battery cells 2022. As such, each projection 2102 is positioned adjacent four of the battery cells 2022.

Each illustrated projection 2102 has a generally diamond shaped cross-sectional shape. In other embodiments, the projections 2102 may have other cross-sectional shapes such as rectangular, circular and the like, and some or all of the projections 2102 may have the same or different shape. Each of the projections 2102 extends parallel to each of the battery cells 2022. Furthermore, each projection 2102 is received in the space 2089 defined by one of the support member assemblies 2091. As such, the battery cell assembly 2018 includes the same number of projections 2102 as the number of support member assemblies 2091.

The support member assemblies 2091 are sized and shaped to be positioned between one or more of the battery cells 2022 and the respective projection 2102 (FIG. 44). In the illustrated embodiment, each support member 2087 of one of the support member assemblies 2091 is positioned between two of the battery cells 2022 and on one side of the projection 2102. In other embodiments, one, some or all of the support members 2087 are configured to be positioned between one or more of the battery cells 2022 and one of the projections 2102. The support members 2087 are configured to facilitate locating each of the battery cells 2022 and the projections 2102 within the internal cavity 2082 such as during assembly. In addition, the support members 2087 are configured to separate the projections 2102 of the heat sink 2050 and the battery cells 2022. The support members 2087 may insulate the battery cells 2022 from the projections 2102 of the heat sink 2050.

Figure 45:
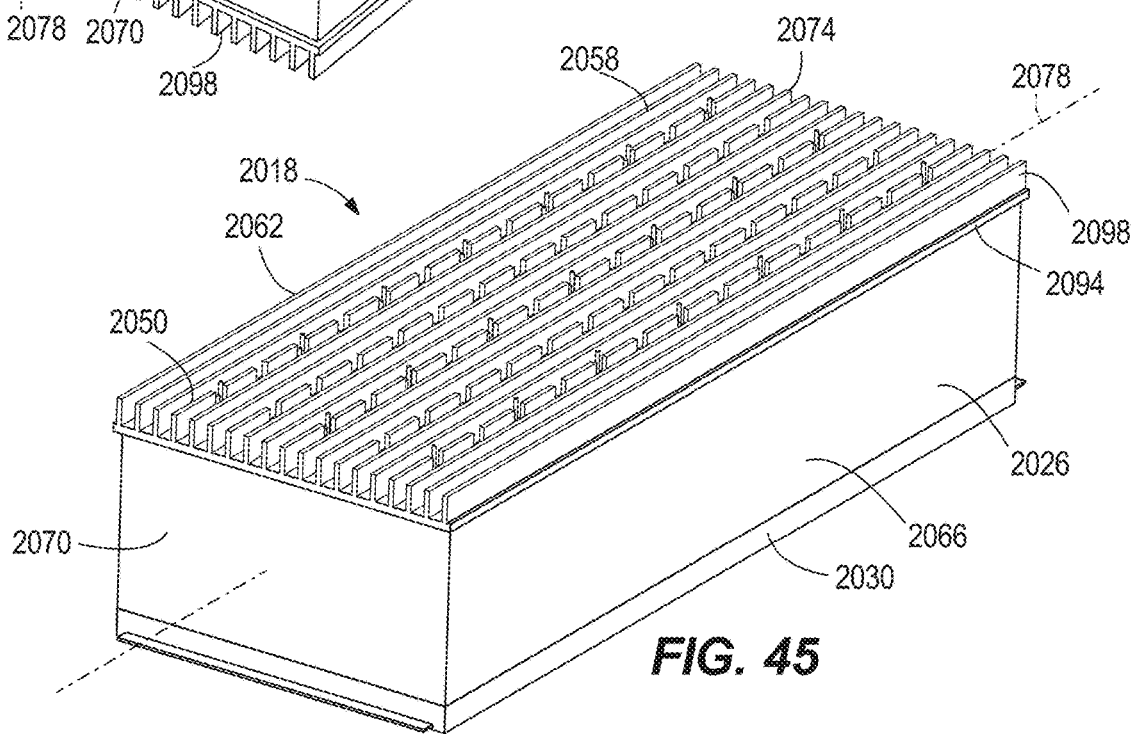
FIG. 45 is a rear perspective view of the battery cell assembly of FIG. 44.
Figure 52:
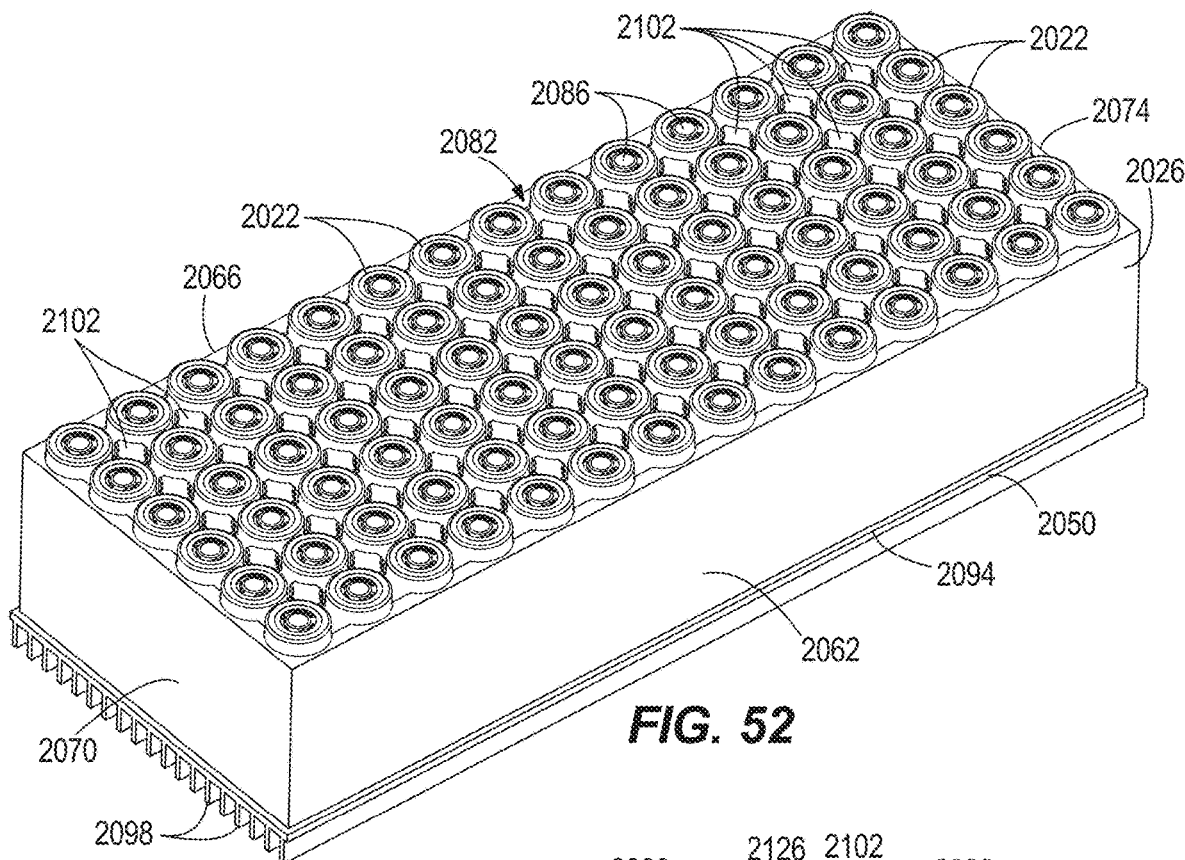
FIG. 52 is a perspective view of the battery cell assembly of FIG. 44 with the cover and the connectors removed.

With particular reference to FIGS. 44 and 45, the battery cells 2022 and the support member assemblies 2091/projections 2102 are sequentially arranged within the internal cavity 2082. In particular, the battery cells 2022 and the support member assemblies 2091/projections 2102 are arranged in sequence (i.e., one after the other) in one or more directions (e.g., upward from the frame of reference of FIG. 54, and to the right from the first end 2070 to the second end 2074 from the frame of reference of FIG. 52), but may in other embodiments be arranged in sequence in all directions. As such, the battery cells 2022 and the support member assemblies 2091/projections 2102 may be arranged in sequence. A portion of each of the support member assemblies 2091 separate each of the battery cells 2022 from each other.

Figure 53:
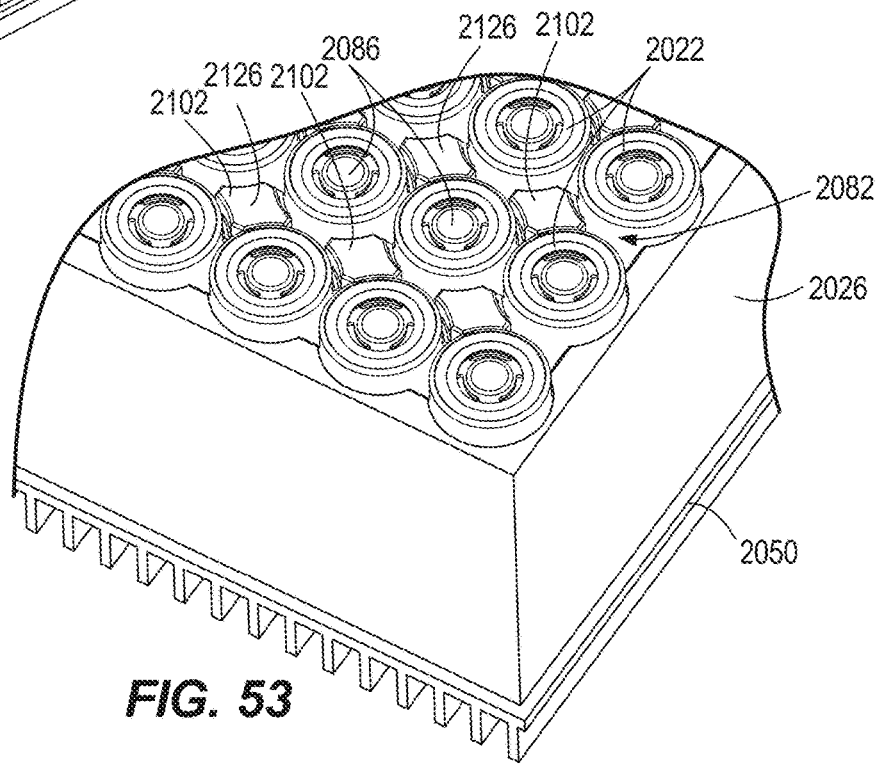
FIG. 53 is an enlarged view of a portion of the battery cell assembly of FIG. 52.
Figure 55:
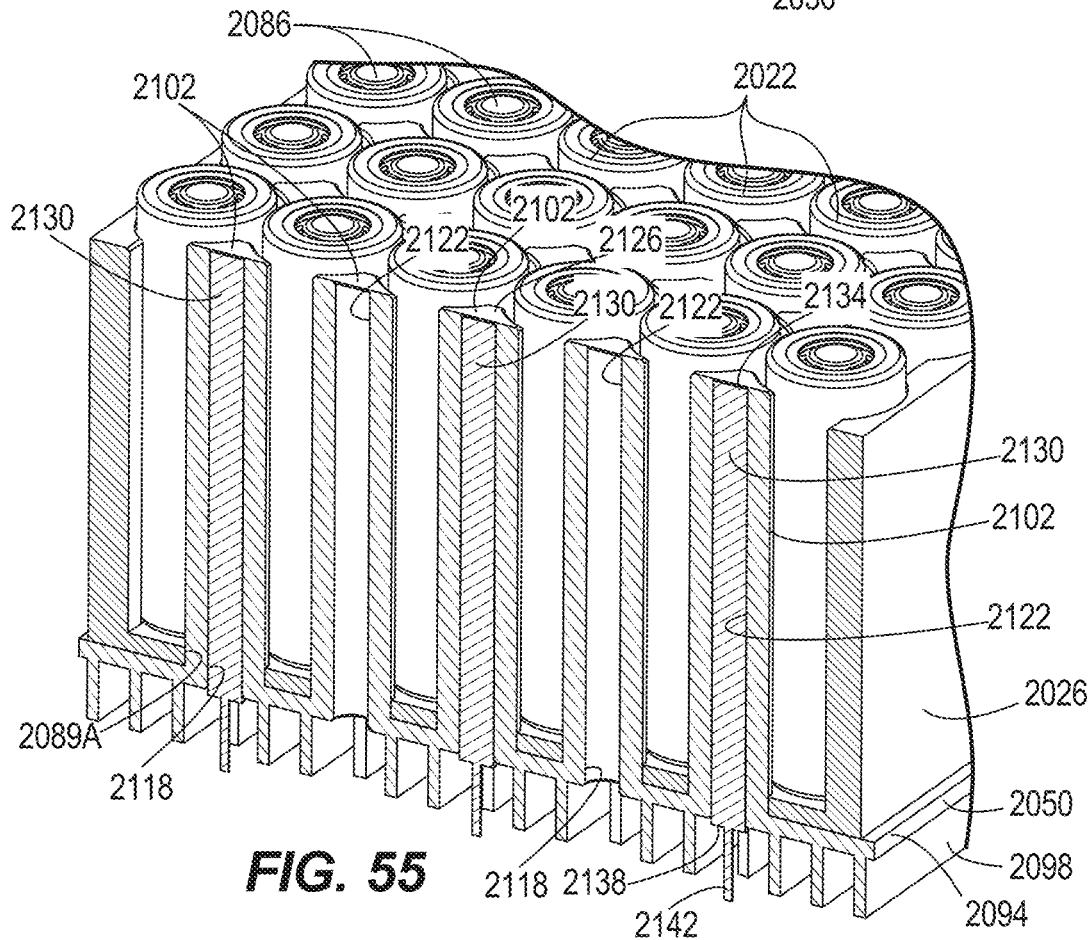
FIG. 55 is a cross-sectional view of the battery cell assembly of FIG. 52, illustrating heating rods.
Figure 56:
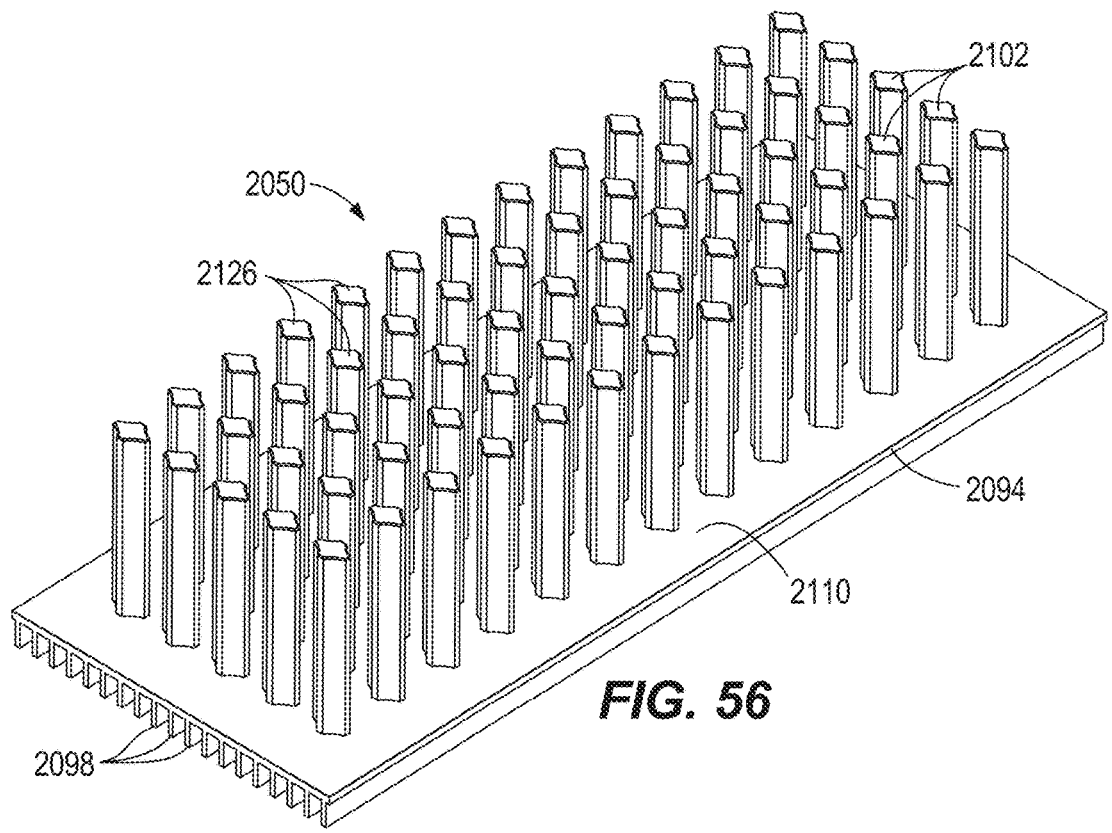
FIG. 56 is a front perspective view of the heat sink of the battery cell assembly of FIG. 44.

As illustrated in FIG. 55, the body 2094 of the heat sink 2050 defines a plurality of openings 2118 (FIG. 55) extending through the first side 2106 to the second side 2110. Each opening 2118 is aligned with one of the projections 2102. More specifically, each projection 2102 defines a channel 2122 extending partially therethrough. Each opening 2118 is connected to the respective channel 2122. Each channel 2122 extends from the second side 2110 of the body 2094 to proximate an end 2126 of the respective projection 2102. The end 2126 of each projection 2102 is positioned adjacent the first end 2086 of each battery cell 2022 (FIG. 53). Furthermore, the openings 2118 are positioned between the fins 2098 on the first side 2106 of the heat sink 2050. In other embodiments, only some of the projections 2102 may include the channel 2122. In addition, each opening 2118 is aligned with the respective one of the holes 2089A of the frame 2026.

With reference to FIGS. 55 and 58-60, the battery cell assembly 2018 further includes a plurality of heating rods 2130. Each rod 2130 is selectively received in one of the channels 2122 of the projections 2102. More specifically, each rod 2130 is inserted through the opening 2118 of the body 2094 into the channel 2122. A first end 2134 of the rod 2130 is positioned adjacent the end 2126 of the projection 2102 (and the first end 2086 of each of the battery cells 2022). A second end 2138 of the rod 2130 opposite the first end 2134 is positioned proximate the opening 2118. In the illustrated embodiment, the rod 2130 is sized such that the second end 2138 extends through the opening 2118 and is positioned external of the opening 2118 and the channel 2122.

The heating rods 2130 may be positioned in some or all of the projections 2102. For example, in the illustrated embodiment, the heating rods 2130 are alternatingly received in the channels 2122 of the projections 2102 (FIGS. 55 and 58). As such, the heating rods 2130 are positioned in every other projection 2102. In other embodiments, the heating rods 2130 may be positioned in all of the projections 2102. In addition, wires 2142 connect each of the heating rods 2130 to the battery pack assembly electronics (e.g., PCB). The wires 2142 extend from the second end 2138 of the respective heating rod 2130. In addition, the wires 2142 extend between the fins 2098 on the first side 2106 of the heat sink 2050.

The heating rods 2130 are formed by a conductive metal material such as copper. In other embodiments, the heating rods 2130 are configured as heat pipes made from copper and filled with liquid or gas.

Each of the rods 2130 is configured to generate (e.g., electrically), or otherwise transfer heat from a separate source, for selectively heating the battery cells 2022, as further discussed below. The source may be a two-way, a charger for the battery pack assembly 2010, or the battery cells 2022. In some embodiments, one or more of the heating rods 2130 is positioned to heat four of the battery cells 2022.

Figure 51:
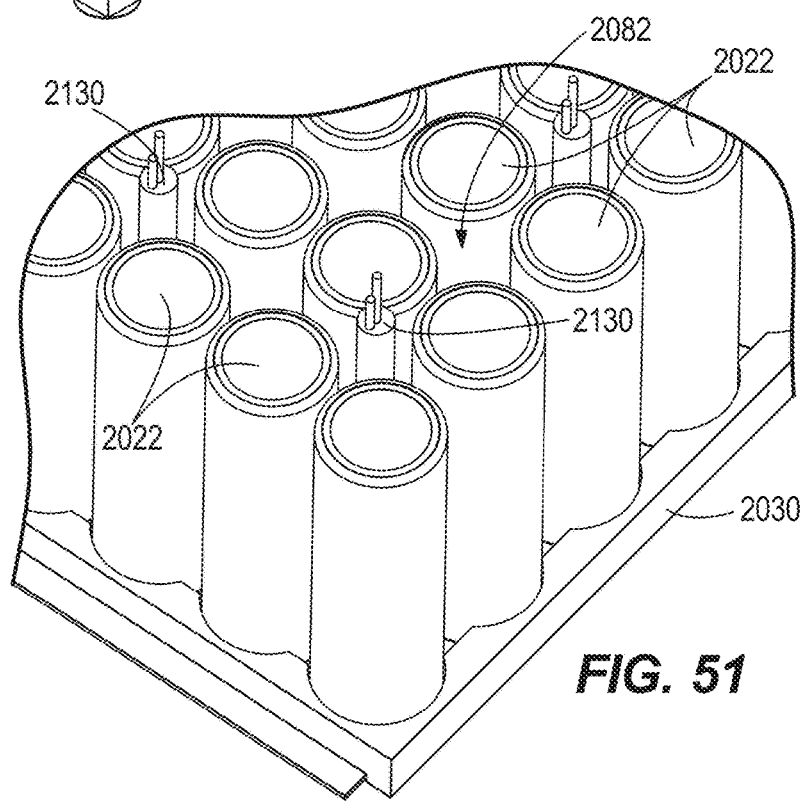
FIG. 51 is an enlarged rear view of a portion of the battery cell assembly of FIG. 44 with the frame and the heat sink removed.

With reference to FIGS. 49A, 49C, and 51, the internal cavity 2082 of each battery cell assembly 2018 is configured to receive a fluid such as during assembly of the battery cell assembly 2018. The fluid comprises an adhesive material 2150 (e.g., glue). In the illustrated embodiment, the fluid is thermally conductive silicone. When the fluid is received in the internal cavity 2082, the fluid is configured to fill the remaining space between the projections 2102 and the battery cells 2022. In particular, the fluid is configured to fill in the gaps between the projections 2102 and the battery cells 2022. Once hardened, the adhesive material 2150 is configured to facilitate heat transfer between the battery cells 2022 and the heat sink 2050.

In operation, the heat sink 2050 and the adhesive material 2150 is configured to facilitate transfer of heat to and away from the battery cells 2022. More specifically, the heating rods 2130 may be activated to generate heat. Each of the projections 2102 of the heat sink 2050 are positioned to direct the heat from the heating rods 2130 toward the battery cells 2022 via the adhesive material 2150. In some embodiments, one, some or all of the heating rods 2130 may be activated when the battery pack assembly electronics determines that the battery pack assembly 2010 and/or one of the respective battery cell assemblies 2018 is equal to or greater than a predetermined temperature limit. In addition, in some embodiments, the heating rods 2130 may be activated when the battery pack assembly 2010 is or is not being discharged.

The battery cell assembly 2018 is further configured to direct heat away from the battery cells 2022. More specifically, when the battery pack assembly 2010 is being discharged, the heat generated by the battery cells 2022 is directed via the adhesive material to the projections 2102 and subsequently to the body 2094 of the heat sink 2050 and finally to the fins 2098. Accordingly, the heat sink 2050 and the adhesive material 2150 facilitates thermal conduction of heat within the battery cell assembly 2018. In addition, the heat sink 2050 is shaped to facilitate equal distribution of the heat toward and away from the battery cells 2022 within the battery cell assembly 2018.

Figure 43:
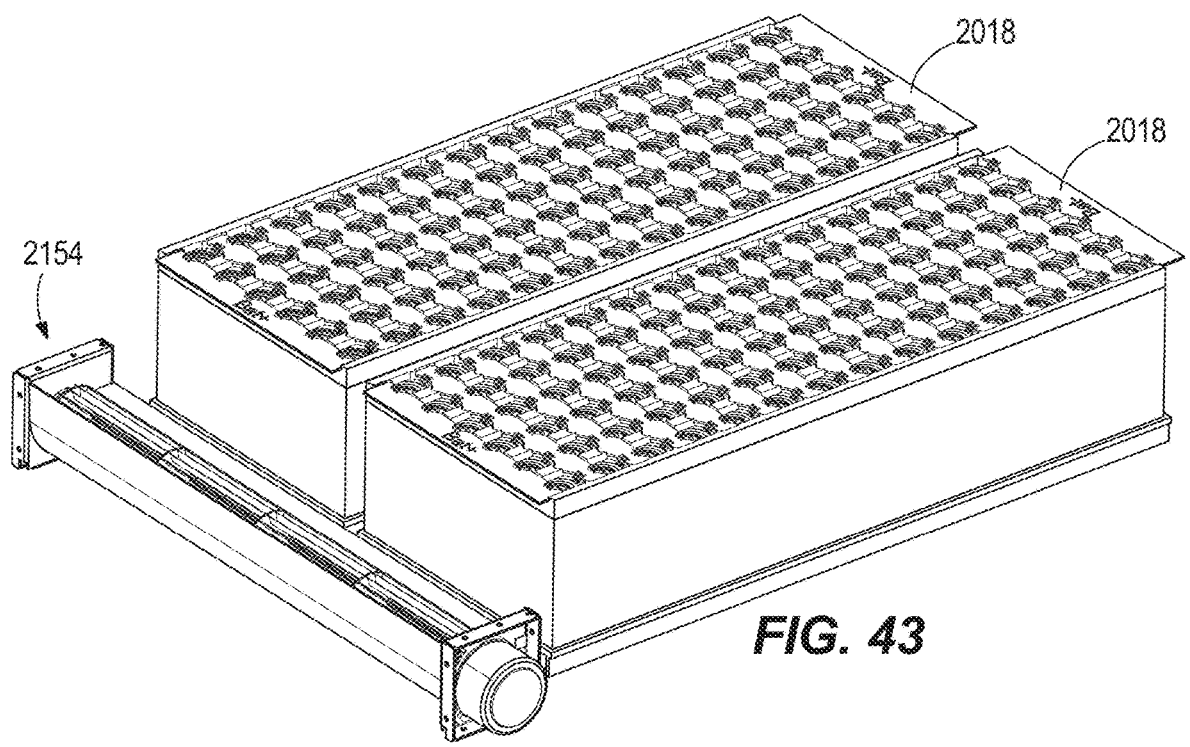
FIG. 43 is a perspective view of two of the battery cell assemblies of FIG. 42 and a fan assembly.

With reference to FIG. 43, the battery pack assembly 2010 may further include a fan assembly 2154 having one or more fans. The fan assembly 2154 is positioned adjacent one or more of the plurality of battery cell assemblies 2018. In the illustrated embodiment, the fan assembly 2154 is positioned adjacent two of the battery cell assemblies 2018. The fan assembly 2154 is positionable within the housing 2014 of the battery pack assembly 2010. The battery pack assembly 2010 is configured to be sealed, and the fan assembly 2154 is operable to circulate airflow within the sealed housing 2014 of the battery pack assembly 2010.

The fan assembly 2154 is positioned proximate the fins 2098 of the one or more the battery cell assemblies 2018. In addition, the illustrated fan assembly 2154 is positioned adjacent the first end 2070 of each battery cell assembly 2018 but may be alternatively positioned adjacent any side or end of the battery cell assembly 2018 (e.g., first lateral side 2062, second lateral side 2066, second end 2074, etc.). The fan assembly 2154 is operable to generate the airflow for directing air over and/or past the fins 2098 of the heat sink 2050. The battery pack assembly 2010 may also include one or more guide members positioned to guide the air toward and/or away from the fins 2098 of the battery cell assemblies 2018 within the housing 2014 of the battery pack assembly 2010. Accordingly, the battery pack assembly 2010 may have increased thermal performance, which thereby may improve battery pack cycle life and cycle running time.

Figure 63:
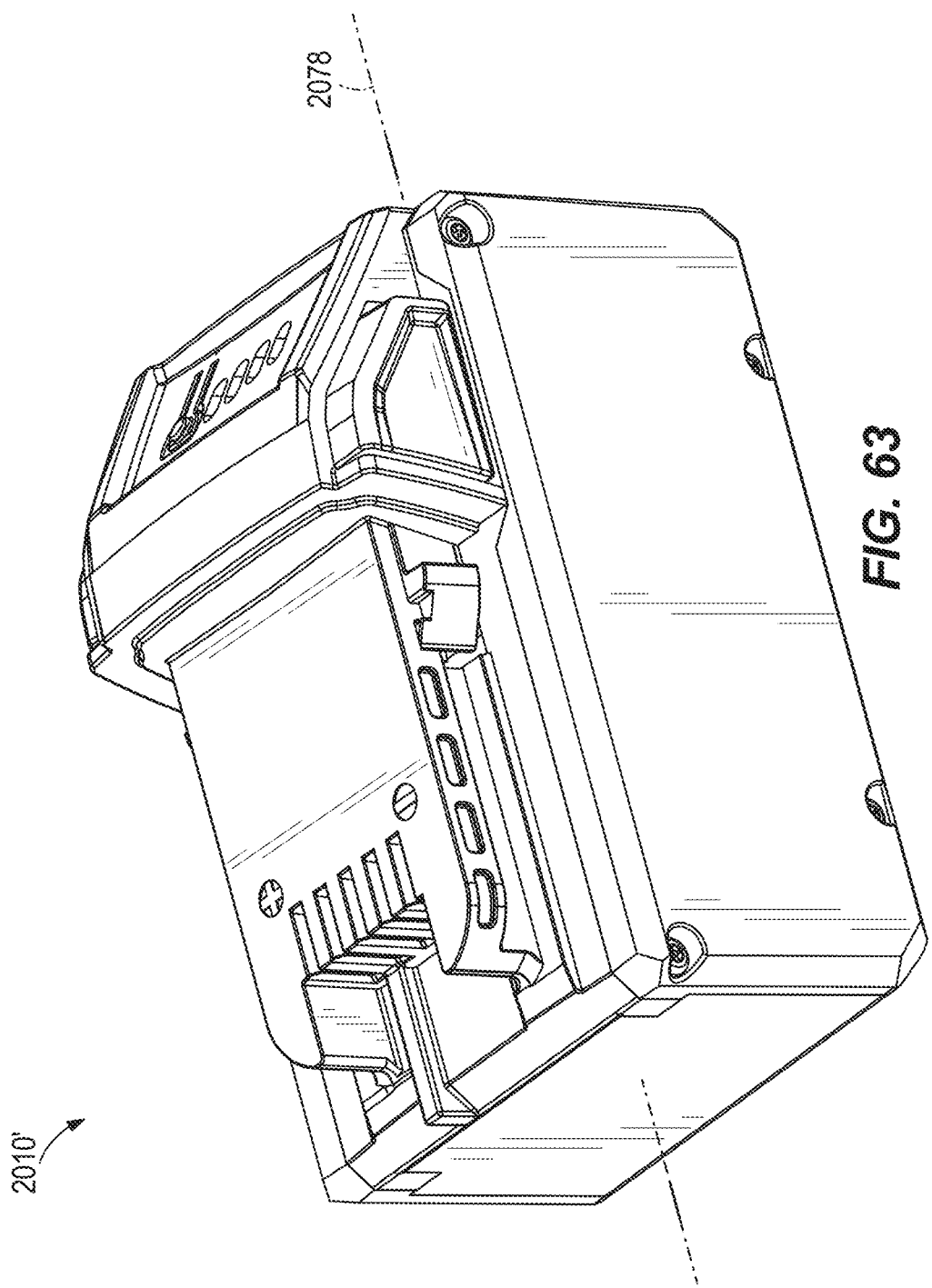
FIG. 63 is another example of a battery pack of the battery pack assembly of FIG. 42.
Figure 64:
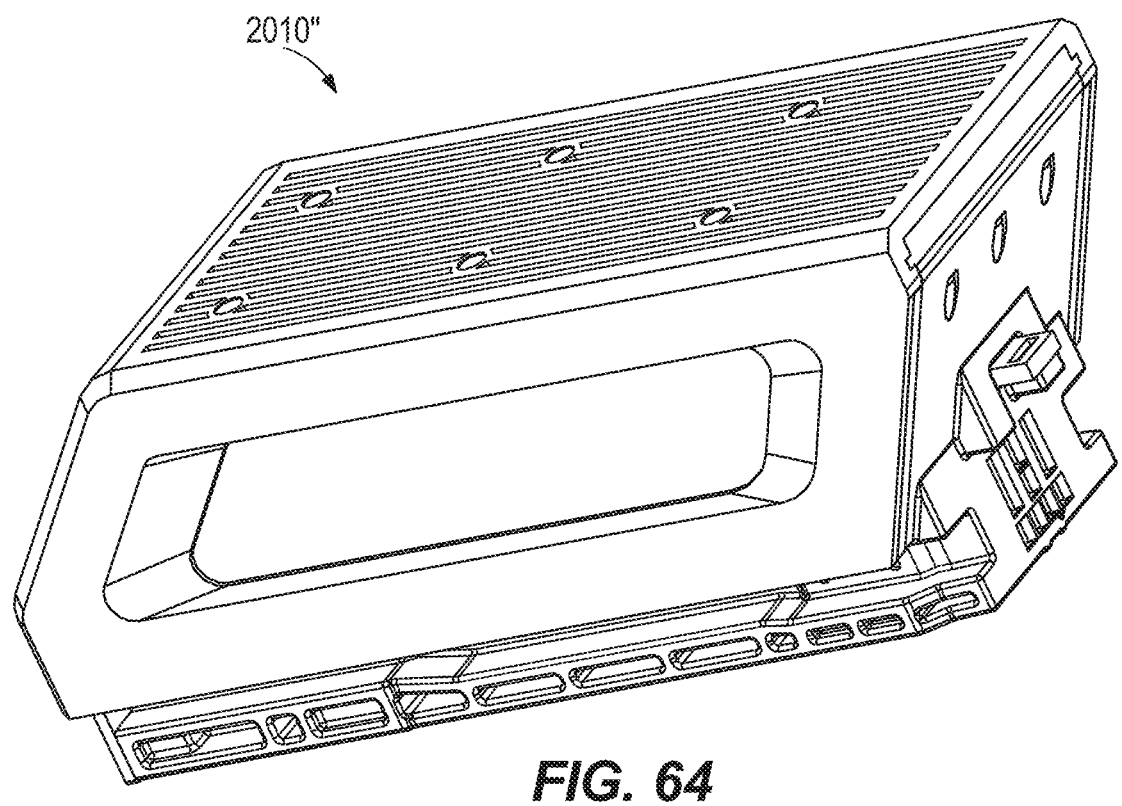
FIG. 64 is yet another example of a battery pack of the battery pack assembly of FIG. 42.

Each of FIGS. 63 and 64 illustrates another example of a battery pack assembly 2010', 2010" that may include one or more of like component and features as the embodiment of the battery pack assembly 10 shown in FIGS. 42-62 above. Accordingly, the discussion of the battery pack assembly 2010 above similarly applies to the battery pack assembly 2010', 2010" and is not re-stated.

FIGS. 65-69 illustrate a battery pack assembly 3010 including a battery pack 3014 and an injection port 3018. In the illustrated embodiment, the battery pack assembly 3010 includes a high power battery pack 3014 (e.g., having a nominal voltage of at least about 80 volts (V)) connectable to and operable to power various motorized power tools (e.g., a cut-off saw, a miter saw, a table saw, a core drill, an auger, a breaker, a demolition hammer, a compactor, a vibrator, a compressor, a drain cleaner, a welder, a cable tugger, a pump, etc.), outdoor tools (e.g., a chain saw, a string trimmer, a hedge trimmer, a blower, a lawn mower, etc.), other motorized devices (e.g., vehicles, utility carts, a material handling cart, etc.), etc. and non-motorized electrical devices (e.g., a power source, a light, an AC/DC adapter, a generator, etc.), any one of which is now referred to herein as "device."

The battery pack 3014 includes a battery pack housing 3030. The illustrated housing includes a body portion 3034, a cover portion 3038, and first and second side portions 3042, 3046 coupled to first and second sides, respectively, of the body portion 3034. The cover portion 3038 of the housing 3030 may be referred to herein as a "top housing portion 3050," and the body portion 3034 and the first and second side 3042, 3046 portions may be collectively referred to herein as a "bottom housing portion 3054." In other embodiments, the housing 3030 may comprise one or more portions to form the housing 3030. In addition, the housing 3030 includes a longitudinal axis 3058 extending therethrough.

The housing 3030 includes a front side 3062, a rear side 3066, a first lateral side 3070, a second lateral side 3074 opposite the first lateral side 3070, a top side 3078, and a bottom side 3082 opposite the top side 3078. In the illustrated embodiments, the body portion 3034 forms the front side 3062, the rear side 3066, and the bottom side 3082. The first and second side portions 3042, 3046 form the first and second lateral sides 3070, 3074, respectively, and the cover portion 3038 forms the top side 3078 of the housing 3030.

Figure 69:
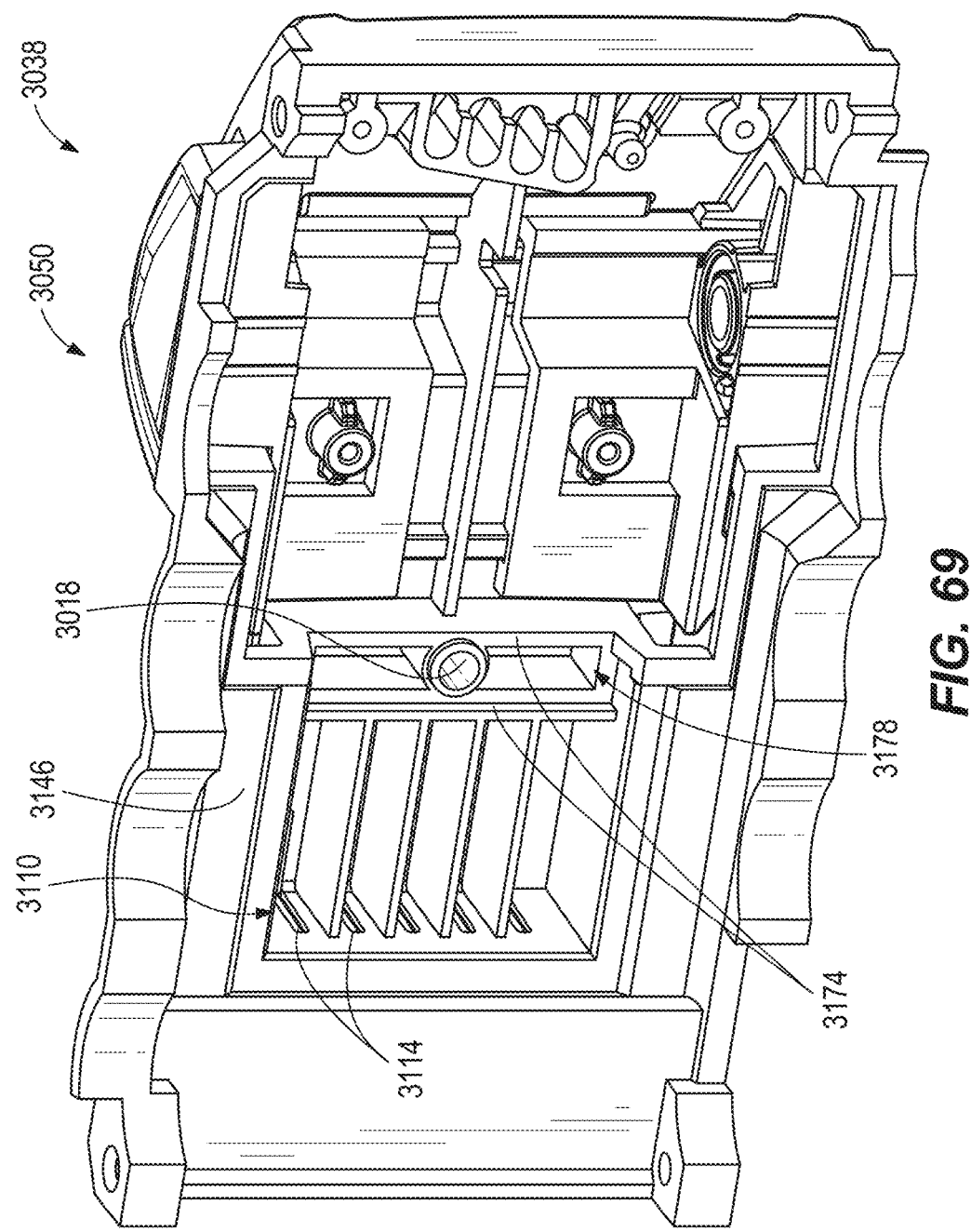
FIG. 69 is a bottom perspective view of a top housing portion of the battery pack assembly of FIG. 65.

With specific reference to FIG. 69, the housing 3030 defines an internal cavity 3086 in which one or more battery cells 3090 are supported. More specifically, the body portion 3034 is positioned within the internal cavity 3086 and is configured to receive the battery cells 3090. As such, the body portion 3034 is configured as a battery cell holder that restrains the battery cells 90 within the internal cavity 3086.

Each battery cell 3090 may have a nominal voltage between about 3 V and about 5 V and may have a nominal capacity between about 2 Ah and about 6 Ah (in some cases, between about 3 Ah and about 5 Ah). The battery cells 3090 may be any rechargeable battery cell chemistry type, such as, for example, lithium (Li), lithium-ion (Li-ion), other lithium-based chemistry, nickel-cadmium (NiCd), nickel-metal hydride (NiMH), etc.

Figure 73A:
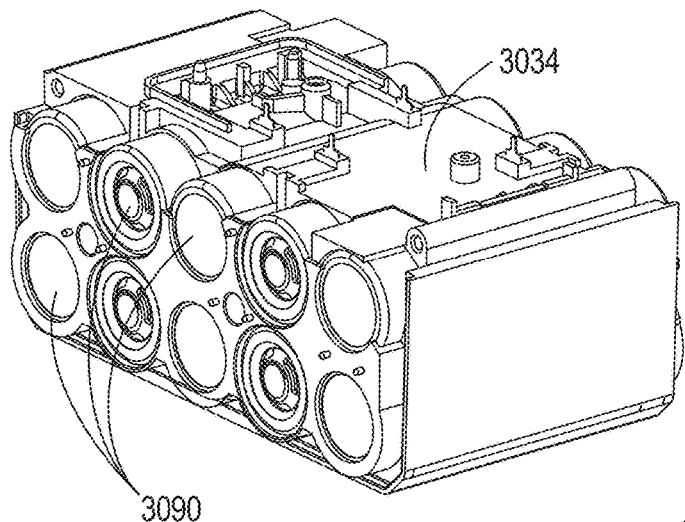
FIGS. 73A-73F are a series of diagrams illustrating a manufacturing process for the battery pack assembly of FIG. 65.
Figure 73B:
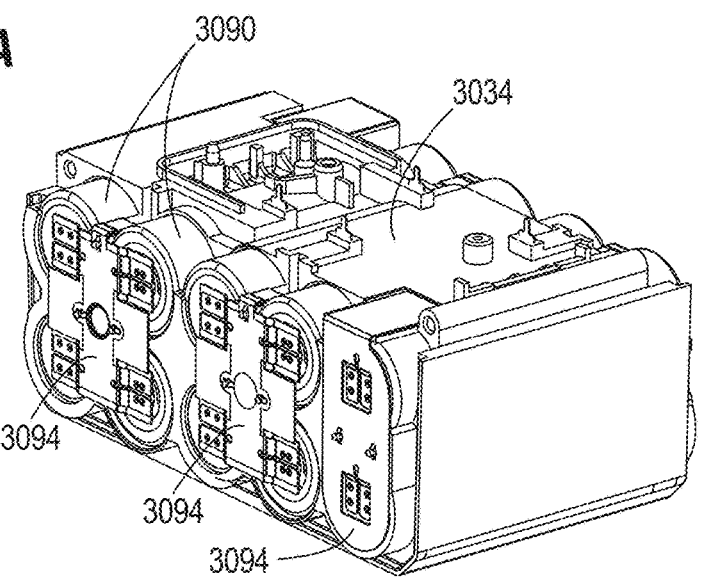
Figure 73C:
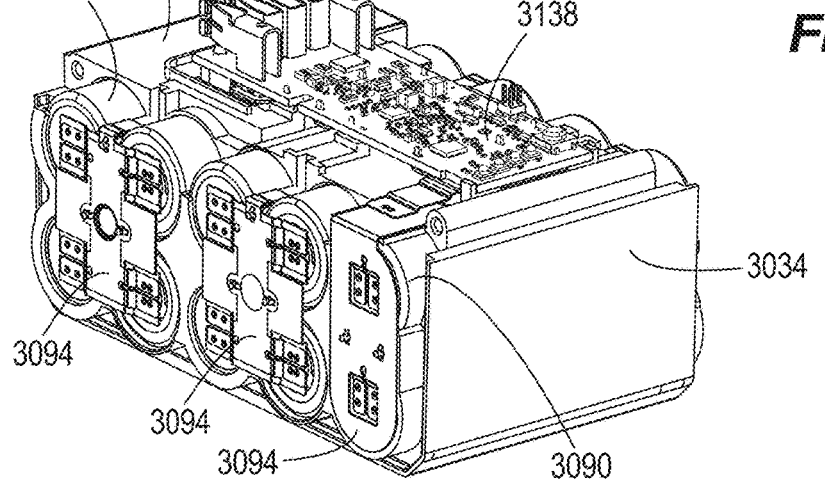

The battery cells 3090 may be connected in series, parallel, or combination series-parallel to provide the desired electrical characteristics (e.g., nominal voltage, current output, current capacity, power capacity, etc.) of the battery pack 14. The battery cells 3090 are connected together by battery straps 3094 (FIG. 73B). In addition, the battery cells 3090 are electrically coupled to battery contacts 3098 (FIG. 69) supported within the housing 3030 and configured to electrically and mechanically engage device contacts of the device to facilitate the transfer of electrical power between the device and the battery pack 3014.

With reference to FIGS. 65-69, the top housing portion 3050 includes a wall 3102 and a battery pack interface 3106 that extends from the wall 3102. The battery pack interface 3106 includes a terminal block 3110 with openings 3114 extending therethrough that allow access to the battery contacts 3098 (FIG. 69) positioned within the housing 3030. The terminal block 3110 encloses the battery contacts 3098.

The battery pack interface 3106 further includes rails 3118, 3122 and grooves 3126, 3130 positioned on opposite sides of the terminal block 3110. In particular, the grooves 3126, 3130 are defined between the respective rail 3118, 3122 and the wall 3102. The battery pack interface 3106 is configured to selectively couple with a device interface having structure corresponding to the structure of the battery pack interface 3106 (e.g., the device contacts and grooves/rails).

Figure 71:
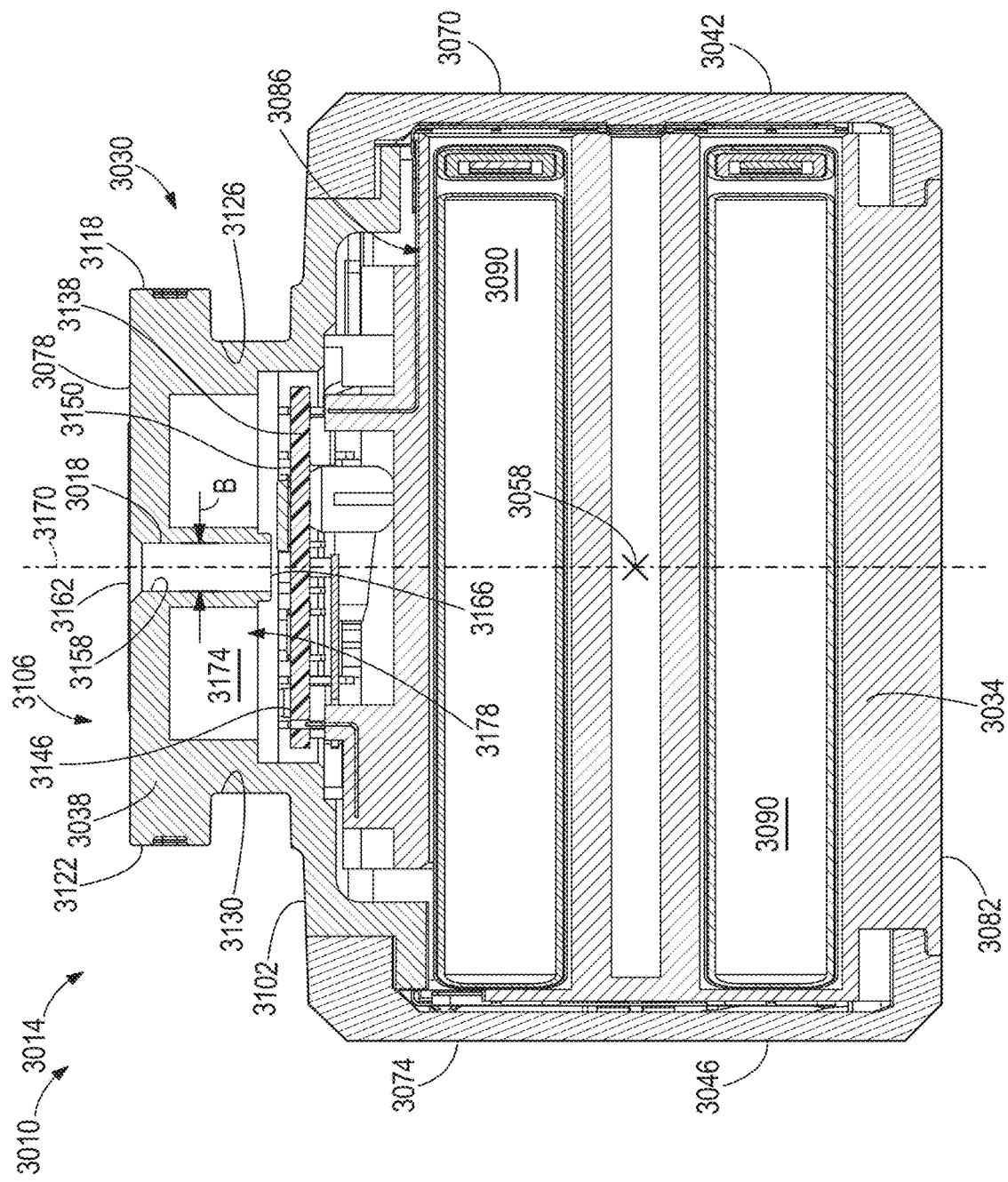
FIG. 71 is another cross-sectional view of the battery pack assembly of FIG. 65.

With reference to FIGS. 69 and 71, the battery pack 3014 includes battery pack electronics 3134 positioned within the housing 3030. The battery pack electronics 3134 include, among other things, a printed circuit board (PCB) 3138, one or more electrical component(s) 3142 (e.g., CPU, a transformer, FETs, etc.)), and the battery contacts 3098. The PCB 3138 is securably coupled to (e.g., by welding) and supported by the body portion 3034. The top housing portion 3050 includes an inner surface 3146 opposite the wall 3102 of the top housing portion 3050. The PCB 138 includes a surface 3150 in facing relationship with and spaced from the inner surface 3146 (FIG. 71) of the top housing portion 3050.

The battery contacts 3098 are securably coupled to (e.g., by welding) and extend from the PCB 3138 toward the inner surface 3146 at one end of the PCB 3138. An end of the battery contacts 3098 are positioned adjacent the openings 3114 of the terminal block 3110. In addition, the battery contacts 3098 are in electrical connection with the PCB 3138.

With reference to FIGS. 65 and 70-72, the housing 3030 includes the injection port 3018. The injection port 3018 includes one or more channels 3158 positioned on one or more of the sides (e.g., top side 3078, bottom side 3082, front side 3062, rear side 3066, first lateral side 3070, second lateral side 3074) of the housing 3030. In the illustrated embodiment, the injection port 3018 includes a single channel 3158 defined by the top housing portion 3050 such that the channel 3158 is positioned on the top side 3078 of the housing 3030. The channel 3158 extends between a first end 3162 located on the wall 3102 though the top housing portion 3050 (e.g., cover portion 3038) to a second, opposite end 3166 located on the inner surface 3146 of the top housing portion 3050. In other embodiments, the housing 3030 may include multiple channels extending through the same or different sides of the housing 3030 (e.g., two channels on the top side 3078, or one channel on the top side 3078 and another channel on the rear side 3066, etc.). The injection port 3018 connects the internal cavity 3086 of the battery pack 3014 to an exterior of the housing 3030.

Figure 72:
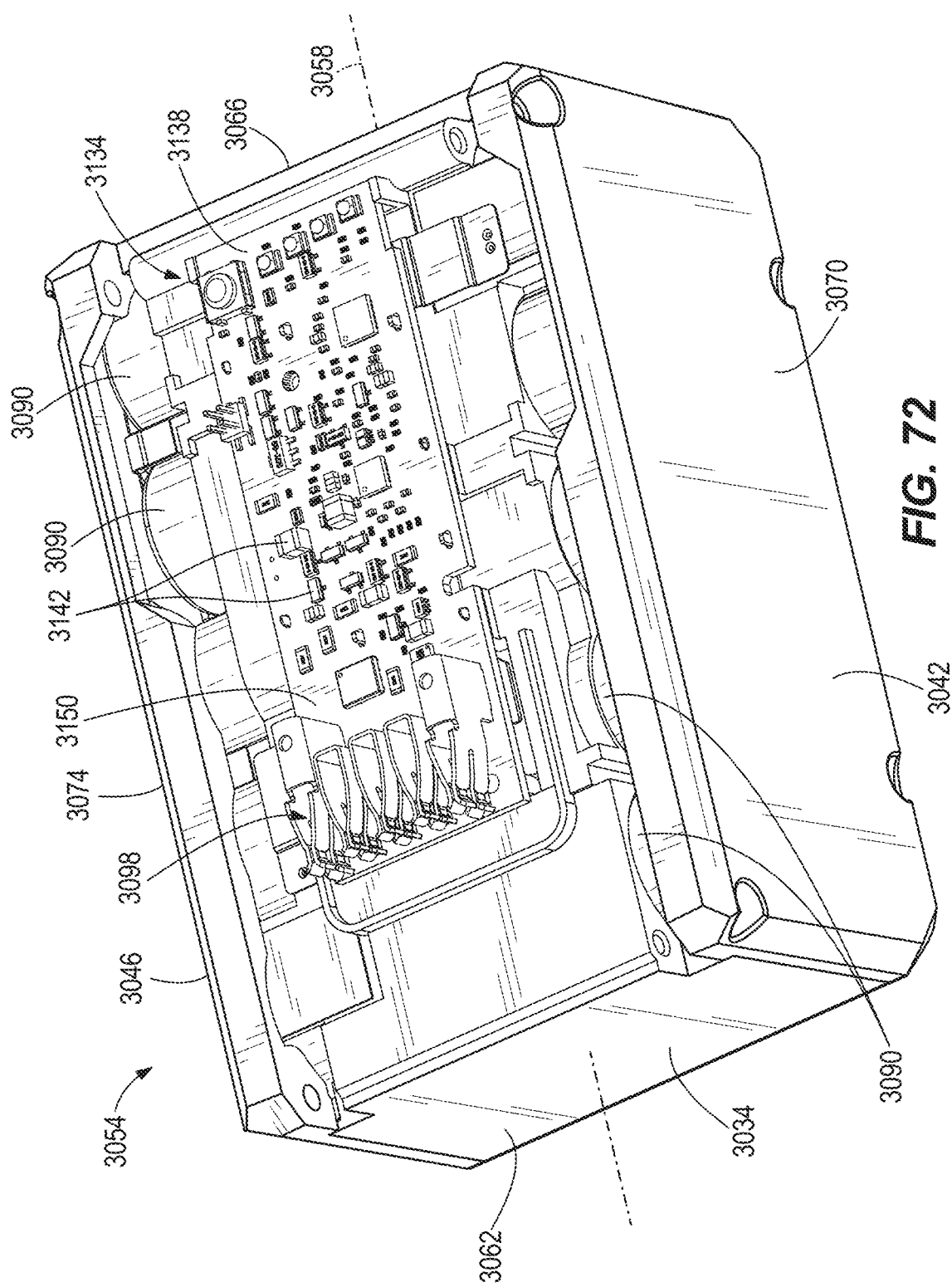
FIG. 72 is a top perspective view of a lower housing portion of the battery pack assembly.

With reference to FIGS. 71 and 72, the channel 3158 extends along an injection axis 3170. The injection axis 3170 extends relative to the longitudinal axis 3058. In the illustrated embodiment, the injection axis 3170 extends at an angle A (e.g., ninety degrees) relative to the longitudinal axis 3058. In other embodiments, the one or more channels 3158 may be positioned such that the respective injection axis 3170 extends parallel with the longitudinal axis 3058. In addition, the illustrated injection axis 3170 extends through the longitudinal axis 3058 (FIG. 72), but may alternatively be spaced away from the longitudinal axis 3058. When multiple channels 3158 are provided, each injection axis 3170 of the channels 3158 may extend at the same or different angle A relative to the longitudinal axis 58, and/or the injection axis 3170 of one, some, or all of the channels 3158 may extend through or spaced away from the longitudinal axis 3058.

With continued reference to FIGS. 71 and 72, the channel(s) 3158 may be positioned closer to some of the sides 3062, 3066, 3070, 3074, 3078, 3082 of the housing 3030 rather than the respective opposite sides 3062, 3066, 3070, 3074, 3078, 3082. For example, the illustrated channel 3158 is positioned closer to the front side 3062 of housing 3030 than the rear side 3066 of the housing 3030 from the frame of reference of FIG. 71. The channel 3158 is positioned equidistantly between the first and second lateral sides 3070, 3074 from the frame of reference of FIG. 72. As such, the injection port 3018 is selectively positioned at a predetermined location on the housing 3030.

The channel 3158 is positioned proximate the terminal block 3110. Furthermore, the second end 3166 of the channel 3158 is positioned proximate the surface 3150 of the PCB 3138. The channel(s) 3158 is shaped and sized to allow a fluid to pass through the injection port 3018 from the exterior of the housing 3030 to the internal cavity 3086. The illustrated channel 3158 has a circular cross-sectional shape, and has a predetermined size B (e.g., diameter).

Figure 70:
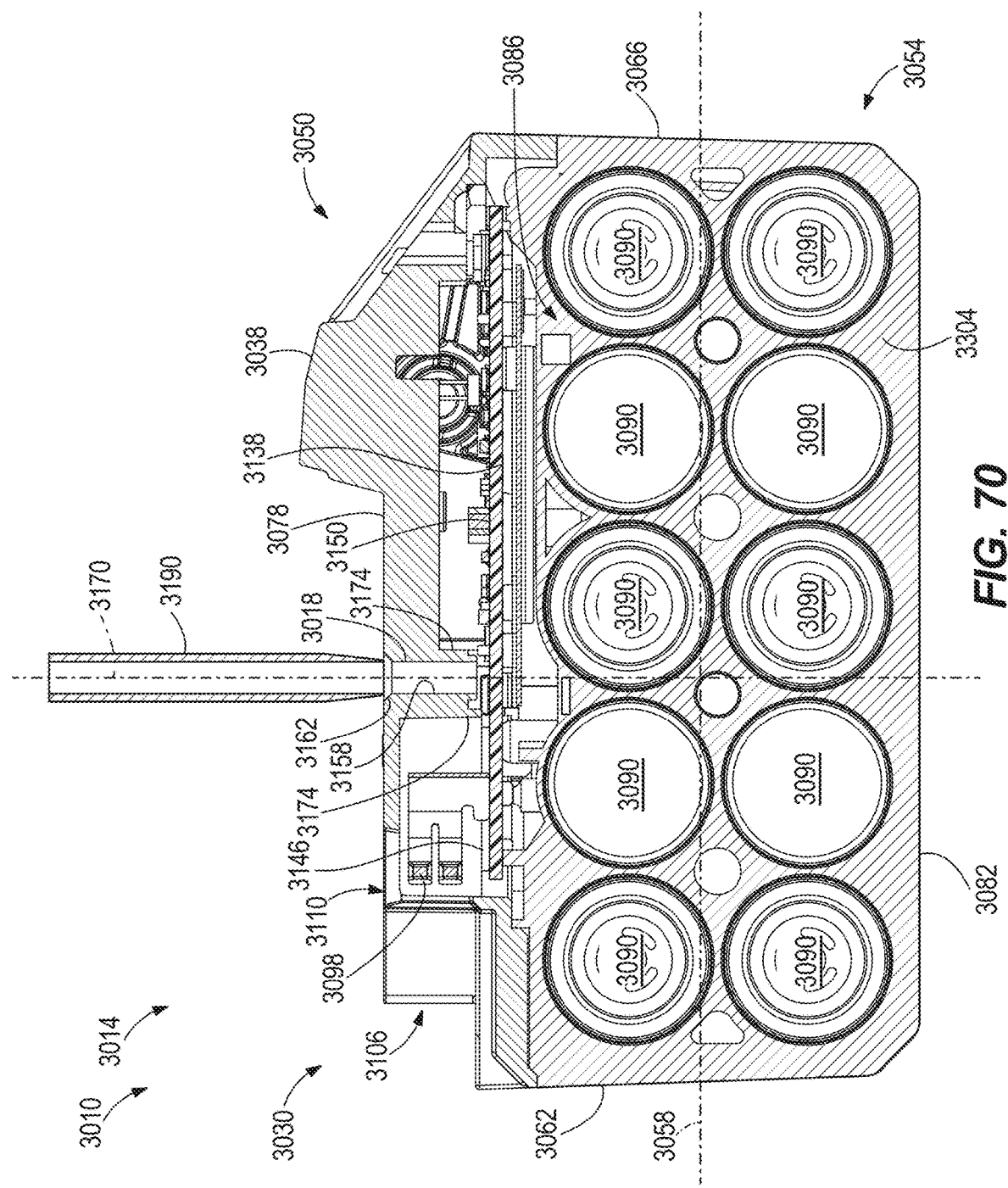
FIG. 70 is a cross-sectional view of the battery pack assembly of FIG. 65.

With reference to FIGS. 70-72, the battery pack assembly 3010 further includes a plurality of guide members 3174. Each guide member 3174 is configured as a wall extending from the inner surface 3146 of the top housing portion 3050 (FIG. 70). An end of each guide member 3174 is spaced from the PCB 3138 (FIGS. 71-72). The guide members 3174 define a chamber 3178 within the internal cavity 3086 in which the injection port 3018 extends through. The chamber 3178 is positioned adjacent the PCB 3138 (e.g., above from the frame of reference of FIG. 72). In addition, with particular reference to FIG. 71, the chamber 3178 separates the terminal block 3110 from the remaining space above the surface 3150 of the PCB 3138 within the internal cavity 3086 in an axial direction relative to the longitudinal axis 3058. The plurality of guide members 3174 are configured to direct the fluid from the injection port 3018 to other portions of the internal cavity 3086.

The internal cavity 3086 of the battery pack is configured to receive the fluid such as during assembly of the battery pack 3014. In particular, the internal cavity 3086 has a volume, and each of the components of the battery pack 3014 (e.g., the battery cells 3090, PCB 3138, etc.) and the fluid occupies a predetermined percentage of the volume. For example, in some embodiments, the battery pack components occupy at least seventy-five percent of the volume and the fluid occupies fifteen percent or less of the volume. As such, the fluid is configured to fill in gaps between the battery pack components and inner surfaces of the housing 3030. Still further, in some embodiments, the fluid may not fill in some of the gaps such that a portion of the volume (e.g., ten percent or less) of the internal cavity 3086 may not be occupied by the battery pack components or the fluid. This portion of the volume may be referred to herein as "unoccupied space" of the internal cavity 3086. In the illustrated embodiment, the unoccupied space is located within a portion of the internal cavity 3086 defined by the top housing portion 3050 (e.g., proximate the inner surface 3146 of the top housing portion 3050 and proximate the battery contacts 3098).

In some embodiments, the battery pack components occupy between eighty percent and eighty-five percent of the volume, the fluid occupies five to fifteen percent of the volume, and the remaining volume is unoccupied space. In further embodiments, the battery pack components occupy between eighty-five percent and ninety percent of the volume, the fluid occupies five to fifteen percent of the volume, and the remaining volume is unoccupied space. In further embodiments, the battery pack components occupy between ninety percent and ninety-five percent of the volume, the fluid occupies between two percent and five percent of the volume, and the remaining volume is unoccupied space.

Figure 73D:
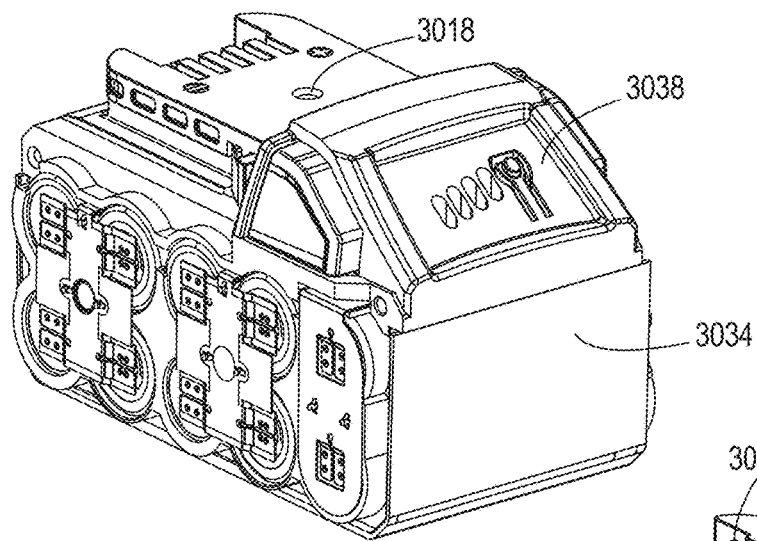
Figure 73E:
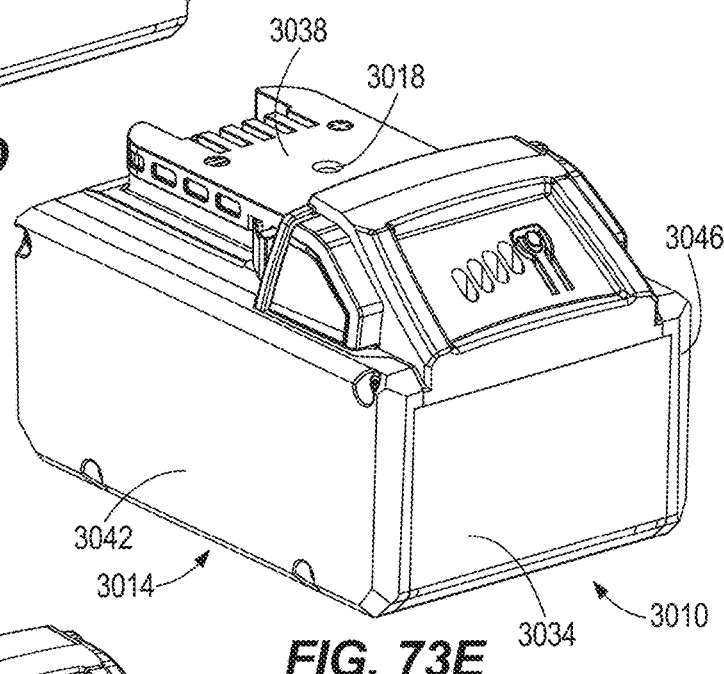

The fluid comprises an adhesive material (e.g., glue). In the illustrated embodiment, the fluid is 905 two-part addition-cure thermally conductive silicone encapsulant. The adhesive material is configured to be poured into the battery pack 3014 (e.g., via the injection port 3018) until the adhesive material occupies the predetermined volume of the internal cavity 3086, and then is allowed to cure to become a hardened coating or layer 3188 (FIG. 73H) within the battery pack 3014. In particular, the fluid is configured to cover one, some, or all of the ends of the battery cells 3090, an upper surface 3182 (FIG. 79) of the body portion 3034, and/or the surface 3150 of the PCB 3138 (i.e., including the electrical components 3142 of the PCB 3138 as shown in FIG. 73G). The fluid is distributed within the internal cavity 3086 (e.g., such as by the guide members 3174 and gravity) such that at least the end portion of each of the battery contacts 3098 is not covered by the adhesive material. Once hardened, the adhesive material is configured to form a surface within the internal cavity 3086.

As shown in Table 1 below, the 905 two-part addition-cure thermally conductive silicone encapsulant adhesive material may be manufactured such that some of the properties such as thermal conductivity (W/m-K), density (g/cm$^3$), volume resistivity (Ω·cm), and mixing viscosity (mPa-sec) of the adhesive material may vary. For example, TDS-905 (G11) has a thermal conductivity equal to 0.7 or greater, and TDS-9225 (G91) has a thermal conductivity equal to 3.0 or greater. In addition, TDS-905 (G11) has a volume resistivity equal to $1.0*10^{13}$, and TDS-9225 (G91) has a volume resistivity greater than $1.0*10^{12}$.

secured (e.g., by welding) to the upper surface 3182 of the body portion 3034. In step four, with reference to FIG. 73D, the top housing portion 3050 (having the injection port 3018) is positioned on the body portion 3034 of the bottom housing portion 3054. In step five, with reference to FIG. 73E, the first and second side portions 3042, 3046 are positioned on the first and second sides of the body portion 3034. Fasteners (e.g., screws 3186; FIG. 69) extending through the first and second side portions 3042, 3046 secure the entire assembly together. In the illustrated embodiment, four fasteners 3186 are used on each lateral side 3070, 3074 of the housing 3030. In step six, with reference to FIG. 73F, the fluid is injected into the internal cavity 3086 of the housing 3030 using the injection port 3018. In the illustrated embodiment, a tube 3190 is aligned with the injection axis 3170 of the channel 3158, and the fluid is directed through the tube 3180 into the channel 3158. As such, the fluid is received in the internal cavity 3086 by a single injection of the fluid.

Figure 73F:
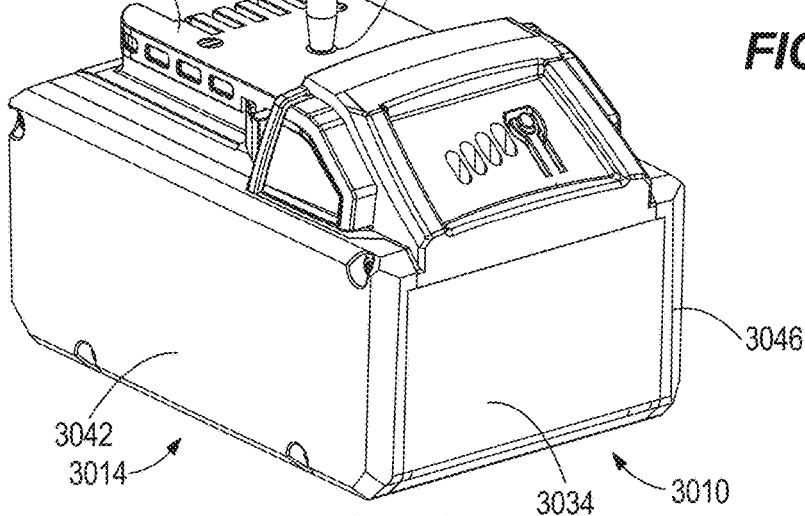
Figure 73G:
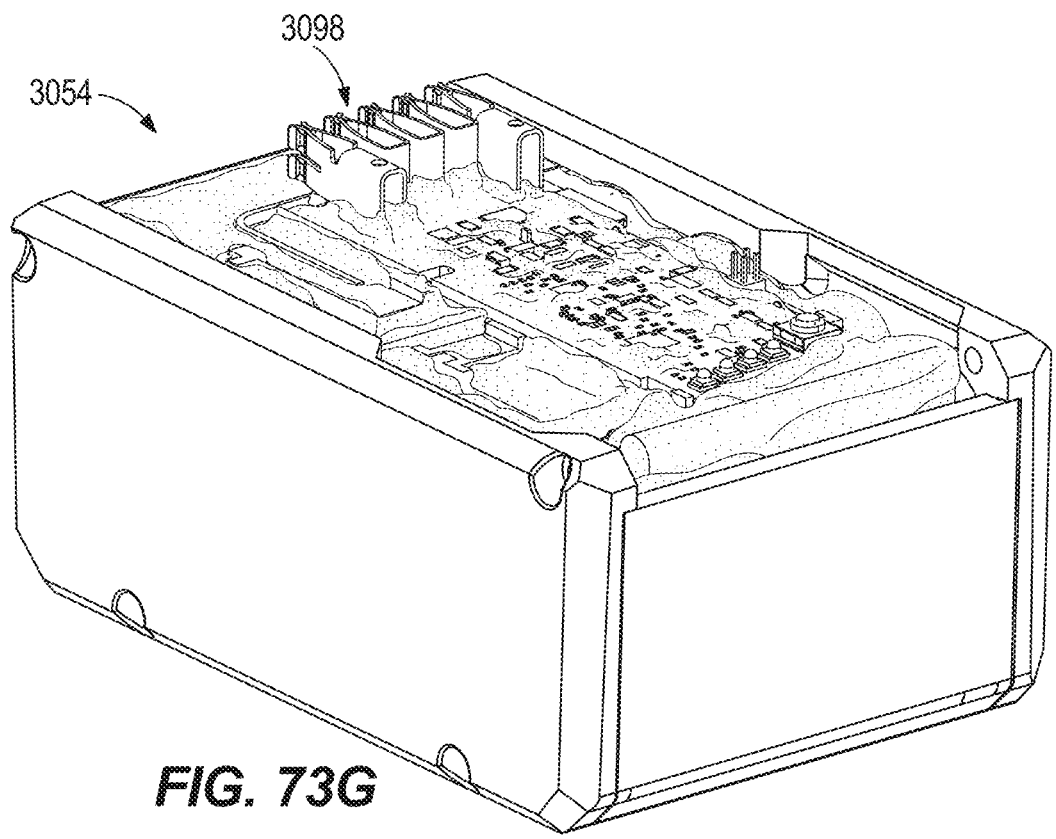
FIGS. 73G-73H illustrate adhesive material positioned within the battery pack during another example of a manufacturing process for the battery pack assembly of FIG. 65.
Figure 73H:
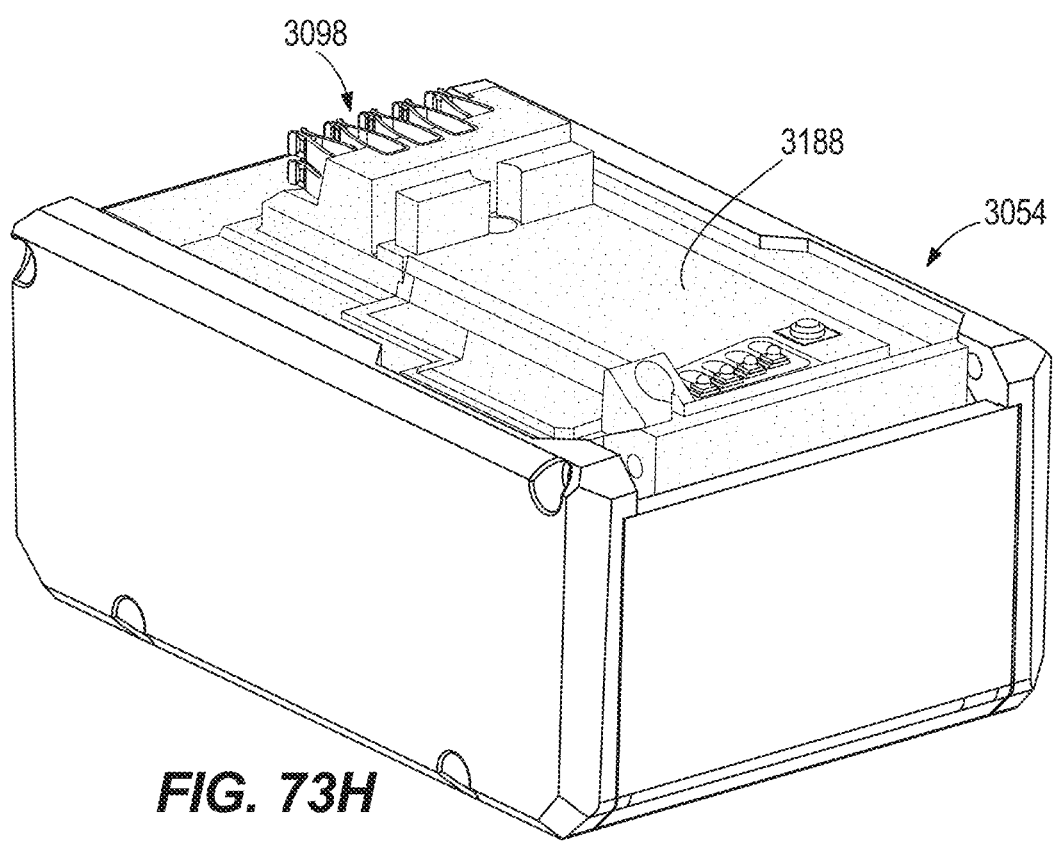

In other embodiments, as shown in FIGS. 73G-73H, the bottom housing portion 3054 is assembled first (e.g., the body portion 3034 and the first and second side portions 3042, 3046 are coupled together), and some of the fluid is received in (e.g., injected into) the bottom housing portion 3054 (FIG. 73G) before the top housing portion 3050 is coupled to the bottom housing portion 3054. The remaining fluid is then received in the internal cavity 3086 of the completed assembly using the injection port 3018 of the top housing portion 3050. FIG. 73H illustrates the fluid positioned within the internal cavity 3086 after the remaining fluid is received in the internal cavity 3086 and the top housing portion 3050 is decoupled from the bottom housing

TABLE 1

Types of adhesive material illustrating the differences in properties.
(Each of the types of the 905 two-part addition-cure thermally conductive silicone encapsulant adhesive material may be commercially available from supplier, Shenzhen Anpin Silicone Material co., Ltd.)

| Glue type | Thermal conductivity W/m-K | Density g/cm3 | Volume resistivity Ω · cm | Mixing Viscosity mPa-sec |
| --- | --- | --- | --- | --- |
| TDS-905 (G11) | ≥0.7 | 1.51 ± 0.05 (A part)<br>1.55 ± 0.05 (B part) | $1.0 * 10^{13}$ | 1200 ± 300 |
| TDS-905 (G18) | 0.4~0.45 | 1.22 ± 0.05 (A part)<br>1.25 ± 0.05 (B part) | $≥1.0 * 10^{14}$ | 1000~1500 |
| TDS-9225 (G22) | ≥2.5 | 2.86 ± 0.05 (A part)<br>2.86 ± 0.05 (B part) | $>1.0 * 10^{12}$ | 1500~2000 |
| TDS-905 (G39) | 0.25 ± 0.05 | 0.67 ± 0.05 (A part)<br>0.67 ± 0.05 (B part) | $≥1.0 * 10^{13}$ | 1200 ± 300 |
| TDS-9225 (G42) | ≥1.2 | 2.4 ± 0.05(A part)<br>2.4 ± 0.05(B part) | $≥1.0 * 10^{12}$ | 2500~3500 |
| TDS-9225 (R43) | ≥1.9 | 2.81 ± 0.05 (A part)<br>2.81 ± 0.05 (B part) | $>1.0 * 10^{12}$ | 3000 ± 300 |
| TDS-9225 (G52) | ≥0.9 | 2.0 ± 0.05 (A part)<br>2.0 ± 0.05 (B part) | $≥1.0 * 10^{12}$ | 2500~3500 |
| TDS-9225 (G62) | ≥1.5 | 2.1 ± 0.1 (A part)<br>2.1 ± 0.1 (B part) | $≥1.0 * 10^{12}$ | 6000~7000 |
| TDS-9225 (G91) | ≥3.0 | 2.94 ± 0.05 (A part)<br>2.94 ± 0.05 (B part) | $>1.0 * 10^{12}$ | 9500~11500 |

Figure 65:
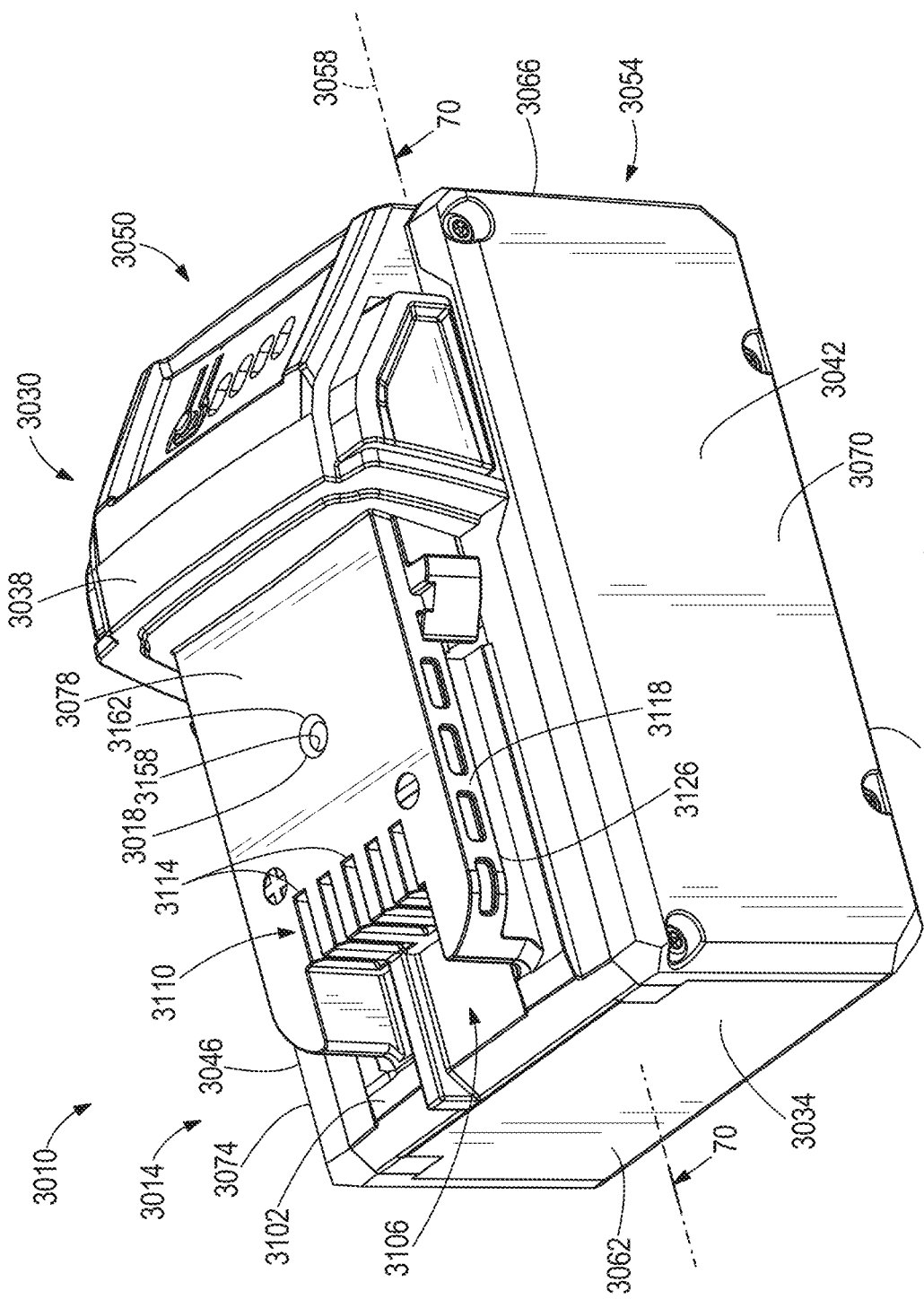
FIG. 65 is a perspective view of a battery pack assembly.
Figure 66:
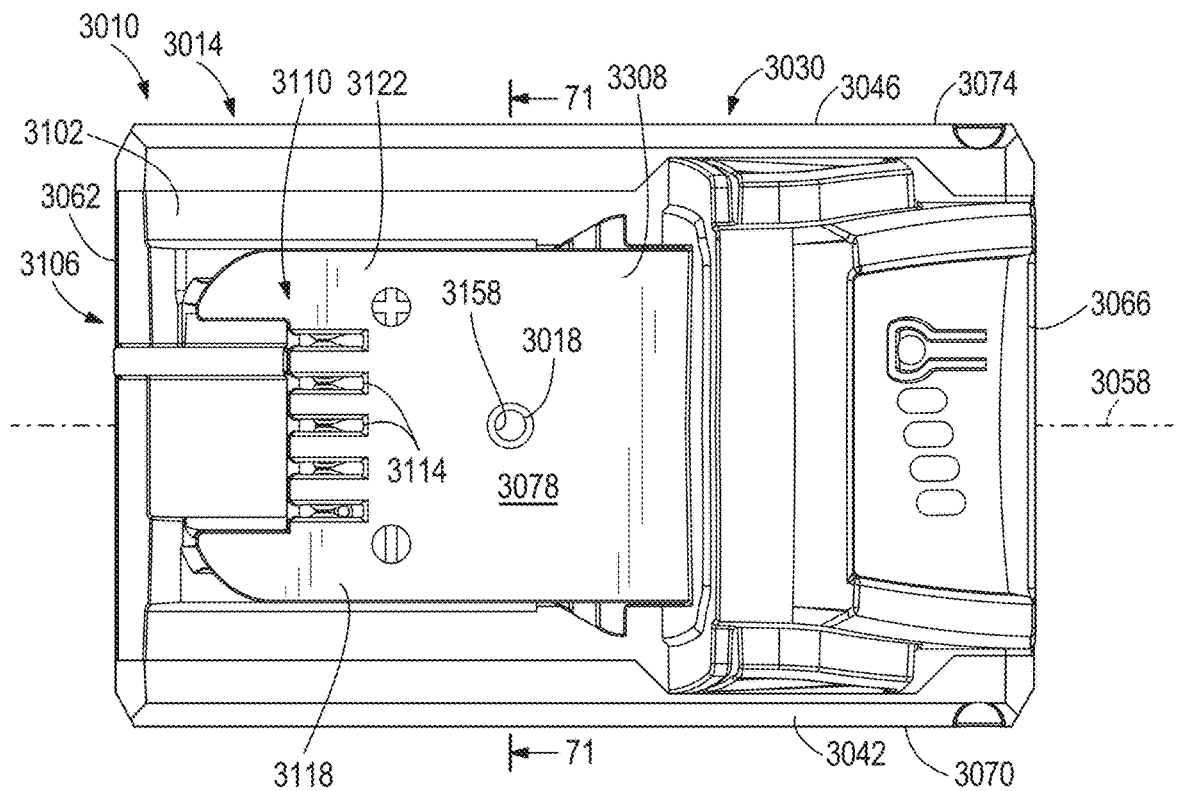
FIG. 66 is a top view of the battery pack assembly of FIG. 65.
Figure 67:
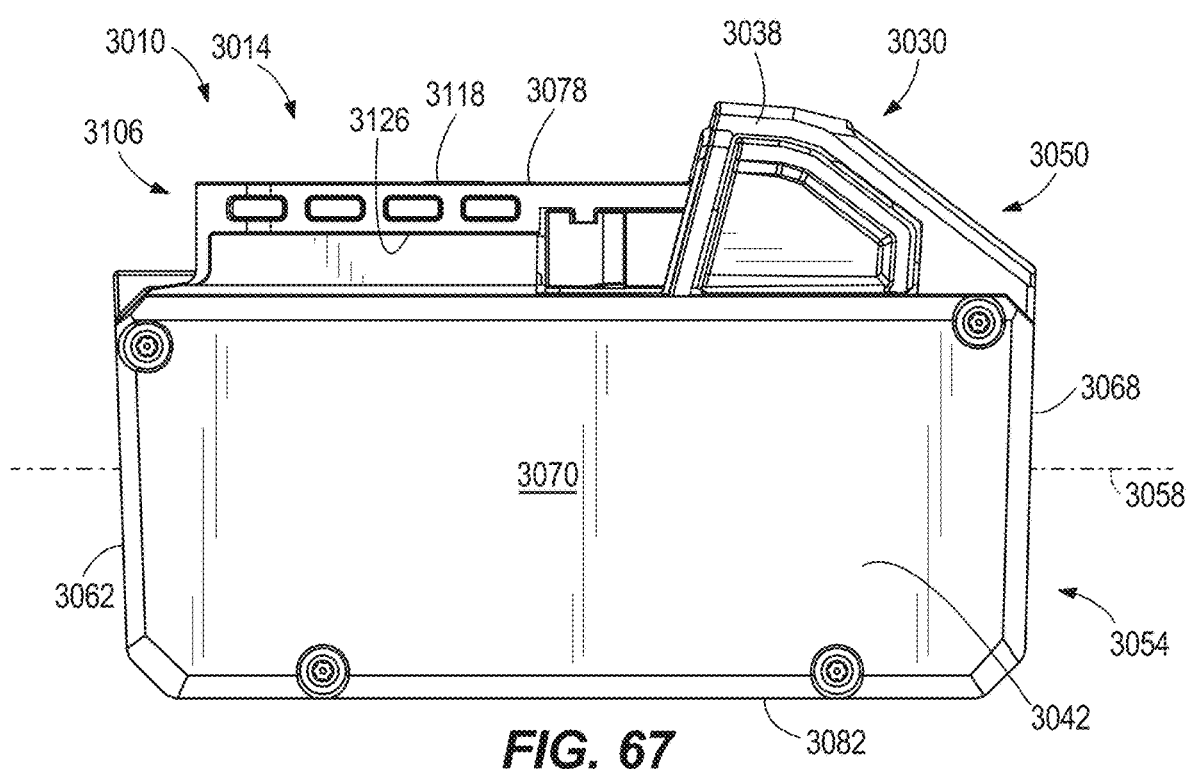
FIG. 67 is a side view of the battery pack assembly of FIG. 65.
Figure 68:
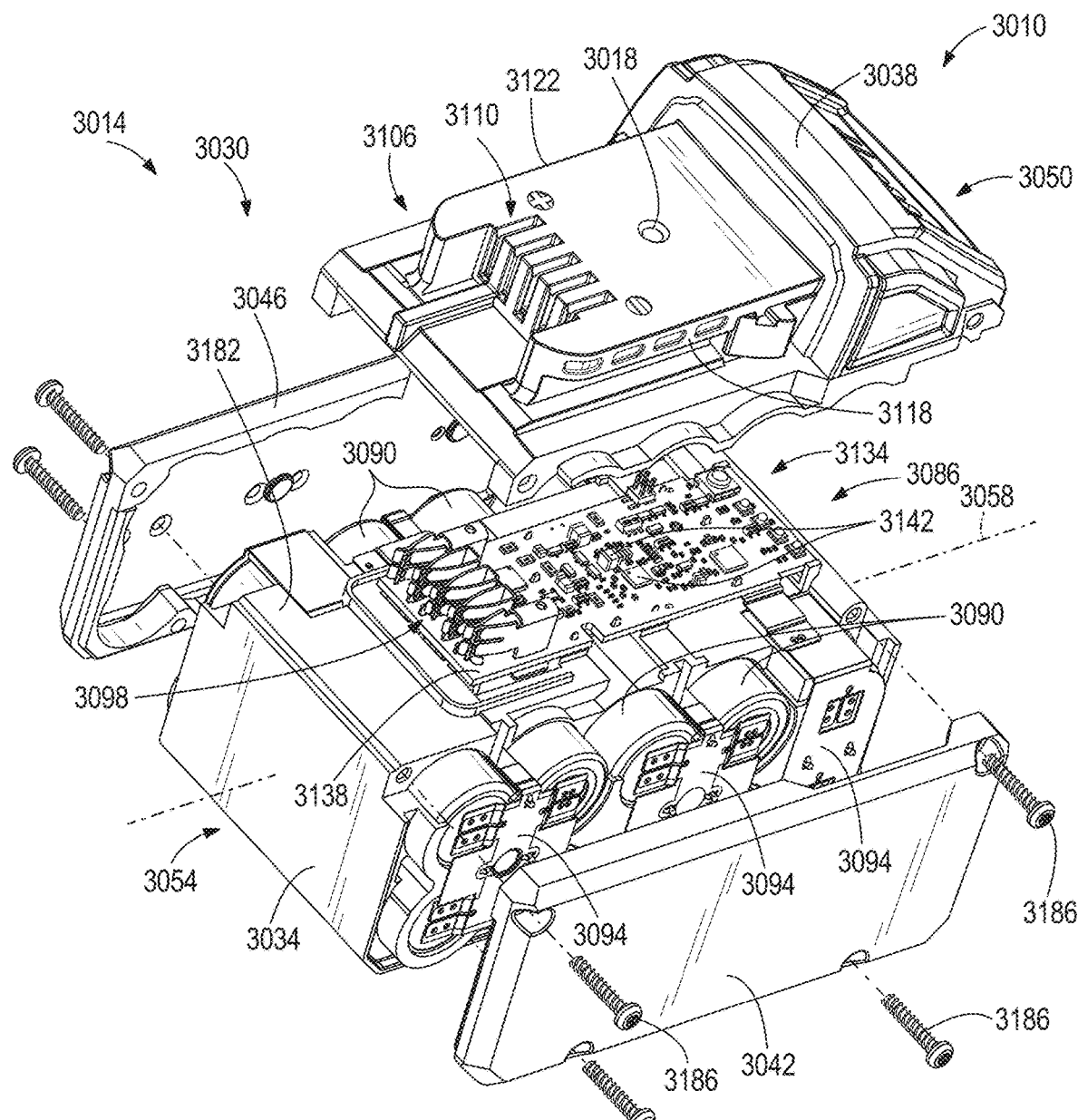
FIG. 68 is an exploded view of the battery pack assembly of FIG. 65.

FIGS. 73A-73F illustrates one example of a manufacturing process for the battery pack assembly 3010 of FIG. 65. In step one, with reference to FIG. 73A, the battery cells 3090 and the battery cell holder (i.e., body portion 3034) are provided. Each of the battery cells 3090 is received in (e.g., pushed into) the battery cell holder 3034. In step two, with reference to FIG. 73B, the battery strap 3094 is secured (e.g., by welding) to the ends of each of the battery cells 3090. In step three, with reference to FIG. 73C, the PCB 3138 is portion 3054. As such, the fluid is received in the internal cavity 3086 by at least two injections of the fluid.

In further other embodiments, the battery pack 3014 is completely assembled (i.e., by steps one through five in FIGS. 73A-73E), and then the battery pack 3014 is positioned within a vacuum, before initiating step six of injecting the fluid into the internal cavity 3086 of the battery pack 3014 (FIG. 73F).

The adhesive material is configured to be thermally conductive. For example, as shown in Table 2 below, a thermal test of multiple battery packs was tested at three different discharges: 40A, 50A, and 60A. Temperature sensors T1-T6 were positioned at six different locations, respectively, within the back pack: T1 positioned on the upper surface 3182 of the body portion 3034 proximate one end of the PCB 3138, T2 position on the upper surface 3182 of the body portion 3034 proximate the opposite end of the PCB 3138 having the battery contacts 3098, T3-T5 are positioned on the ends of respective battery cells 3090, and T6 is positioned on the bottom side 3082 of the housing 3030. Each the temperature sensor determines a temperature reading at the respective location. The battery packs 3014 with adhesive material (e.g., battery packs 3 # and 4 #) has an overall lower temperature at each of the six locations during discharging of the respective battery pack 3014 in comparison to the battery packs without adhesive material. As such, the battery packs 3014 with adhesive material facilitates thermal conduction of heat away from the battery cells 3090 and battery cell holder 3034 as the battery cells 3090 are being discharged. Accordingly, the adhesive material may increase thermal performance of the battery pack 3014, which thereby may improve battery pack cycle life and cycle running time.

The adhesive material is configured to inhibit ingress of water and/or moisture, and/or increase a strength of the battery pack housing 3030. More specifically, the adhesive material is configured to form a barrier between the battery pack components (battery cells 3090, PCB 3138, etc.) and exterior of the housing 3030. As such, water and/or moisture is inhibited from reaching the internal cavity 3086 of the battery pack housing 3030. The adhesive material is also configured to eliminate space between various structures/components contained in the battery pack 3014, and couple the battery pack components to the inner surfaces of the housing 3030, as well as to each other. As such, the strength of the housing 3030 increased (e.g., such as if the battery pack 3014 is dropped). In addition, the adhesive material is configured to withstand a temperature range between −50° C. to 200° C., is not configured to shrink during curing, and/or is configured to be non-corrosive.

Figure 74:
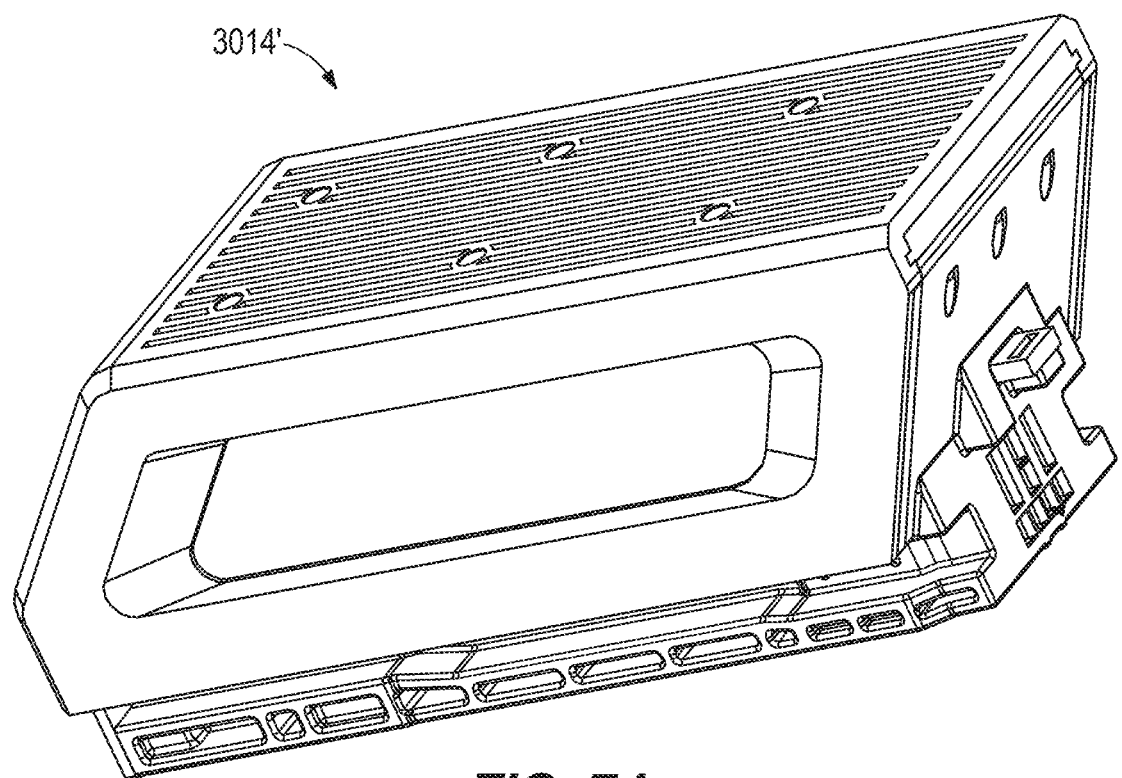
FIG. 74 is another example of a battery pack of the battery pack assembly of FIG. 65.

FIG. 74 illustrates another example of a battery pack 3014' of the battery pack assembly 3010 that may include like component and features as the embodiment of the battery pack 3014 shown in FIGS. 65-73F above. Accordingly, the discussion of the battery pack assembly 3010 above similarly applies to the battery pack 3014 and is not re-stated. In particular, the battery pack 3014' may include the injection port 3018 having the one or more channels 3158 configured to direct the fluid into an internal cavity of the battery pack 3014.

Further details of the disclosure are provided in the appendix.

Although the invention has been described in detail with reference to certain preferred embodiments, variations and modifications exist within the scope and spirit of one or more independent aspects of the invention as described.

Various features of the invention are set forth in the claims.

What is claimed is:

1. A battery pack assembly comprising:
a housing having a plurality of sides and defining an internal cavity, wherein the housing is sealed such that air is prevented from exiting the internal cavity;
a battery cell assembly positioned in the internal cavity, the battery cell assembly comprising
a plurality of battery cells and
a frame supporting the battery cells, wherein the frame comprises
a first support member receiving a first end of each battery cell of the plurality of battery cells,
a plurality of wires, each wire of the plurality of wires bonded directly to the first end of a respective battery cell of the plurality of battery cells such that each wire is an axially outermost conductive component coupled directly to the respective battery cell of the plurality of battery cells,
a second support member receiving a second end of each battery cell of the plurality of battery cells,

TABLE 2

Test results of thermal testing of battery packs with and without adhesive material at three different discharges: 40 A, 50 A, and 60 A.

| E-Load | | | | | | | | | Pack Performance | | |
|---|---|---|---|---|---|---|---|---|---|---|---|
| Discharge Current | Pack | | Max Temperature (° C.) | | | | | | Run time | Capacity | Energy |
| (A) | Type | Pack # | T1 | T2 | T3 | T4 | T5 | T6 | (mm:ss) | (Ah) | (Wh) |
| 40 A Discharge | Glue Injection | 3# | 58.89 | 61.948 | 60.03 | 60.75 | 61.495 | 61.514 | 11:25 | 7.6754 | 123.38 |
| | | 4# | / | 60.366 | 60.038 | 55.679 | 58.946 | 62.242 | 11:20 | 7.6156 | 122.4 |
| | No Glue Injection | 5# | 73.946 | 74.48 | 76.669 | 76.469 | 75.492 | 58.852 | 11:25 | 7.6965 | 124.47 |
| | | 6# | 75.16 | 77.32 | 75.96 | 77.02 | 76.58 | 66.91 | 11:15 | 7.5813 | 122.61 |
| 50 A Discharge | Glue Injection | 3# | 68.95 | 74.28 | 69.63 | 70.54 | 70.68 | 70.55 | 9:20 | 7.5936 | 119.6 |
| | | 4# | / | 69.99 | 67.62 | 57.96 | 65.45 | 67.21 | 8:55 | 7.471 | 117.2 |
| | No Glue Injection | 5# | 87.85 | 90.39 | 86.67 | 88.85 | 85.96 | 70.74 | 8:55 | 7.5341 | 118.92 |
| | | 6# | 84.58 | 88.57 | 84.35 | 84.45 | 83.71 | 68.72 | 9:05 | 7.506 | 118.46 |
| 60 A Discharge | Glue Injection | 3# First | 74.968 | 82.677 | 74.705 | 76.014 | 75.587 | 72.634 | 7:20 | 7.264 | 110.88 |
| | | 3# Second | 75.87 | 83.34 | 75.3 | 75.88 | 76.4 | 75.21 | 7:10 | 7.221 | 110.56 |
| | | 4# | / | 78.64 | 73.97 | 64.2 | 71.98 | 73.3 | 7:20 | 7.299 | 111.8 |
| | No Glue Injection | 5# First | 100.36 | 102.74 | 94.95 | 99.29 | 94.53 | 71.58 | 7:15 | 7.285 | 111.9 |
| | | 5# Second | 97.105 | 98.194 | 91.053 | 95.168 | 91.114 | 67.297 | 6:15 | 6.351 | 95.76 |
| | | 6# | 99.74 | 105.38 | 97.12 | 95.33 | 94.41 | 71.07 | 7:20 | 7.321 | 113.12 | the first support member and the second support member being spaced apart by a distance, and a plurality of leg members connecting the first support member and the second support member, each leg member of the plurality of leg members spanning the distance, wherein the first support member and the second support member each has a body extending between a first edge and a second edge opposite the first edge, and wherein the body defines a plurality of openings, each of the plurality of openings configured to align with one of the battery cells; and a fan configured to circulate air within the housing and through the battery cell assembly.

2. The battery pack assembly of claim 1, further comprising a heat sink integrated with the housing.

3. The battery pack assembly of claim 1, further comprising a plurality of baffles positioned within the internal cavity, wherein each of the baffles is positioned to direct the airflow toward the battery cell assembly.

4. The battery pack assembly of claim 1, wherein the battery pack assembly is configured as a high-power battery pack and connectable to and operable to power various motorized power tools.

5. The battery pack assembly of claim 1, wherein the battery cell assembly is arranged within the internal cavity such that each of the battery cells is oriented relative to a longitudinal axis of the housing.

6. The battery pack assembly of claim 1, wherein each battery cell of the plurality of battery cells is connected by a respective wire of the plurality of wires to a connector positioned adjacent to the respective battery cell of the plurality of battery cells, wherein the connector is an electrically conductive plate and directly coupled to at least two battery cells of the plurality of battery cells, and wherein the connector is positioned on a lateral surface of the second support member.

7. The battery pack assembly of claim 1, further comprising a battery terminal contact, wherein the battery cell assembly is electrically connected within the battery pack assembly and electrically connected to the battery terminal contact.

8. The battery pack assembly of claim 1, wherein the first support member and the second support member are configured to maintain a position of the battery cells within the internal cavity.

9. The battery pack assembly of claim 1, wherein the first support member is positioned adjacent an inner surface of the housing, and wherein the first support member is coupled to the inner surface of the housing.

10. The battery pack assembly of claim 1, further comprising battery electronics, wherein space within the internal cavity not taken up by the battery cell assembly or the battery electronics is divided up into one or more airflow channels positioned to surround the battery cell assembly.

11. The battery pack assembly of claim 1, wherein the fan is positioned adjacent the battery cell assembly.

12. The battery pack assembly of claim 1, wherein the battery cells are positioned in a metal sleeve or a plastic sleeve.

13. The battery pack assembly of claim 1, wherein each of the battery cells are equidistantly spaced.

14. The battery pack assembly of claim 1, wherein adjacent rows of battery cells are aligned in a longitudinal direction, a vertical direction, and a lateral direction.

15. The battery pack assembly of claim 1, wherein adjacent rows of battery cells are staggered and offset relative to each other.

16. A battery pack assembly comprising:

a housing defining an internal cavity, wherein the housing is sealed such that air is prevented from exiting the internal cavity;

a battery cell assembly positioned in the internal cavity, the battery cell assembly comprising a plurality of battery cells and a frame supporting the battery cells;

a fan configured to circulate air within the housing and through the battery cell assembly; and an airflow tunnel in fluid communication with the internal cavity of the housing, the airflow tunnel including a deflector including a plurality of guide members, each of the plurality of guide members extending along a majority of a length of the battery cell assembly, and an end portion extending from the fan to the plurality of guide members, wherein the deflector is configured to direct at least some of the air circulated by the fan around at least a portion of a perimeter of the battery cell assembly and through gaps between adjacent battery cells positioned within the battery cell assembly via the plurality of guide members.

17. The battery pack assembly of claim 16, wherein the frame comprises a first support member, a second support member, and a plurality of leg members connecting the first support member and the second support member, wherein the first support member and the second support member each has a body extending between a first edge and a second edge opposite the first edge, and wherein the body defines a plurality of openings, each of the plurality of openings configured to align with one of the battery cells.

18. The battery pack assembly of claim 17, wherein the airflow tunnel has a curvilinear shape for receiving airflow and guiding the airflow back toward the battery cells.

19. The battery pack assembly of claim 16, wherein the battery cells are thermally coupled to the airflow tunnel, the deflector, or the end portion by a thermally conductive gap filler, adhesive, potting, or encapsulant sealing the housing or a portion of the housing.

20. The battery pack assembly of claim 1, wherein the housing is configured to receive a majority of heat generated by the plurality of battery cells within the internal cavity of the housing.

21. The battery pack assembly of claim 16, wherein the housing is configured to receive a majority of heat generated by the plurality of battery cells within the internal cavity of the housing.

* * * * *